US006888951B1

(12) United States Patent
Worthington et al.

(10) Patent No.: US 6,888,951 B1
(45) Date of Patent: May 3, 2005

(54) METHODS AND APPARATUS FOR ANALYZING OPERATIONAL AND ANALYTE DATA ACQUIRED FROM OPTICAL DISC

(75) Inventors: Mark O. Worthington, Tustin, CA (US); Gregory R. Basile, Farmers Branch, TX (US)

(73) Assignees: Nagaoka & Co., Ltd., Hyogo (JP); Burstein Technologies, Inc., Irvine, CA (US)

( * ) Notice: Subject to any disclaimer, the term of this patent is extended or adjusted under 35 U.S.C. 154(b) by 0 days.

(21) Appl. No.: 09/378,878

(22) Filed: Aug. 23, 1999

(51) Int. Cl.[7] ............................................. G06K 9/00
(52) U.S. Cl. ...................... 382/100; 382/134; 250/236; 356/39; 436/165; 369/44.11
(58) Field of Search ................................. 382/100, 128, 382/133, 134, 232, 233; 386/124; 369/41.01, 103, 275, 44.11, 32.01; 359/234, 237; 250/234, 236, 306; 422/58, 64, 81; 356/39, 73; 436/164, 165, 809

(56) References Cited

U.S. PATENT DOCUMENTS

| 4,139,853 A | 2/1979 | Ghekiere et al. |
| 4,677,604 A | 6/1987 | Selby, III et al. |
| 5,099,363 A | 3/1992 | Lichtman |

(Continued)

FOREIGN PATENT DOCUMENTS

| EP | 0 392 475 A2 | 10/1990 | ............ G01N/1/28 |
| EP | 0 417 305 A1 | 3/1991 | .......... G01N/35/00 |

(Continued)

OTHER PUBLICATIONS

Benschop, J. and Van Rosmalen, G., "Confocal compact scanning optical microscope based on compact disc technology," Applied Optics,30 (10):1179–1184, (1991).

(Continued)

*Primary Examiner*—Sahir Ahmed
*Assistant Examiner*—Anand Bhatnagar
(74) *Attorney, Agent, or Firm*—Knobbe Martens Olson & Bear LLP

(57) ABSTRACT

Methods and apparatus for analyzing nonoperational data acquired from optical discs, and in particular, trackable optical discs having concurrently readable nonoperational structures are provided. Analysis can involve identifying patterns in the data that reproducibly distinguish underlying structures, or identifying patterns in the data that report physical properties of the nonoperational structures. When an optical disc has a plurality of physically nonidentical concurrently readable nonoperational structures, analysis can involve identifying patterns in the data that distinguish among the physically nonidentical nonoperational structures. Also, relative physical locations of nonoperational structures on the disc can be calculated. A system for remotely analyzing data in order to expedite complex data analysis and reporting the results thereof is also provided.

67 Claims, 34 Drawing Sheets

U.S. PATENT DOCUMENTS

| | | | |
|---|---|---|---|
| 5,112,134 A | | 5/1992 | Chow et al. |
| 5,130,963 A | | 7/1992 | Kusano et al. ............ 369/44.28 |
| 5,329,461 A | | 7/1994 | Allen et al. |
| 5,374,395 A | | 12/1994 | Robinson et al. |
| 5,406,533 A | * | 4/1995 | Maeda ..................... 369/53.16 |
| 5,472,603 A | | 12/1995 | Schembri ................. 210/380.1 |
| 5,478,750 A | | 12/1995 | Bernstein et al. |
| 5,532,874 A | | 7/1996 | Stein |
| 5,566,159 A | | 10/1996 | Shapira |
| 5,569,588 A | | 10/1996 | Ashby et al. .................. 435/6 |
| 5,598,393 A | | 1/1997 | Alon et al. |
| 5,627,643 A | | 5/1997 | Birnbaum et al. |
| 5,627,805 A | | 5/1997 | Finkelstein et al. |
| 5,629,514 A | | 5/1997 | Lee et al. ................ 250/201.5 |
| 5,706,266 A | | 1/1998 | Brownstein et al. |
| 5,736,410 A | | 4/1998 | Zarling et al. |
| 5,742,411 A | | 4/1998 | Walters |
| 5,754,649 A | | 5/1998 | Ryan et al. |
| 5,859,826 A | * | 1/1999 | Ueno et al. ................ 369/47.2 |
| 5,867,730 A | | 2/1999 | Leyda |
| 5,879,774 A | | 3/1999 | Taylor et al. .............. 428/64.1 |
| 5,892,577 A | | 4/1999 | Gordon ........................ 356/73 |
| 5,920,529 A | * | 7/1999 | Ota et al. ...................... 369/84 |
| 5,930,033 A | | 7/1999 | Inoue et al. |
| 5,933,570 A | * | 8/1999 | Fujita ........................... 386/96 |
| 6,030,581 A | * | 2/2000 | Virtanen .................... 422/68.1 |
| 6,327,031 B1 | * | 12/2001 | Gordon ........................ 356/72 |
| 6,338,139 B1 | * | 1/2002 | Ando et al. .................. 713/168 |
| 6,344,939 B2 | * | 2/2002 | Oguro ......................... 360/27 |
| 6,449,423 B1 | * | 9/2002 | Takahashi et al. ............ 386/52 |
| 6,453,119 B1 | * | 9/2002 | Maruyama et al. ........... 386/95 |
| 6,487,147 B2 | * | 11/2002 | Miyagawa et al. ...... 369/44.26 |
| 6,496,647 B2 | * | 12/2002 | Arai et al. ..................... 386/95 |
| 6,504,994 B2 | * | 1/2003 | Kawamura et al. ........... 386/95 |
| 6,505,964 B1 | * | 1/2003 | Ando et al. ................... 368/98 |
| 6,516,094 B1 | * | 2/2003 | Takahashi et al. .......... 382/243 |

FOREIGN PATENT DOCUMENTS

| | | | | |
|---|---|---|---|---|
| EP | | 0 504 432 A1 | 9/1992 | ......... G01N/33/543 |
| EP | | 0 630 002 A1 | 12/1994 | |
| EP | | 0 866 449 A2 | 9/1998 | |
| JP | | 0 417 305 A1 | * 9/1990 | |
| JP | | 10083571 | 3/1998 | ............ G11B/7/24 |
| WO | WO 95/34890 | | 12/1995 | ............ G11B/7/00 |
| WO | WO 96/09548 | | 3/1996 | ......... G01N/33/543 |
| WO | WO 97/18557 | | 5/1997 | |
| WO | WO 97/18558 | | 5/1997 | |
| WO | WO 97/18559 | | 5/1997 | |
| WO | WO 97/21090 | | 6/1997 | .......... G01N/21/07 |
| WO | WO 98/01533 | | 1/1998 | ............ C12M/1/00 |
| WO | WO 98/01857 | | 1/1998 | |
| WO | WO 98/01858 | | 1/1998 | |
| WO | WO 98/07019 | | 2/1998 | .......... G01N/21/07 |
| WO | WO 98/12559 | | 3/1998 | .......... G01N/33/53 |
| WO | WO 98/15356 | | 4/1998 | ............ B01L/3/00 |
| WO | WO 98/28623 | | 7/1998 | ......... G01N/33/543 |
| WO | WO 98/37238 | | 8/1998 | ............ C12Q/1/68 |
| WO | WO 98/37555 | | 8/1998 | |
| WO | WO 98/38510 | | 9/1998 | ......... G01N/33/487 |
| WO | WO 98/53311 | | 11/1998 | .......... G01N/33/00 |
| WO | WO 99/35499 | | 7/1999 | |

OTHER PUBLICATIONS

Benschop, J.P.H, "Signal detection and interpretation in Scanning Optical Microscopy," (1989) pp. 97–108, J.P.H. Benschop, Eindhoven, The Netherlands.

Burtis, C.A. and Mrochek, J.E., "Data processing for centrifugal analyzers" in Centrifugal Analysers in Clinical Chemistry, Price, P.P. and Spencer, K. [eds], (1980) pp. 51–69, Praeger Publishers.

Clatch, R.J. et al., "Five–Color Immunophenotyping Plus DNA Content Analysis by Laser Scanning Cytometry," *Cytometry*, 34:36–38 (1998).

Cullander, C., "Light Microscopy of Living Tissue: The State and Future of the Art," *J. Investig. Dermatol.*, Symposium Proceedings, 3(2): 166–171 (1998).

DeRisi, J.L. et al., "Exploring the Metabolic and Genetic Control of Gene Expression on a Genomic Scale," *Science*, 278:680–686 (1997).

Juan, G. et al., "Detection of Cyclins in Individual Cells by Flow and Laser Scanning Cytometry," *Methods in Molecular Biology, Flow Cytometry Protocols*, Jaroszeski, M.J. et al. (eds.), Humana Press, New Jersey, 91:67–75 (1996).

Juan, G. et al., "In Situ DNA Strand Break Labeling for Analysis of Apoptosis and Cell Proliferation by Flow and Laser Scanning Cytometry," *Cell Biology*, 2nd Edition, Celis, J.E. (ed.), Academic Press, 1:341–350 (1998).

Juan, G. et al., "Cell Cycle Analysis by Flow and Laser Scanning," *Cell Biology*, 2nd Edition, Celis, J.E. (ed.), Academic Press, 1:261–273 (1998).

Lashkari, D.A. et al., "Yeast Microarrays for Genome Wide Parallel Genetic and Gene Expression Analysis," *Proc. Natl. Acad. Sci. USA*, 94:13057–62 (1997).

Laurent, M. et al., "Power and Limits of Laser Scanning Confocal Microscopy," *Biol.Cell*, 80(2/3):229–240 (1994).

Luther, E. et al., "Laser Scanning Microscopy Applied to Studies of the Cell Cycle," *Proceedings, Microscopy and Microanalysis*, Bailey, G.W. et al. (eds.), Springer, 235–236 (1997).

Ockleford, C., "The Confocal Laser Scanning Microscope (CLSM)," *J. Pathol.*, 176(1):1–2 (1995).

Paddock, S.W., "Further Developments of the Laser Scanning Confocal Microscope in Biomedical Research," *Proc. Soc. Exp. Biol. Med.*, 213(1):24–31 (1996).

Schild, D., "Laser Scanning Microscopy and Calcium Imaging," *Cell Calcium*, 19(4):281–296 (1996).

Takubo, T. et al., "The Intracellular Distribution Patterns of Myosin and Actin are Different Among Human Neutrophils and Monocytes During Locomotion," *Haematologica*, 82(6):643–647 (1997).

Turner, N.G. et al., "Visualization and Quantitation of Iontophoretic Pathways Using Confocal Microscopy," *J. Investig. Dermatol.*, Symposium Proc., 3(2):136–142 (1998).

Wodicka, L. et al., "Genome–wide Expression Monitoring in *Saccharomyces cerevisiae*," *Nature Biotech.*, 15(13):1359–1367 (1997).

* cited by examiner

METHODS AND APPARATUS FOR ANALYZING OPERATIONAL AND ANALYTE DATA ACQUIRED FROM OPTICAL DISC

FIELD OF THE INVENTION

The present invention relates to methods and apparatus for analyzing nonoperational data acquired by reading optical discs, and in particular, by reading trackable optical discs having concurrently readable nonoperational structures. More particularly, the methods and apparatus described herein may be used to identify, discriminate, and classify patterns in the data that report one or more physical properties of nonoperational structures disposed upon or within an optical disc. The invention also relates to methods and apparatus for interpreting clusters of such patterns and methods of mapping them according to positional information present within the digital data.

BACKGROUND OF THE INVENTION

In the two decades since the development of audio compact discs, the progression of standards for physically mastering data on optical discs has been matched by a corresponding evolution in the logical approaches to encoding the data. Thus, the progression from single data layer discs with pits mastered along a continuous spiral to multiple data layer discs with zoned wobbled grooves has been matched by a corresponding evolution from the eight-to-fourteen modulation of CIRC-encoded digitized audio data to the sophisticated data encoding strategies established for DVD video and DVD-RAM.

Yet the disparate approaches to the logical encoding of data over the past two decades of optical disc evolution all share one fundamental characteristic: in each case, the data-encoding scheme is known at the time decoding must be effected; without such a predetermined encoding scheme, the decoding chipset could not thereafter accurately recreate the stored information. For readers or reader/writers that maintain backwards-compatibility with earlier standards, the chipset accommodates each (or at least a subset) of the earlier, prior-established, determinate encoding schemes.

Copending and commonly owned U.S. patent application Ser. Nos. 09/183,842 filed Oct. 30, 1998, 09/311,329 filed May 14, 1999, and 60/134,368 filed May 14, 1999, incorporated herein by reference in their entireties, describe optical discs that possess concurrently readable nonoperational structures. During trackable reading of these novel discs, the nonoperational structures produce signals that are discriminably embedded within the normal operational electrical responses. These signals report physical properties of the nonoperational structures. As might be expected, however, the signals from the nonoperational structures so inspected match no pre-established encoding standard. There thus exists a need in the art for analytical methods, software, and devices that permit the signals produced by such nonoperational structures to be identified, analyzed, and thereby decoded. More generally, there exists a need in the art for analytical methods, software, and devices that permit the post-acquisition decoding of signals acquired from optical media lacking a predetermined encoding scheme.

SUMMARY OF THE INVENTION

The present invention solves these and other problems in the art by providing methods and apparatus for analyzing data acquired by reading an optical disc having at least one readable nonoperational structure, the methods and apparatus including the step of identifying patterns in the data that report a physical property of the nonoperational structure. The present invention particularly provides methods and apparatus for analyzing data acquired by reading a trackable optical disc having at least one concurrently readable nonoperational structure.

It is also an object of this invention to provide methods and apparatus for analyzing data generated by reading an optical disc having a plurality of physically nonidentical readable nonoperational structures, by identifying patterns in the data that distinguish among the physically nonidentical nonoperational structures. The present invention particularly provides methods and apparatus for analyzing data acquired by reading a trackable optical disc having a plurality of physically nonidentical nonoperational structures readable concurrently with the disc's tracking attributes.

It is a further object of this invention to provide methods and apparatus for determining the relative physical locations of two different nonoperational structures on a surface of an optical disc by identifying in the data acquired from reading the disc (i) a first pattern that reports a physical property of the first nonoperational structure and (ii) a second pattern that reports a physical property of the second nonoperational structure, and then calculating at least relative physical locations of the first and second nonoperational structures on the disc.

It is yet a further object of this invention to provide methods and apparatus for mapping the physical locations of nonoperational structures on a surface of an optical disc by: (1) determining a relative physical location of at least one of the nonoperational structures; and (2) marking a representation of the surface of an optical disc with at least one object that indicates the at least one relative physical location.

It is yet another object of this invention to provide methods and apparatus for classifying an object having at least one sub-centimeter dimension by identifying, in the data acquired by reading an optical disc upon or within which the object is disposed as a nonoperational structure, a pattern that reproducibly distinguishes the object. It is particular object to provide such methods and apparatus for classifying an object that is disposed upon or within a trackable optical disc as a nonoperational structure concurrently readable with the disc's tracking attributes.

It is another object of this invention to provide methods for analyzing data comprising retrieving data acquired from an optical disc, particularly a trackable optical disc, with readable nonoperational structures; analyzing the data; generating at least one result object; and outputting the result object.

It is yet another object of this invention to implement the methods of the present invention on computer systems.

It is yet another object of this invention to provide a computer readable medium (e.g., storage and transmission media) containing nonoperational data acquired from an optical disc, particularly from a trackable optical disc containing nonoperational structures concurrently readable with the disc's tracking attributes. In one embodiment of this aspect of the invention, the data includes patterns that can be mapped according to positional information present on the digital data. In a further embodiment, the data includes at least one result object that indicates the position of at least one of the nonoperational structures detected on a surface of said disc.

It is yet another object of this invention to provide a computer readable medium (e.g., storage and transmission media)-containing instructions for analyzing data according to any of the methods of the present invention, and a particular object to provide a computer readable medium containing instructions for identifying patterns in the data that report a physical property of at least one nonoperational structure disposed in or upon the disc.

It is yet another object of this invention to provide a system for analyzing data acquired from an optical disc having at least one nonoperational structure, the system comprising a computer capable of retrieving the data, analyzing the data, generating at least one result object, and outputting the result object.

It is yet another object of this invention to provide a system for remotely analyzing data acquired from an optical disc having at least one nonoperational structure in order to expedite complex data analysis and reporting the results thereof. In one embodiment of this aspect of the invention, the system includes a client computer capable of acquiring data from a trackable optical disc with concurrently readable nonoperational structures, and transmitting the data over a remote connection; and a server computer capable of receiving the data over the remote connection, analyzing the data, and generating at least one result object from the data.

It is yet another object of this invention to provide a visual display of at least one software-generated object, wherein the object reports at least one physical property of a nonoperational structure of an optical disc. In one embodiment of this aspect of the invention, at least one of the displayed properties is the position of the nonoperational structure on said disc. In yet another embodiment, the displayed property is the size, in at least one dimension, of said nonoperational structure, such as in the disc's tangential direction.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 9 shows an illustrative embodiment of debug information panel 180 according to this invention;

DETAILED DESCRIPTION OF THE INVENTION

Figure 1:
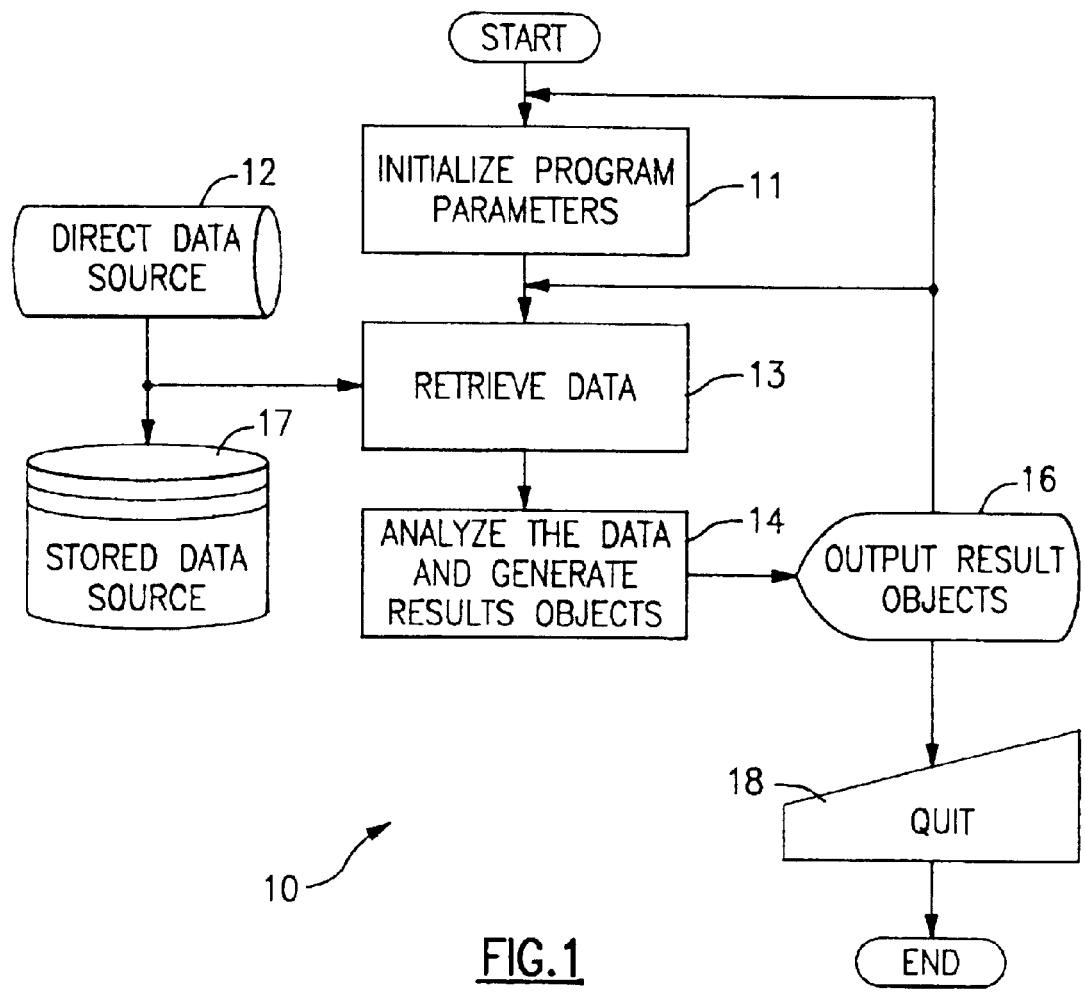
FIG. 1 is a flow chart of steps for carrying out an illustrative embodiment of a method of the present invention, showing an overview of data analysis process 10 according to this invention.

In order that the invention herein described may be fully understood, the following detailed description is set forth. In the description, the following terms are employed.

As used herein, the term "radial" denotes, in the plane of one or more of a disc's data-encoding surfaces, the direction forward or backward along a tracking spiral. A disc surface, according to this invention, can be an internal or external surface.

As used herein, the term "tangential" denotes, in the plane of one or more of a disc's data-encoding surfaces, the direction inward or outward along a line drawn from the disc's physical center to its outer circumference.

As used herein, the phrase "radial plane" refers to the plane in which a disc's tracking (e.g., spiral tracking) features are disposed, and is the plane of one or more of the disc's data-encoding surfaces.

As used herein, the term "nonoperational structure" or investigational features means any structure on or within an optical disc that is capable of producing a signal when the disc is read by an optical disc reader, the signal of which, however, is not required (although possibly useful) for drive operation during reading. Nonoperational structures and investigational features include, for example, analyte-specific signal elements, as described immediately below.

As used herein, the term "analyte-specific signal element" refers to any nonoperational structure that may be used to signal the presence of a specific analyte in a sample applied to an optical disc. The term thus includes, inter alia, such signal elements as are exemplified herein—including beads—as well as those that are described in copending and commonly owned U.S. patent application Ser. Nos. 08/888,935 filed Jul. 7, 1997, 09/120,049 filed Jul. 21, 1998, 09/183,842 filed Oct. 30, 1998, and 09/311,329 filed May 14, 1999, the disclosures of which are incorporated herein by reference in their entireties. The term includes both those structures that are alone detectable by an optical disc reader and those that require additional components to be rendered detectable.

As used herein, the term "turn" denotes a 360° arc of a spiral track of an optical disc.

Copending and commonly owned U.S. patent application Ser. Nos. 09/183,842 filed Oct. 30, 1998, 09/311,329 filed May 14, 1999, and 60/134,368 filed May 14, 1999, which are incorporated herein by reference in their entireties, describe optical discs that possess concurrently readable nonoperational structures. During trackable reading of these novel discs, the nonoperational structures produce signals that are discriminably embedded within the normal operational electrical responses; the embedded signals report physical properties of the nonoperational structures. Using such discs, the routine process of optical disc reading is transformed into a scanning laser microscopic inspection of one or more of the disc's surfaces, and the disc drive into a scanning confocal laser microscope. Other approaches to the optical interrogation of nonoperational structures disposed on rotating disc surfaces, using modified optics, have also been described (see, e.g., U.S. Pat. No. 5,892,577; EP 0417305A; and WO 97/21090).

The signals generated by the nonoperational structures, however, match no established optical disc data encoding standard.

The nonoperational structures exemplified in copending and commonly owned U.S. patent application Ser. Nos. 09/183,842, filed Oct. 30, 1998, 09/311,329 filed May 14, 1999, and 60/134,368 filed May 14, 1999, include human red blood cells and spheres.

Although the outer diameter of the spheres used in the examples of this invention is typically on the order of microns (i.e., $\mu$m), it will be appreciated that a wide range of sizes can be detected and characterized according to this invention. Thus, a nonoperational structure can be almost any structure of sufficient size to be detectable—with commercially-available optical disc readers, presently about ½ the incident laser wavelength—yet not so large as to interrupt tracking, focus, speed control, or synchronization. The protean nature of such structures—the extraordinary range in permissible size, reflectivity, absorbence, and shape—creates an enormous diversity in resulting signal patterns.

Furthermore, such nonoperational structures will often be stochastically, rather than determinatively, distributed on the surface of the disc; the location of the relevant signal patterns will often not be known in advance. There thus exists a need in the art for analytical methods, software, and devices that can recognize, discriminate, and classify a wide variety of patterns distributed randomly throughout the digital data sample.

Many of the nonoperational structures to be detected by optical inspection of such discs will be sufficiently large as to cross at least two adjacent tracks, producing patterns discontinuously in the digital data stream. In other words, a single structure located on or within a disc can produce data features at positions that are about 360° apart on a spiral track of the optical disc. In this, case, the discontinuity in the data between the two data features can report a physical property of the structure in the tangential direction.

Notwithstanding existing deinterleaving algorithms, no optical disc decoding scheme has contemplated assembling discontinuous data according to the tangential locality of the data on the physical disc surface. Accordingly, there exists a need for methods and apparatus for effecting such decoding of data.

More generally, the physical location of digitally-encoded data on optical discs is of significance under existing standards principally as it affects the operational necessities of the reading process, and in particular, as it implicates access to the data during reading. Once the data are read and decoded, the physical location that the data had occupied on the disc becomes irrelevant: during execution of program instructions read from CD-ROM, for example, the computer's CPU is indifferent to whether the program had originally been stored on the first or last track of the disc.

In contrast, the use of an optical disc reader as a scanning laser confocal microscope can make the original physical location of detected structures of enduring relevance during analysis.

For example, as noted above, the physical location of one or more detected structures can be used to identify radial and tangential dimensions of the underlying structure.

Additionally, the physical location of the detected structure is relevant to the analysis and interpretation of analyte-specific assays that are disposed on the disc in deliberate geometric patterns. Copending and commonly owned U.S. patent application Ser. Nos. 08/888,935 filed Jul. 7, 1997, and 09/120,049 filed Jul. 21, 1998, describe analytical assay geometries in which the absolute and/or relative physical locations of nonoperational structures can report, inter alia, the identity of the sample, the identity of the probe, the identity of the analyte, and the concentration of analyte.

There thus exists a need for methods and apparatus for mapping data patterns produced by one or more nonoperational structures (e.g., a cluster of such structures) according to positional information present within the digital data sample.

The present invention solves these and other problems in the art by presenting methods and apparatus for analyzing nonoperational data acquired from optical discs. The methods and apparatus are particularly useful in analyzing nonoperational data acquired from trackable optical discs having concurrently readable nonoperational structures.

FIG. 1 shows an overview of data analysis process 10 that can be performed on a computer system according to this invention.

In step 11, program parameters are initialized. As used herein, program parameters include, but are not limited to, memory allocation parameters, form parameters, which are used in the program's graphical user interface (e.g., default parameters used in windows-based programs), and object parameters, which are associated with simple or composite result objects (described below). In an embedded, real-time form of this invention, the overall environment could also be initialized. Various result object types, which are discussed below, may be used by one or more (including all) program forms according to this invention. Program parameter initialization is optional and its necessity may depend on the particular programming environment used to implement this invention.

After initialization, data are retrieved from a data source in step 13. A data source can either be specified by a user or defined by the program itself. A data source according to this invention can be direct data source 12, which may provide a substantially continuous data stream, or stored data source 17, which may provide a previously stored data file.

Direct data source 12 can be a local or remote optical disc drive (i.e., reader) capable of reading data for subsequent retrieval and use according to this invention. If remote, direct data source 12 can be connected to a computer programmed according to this invention via the Internet or any other network-type connection. Direct data can also be provided through an auxiliary device (connected to a drive), such as a conventional analog-to-digital converter, or a customized equivalent thereof. A computer programmed to retrieve direct data in step 13 could be synchronized with a computer programmed to acquire data. An example of how data can be acquired and retrieved according to this invention is described in U.S. patent application Ser. No. 09/183,842, filed Oct. 30, 1998, which is hereby incorporated by reference in its entirety.

In order to selectively acquire data from any portion of an optical disc (e.g., the portion with nonoperational structures disposed thereon), physical synchronization markers can be used, as described more fully in Worthington et al. U.S. patent application No. 60/150,288 filed Aug. 23, 1999, entitled "Methods and Apparatus for Optical Disc Data Acquisition Using Physical Synchronization Markers" which is hereby incorporated by reference in its entirety.

Figure 1A:
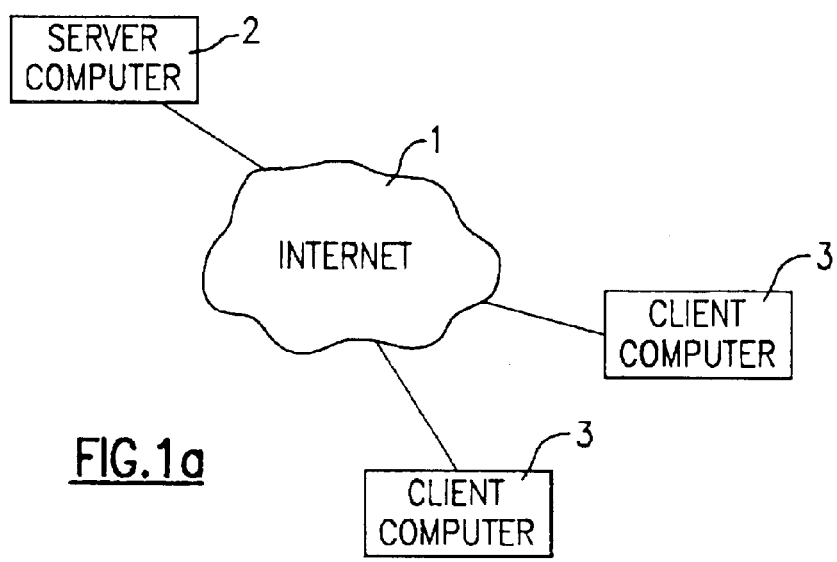
FIG. 1a shows a system for remotely analyzing data according to this invention, which includes a server computer, at least one client computer, and an Internet connection, according to this invention.

FIG. 1a shows a system for remotely analyzing data according to this invention, which includes server computer 2 and at least one client computer 3. In a preferred embodiment, client computers 3 and server 2 are coupled using a remote connection, such as Internet connection 1. Remote analysis by server 2 could be particularly useful when analysis requires complex computations that not easily handled by client computer 3, such as when complicated image analysis must be performed. Preferably, client computer 3 is capable of acquiring data from a trackable optical disc (e.g., using a direct source) with concurrently readable nonoperational structures, and transmitting the acquired data across the remote connection. Server computer 2 should also be capable of receiving the data over the remote connection, analyzing the data, and generating at least one result object from the data. The result object is then optionally transmitted back to client computer 2 over the same or a different network connection.

As previously described, data according to this invention can be operational, nonoperational, or a combination thereof. When operational and nonoperational data are retrieved separately the data can be merged when certain operational structures (e.g., that indicate sample number or track position) are useful for determining the position or identity of the nonoperational features in the data.

Multiple signals may be combined to form a single digital data set. For example, one may combine multiple analog signals to form a single combined analog signal and then quantize the combined analog signal to form the data. Alternatively, the method may involve quantizing each of the analog signals to form individual digitized data sets and then combining the individual digitized data sets to form a combined digitized data set.

Stored data source 17 is any data storage device capable of storing data for use by a computer programmed according to this invention. Like direct data source 12, stored data source 17 can be connected by any convenient connection means, including the Internet or any other network connection.

After data are retrieved in step 13, data are analyzed and one or more result objects are created in step 14. Result objects characterize operational and/or nonoperational features that appear in the data for subsequent output (e.g., displayed, printed, and/or saved) and for use by a local or remote user or process. Result objects can be of varying complexity and may include any number of features. For example, a simple result object could characterize a single nonoperational feature. Alternatively, a composite result object could characterize multiple operational and/or nonoperational features. Also, as described in more detail below, multiple processes can be used in combination to create a single result object.

After result objects are created in step 14, result objects can be output for subsequent use in step 16. Then, a user or process may retrieve additional or different data or may quit process 10 in step 18.

Figure 2:
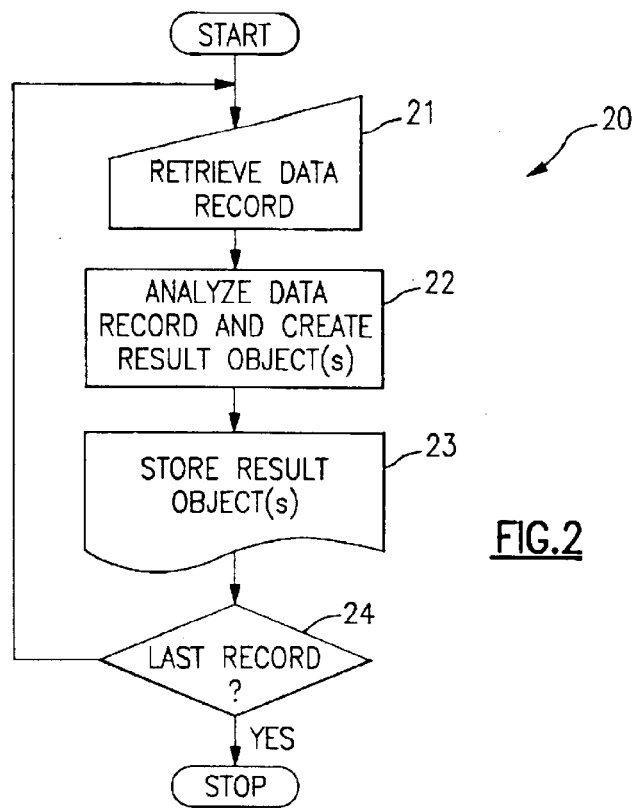
FIG. 2 is a flow chart of steps for carrying out an illustrative embodiment of a method for retrieving data according to step 13 of FIG. 1.

FIG. 2 is a flow chart of steps for carrying out an illustrative embodiment of a method for retrieving data according to step 13 of FIG. 1. In this embodiment, data (e.g., a digital sample) are retrieved in data records. A data record can include any convenient number of data items, and may be a subset or the entire data set. A single data record can contain any number of data items, but typically contains between 1 and about $10^9$ data items, and more typically between 1 and about $10^6$ data items. Data records of the same or differing sizes may be retrieved during step 13. A data item can include one or more time-varying data points. Because time t and track position x are related by the linear velocity v of the track being read during data acquisition, $$x=v(x,t)t,$$

time-varying data can also be represented as position-varying data.

In step 21, at least one data record is retrieved from data source 12 or 17. The data source may be specified by a user, an external process, or the source may be predetermined. After step 21, the data record is analyzed and one or more result objects may be created in step 22. As described more fully below with reference to FIGS. 3 and 4, a result object is normally created when a feature of interest is identified in the record. Alternatively, a blank object may be created if no such feature is identified. Analysis in step 22 may use one or more data records (i.e., at least a current data record and possibly one or more previously stored data records). Creation in step 22 may create one or more result objects. Result objects created may be stored (e.g., in a record history) as they are created or accumulated and stored later in step 23. Result objects may also be transmitted or relayed to other processes as needed.

In step 24, it is determined whether the data record processed in steps 21–23 is the last data record of the data set. If it is the last record, control of the process may be returned to a higher level (e.g., step 14 of FIG. 1). On the other hand, if it is determined that the record is not the last, steps 21–23 can be repeated, as necessary.

Figure 3A:
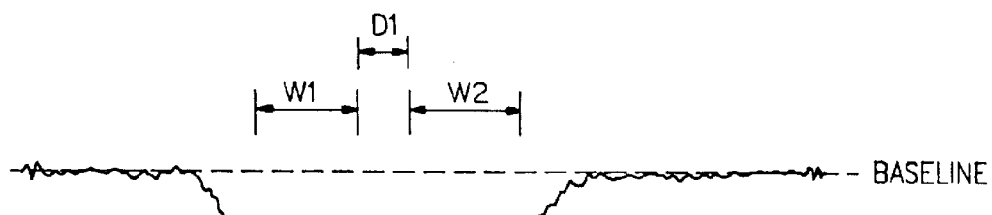
FIG. 3a shows a data pattern that can be found in a typical data record acquired by reading an optical disc according to this invention.
Figure 3B:
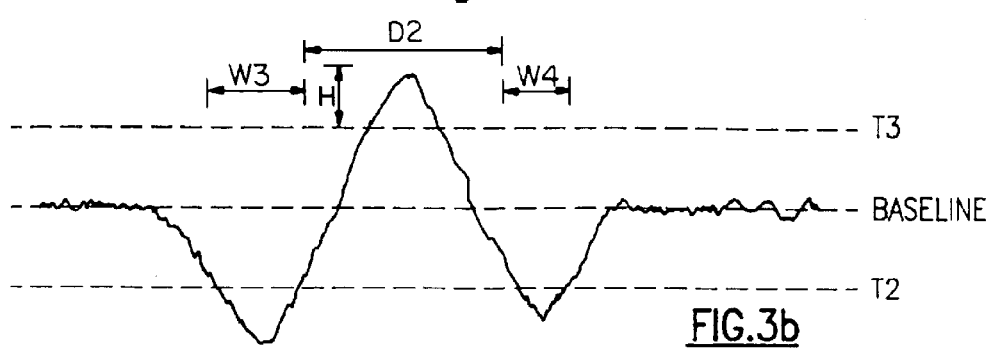
FIG. 3b shows another data pattern that can be found in a typical data record acquired by reading an optical disc according to this invention.
Figure 3:
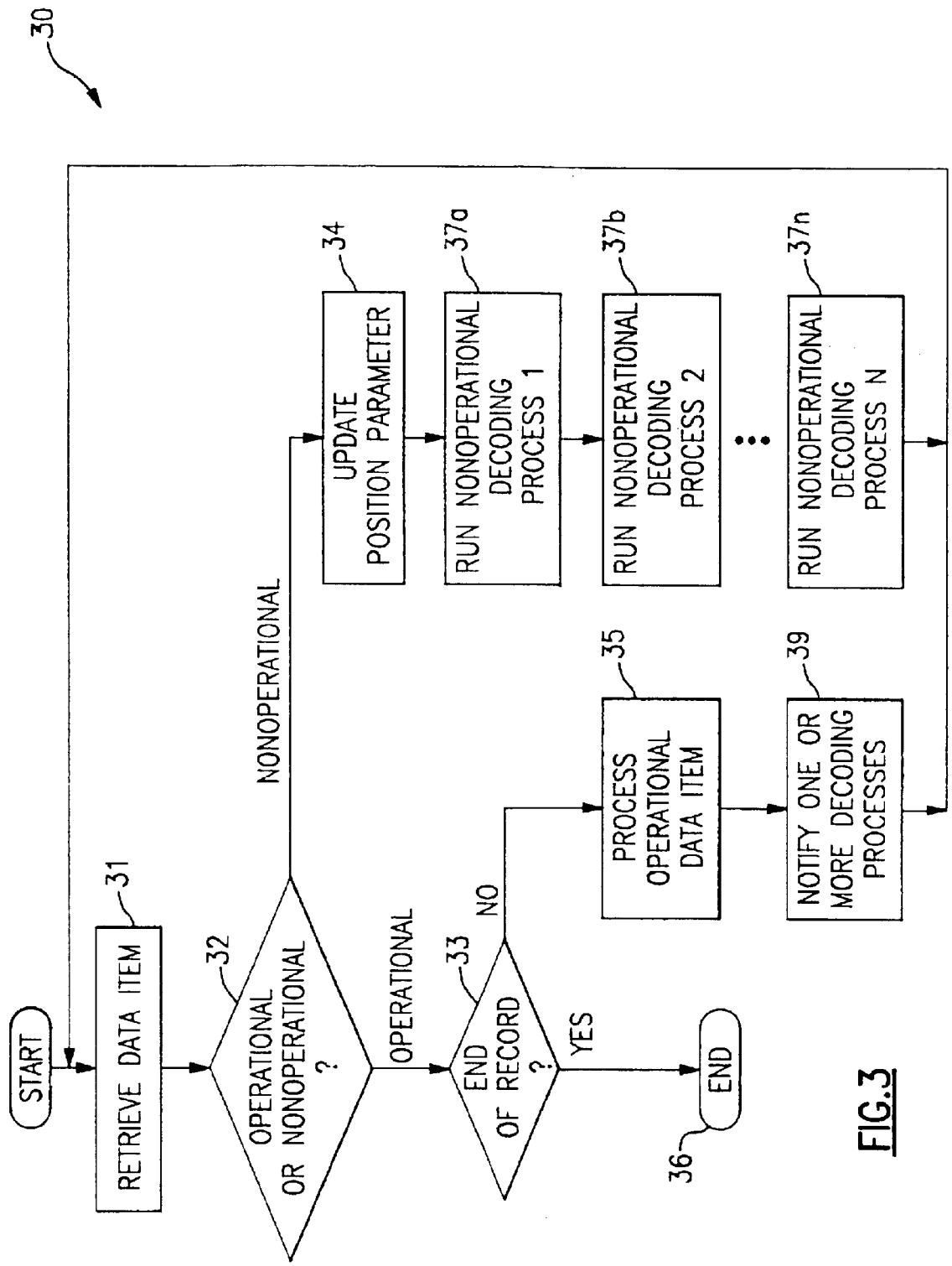
FIG. 3 is a flow chart of steps for carrying out an illustrative embodiment of a method for analyzing data records and creating result objects according to step 22 of FIG. 2.

FIG. 3 is a flow chart of steps for carrying out an illustrative embodiment of a method for analyzing data records and creating result objects according to step 22 of FIG. 2. In this embodiment, data records are analyzed by processing individual data items. In the context of the discussion that follows, and only for the purpose of simplification, a data item refers to a single data point.

In step 31, a data item is retrieved from a data record previously retrieved in step 21. Next, in step 32, it is determined whether that data item is operational or nonoperational. A nonoperational data item is any data item that corresponds to a nonoperational structure. In contrast, an operational data item is a data item that corresponds to an operational structure required or useful for drive operation during reading, such as embedded control and command structures, tracking information structures (e.g., track number, track start and track end), address information structures (e.g., absolute address and relative address), disc speed indicating structures, end of data structures, etc. In the context of CD-ROM, CD-R, and DVD's, for example, some operational structures can be nonoperational (e.g. see U.S. Provisional Application Ser. No. 60/150,288)).

First, a lead was attached to tap the nonequalized HF output of the drive. The analogue HF signal was buffered with a unity gain amplifier and input to an ULTRAD-1280 dual 40 MHZ 12 bit A/D PCI data acquisition board (Ultraview Corporation, Orinda, Calif.) installed, with its own bundled software, in a second Pentium® processor-based personal computer (the "data" computer). In Example 3, described briefly above and in detail below, the HF signal was fed in real time to a digital oscilloscope to generate the tracings shown in FIGS. 13–18. The ULTRAD data acquisition board permits the analogue signal to be sampled, digitized, and written as a bit stream to a binary file on the computer's hard disk, thereafter to be interpreted by software.

In a second modification, a photodiode was inserted into the drive in a position that permitted the diode to interrogate the disk edge during disk rotation. The diode signal was output to the triggering port of the ULTRAD 1280.

This latter modification is not necessary to the practice of the present invention. At a 40 MHZ sampling rate, however, with 12 bits per sample, the data storage needed to record the entire assay disk (74 minutes at 1X speed) would be unwieldy, if not prohibitive. Thus, as described in detail in the Example below, a triggering mark was painted on the edge of the assay disk assembly at a location rotationally earlier than the assay site itself. With each rotation, the photodiode would detect the triggering mark and trigger data acquisition by the sampling card; the duration of sampling, controlled by software, was less than a full rotation, resulting in data files of somewhat more manageable size. As further discussed below, real-time filtering based on image-recognition algorithms that direct storage of preferred data is an alternative, and oft preferred, means of reducing data file size.

If it is determined in step 32 that the data item is operational, it may be determined in step 33 whether the operational data item is the last data item in the record (e.g., an end of data marker). If the number of data items contained in the data record is known, one way that this determination can be made is by counting the data items retrieved in step 31 and comparing the count with the known number. Another way to make this determination is by decoding one or more identifying bits (i.e., a logical synchronization marker) that may be contained within or adjacent to the data item. Yet another way to make this determination is by use of a physical synchronization marker (i.e., an "end of data" marker), as described more fully in U.S. Provisional Application Ser. No. 60/150,288 which is hereby incorporated by reference herein. If the data item is determined to be the last item in the record, control of the process can be returned to a higher level via step 36. Although FIG. 3 shows step 33 after step 32, it will be appreciated that the determination made in step 33 can be made at any time during process 30, including before step 32.

If the operational data item is not the last data item, further processing may be desirable according to this invention. In step 35, for example, the data item could be identified and identification information could be stored for subsequent use by one or more nonoperational data decoding processes (e.g., any of the processes used in steps 37a, 37b, . . . , 37n, where n is an integer). Accordingly, in step 39, one or more of processes 37a, 37b, . . . , 37n could be notified that the information is available.

If the data item retrieved in step 31 is determined to be nonoperational in step 32, its position parameter can be updated (e.g., incremented) in step 34. The position parameter reflects the position of the structure on the disc. In one embodiment, the position parameter is a radial position along a particular track of the optical disc. Once the position parameter is updated, the nonoperational data item can be processed by one or more nonoperational decoding process 37a, 37b . . . , 37n. Although FIG. 3 arranges these processes in series, it will be appreciated that they could also be arranged in parallel, or in a combination. One or more of these processes can be used to decode nonoperational data items in a predetermined or data-dependent sequence.

Figure 4:
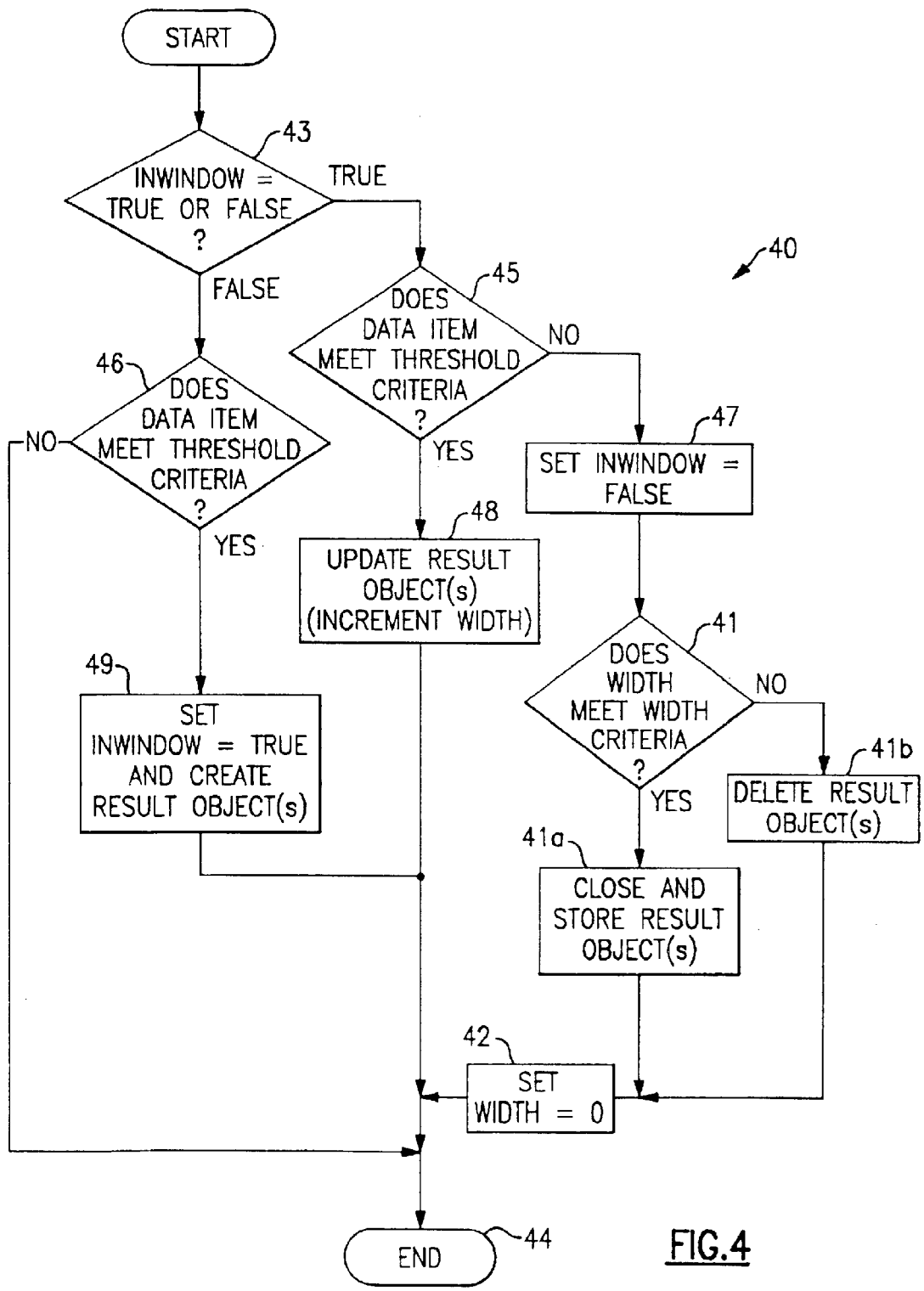
FIG. 4 is a flow chart of steps for carrying out an illustrative embodiment of possible decoding process 40 according to any of steps 37a, 37b, . . . , 37n shown in FIG. 3, where n is an integer.

FIG. 4 is a flow chart of steps for carrying out an illustrative embodiment of possible decoding process 40 according to any of steps 37a, 37b, . . . , 37n shown in FIG. 3.

As discussed above, the data items processed according to process 40 correspond to time- or position-varying data points that represent a varying amount of returned optical energy. As shown in trace chart 172 of FIG. 20, five sets of position-dependent track data are selected and plotted between radial track positions −850 μm and −820 μm. The amplitude in the middle three data sets varies substantially at radial positions between about −835 μm and −825 μm. As described above, certain amplitude variations are believed to be due to the presence of nonoperational structures (e.g., analyte-specific signal elements) on the surface of or contained within the optical disc (e.g., an external or internal surface). The process shown in FIG. 4, then, characterizes these amplitude variations by measuring their width measured above or below a given amplitude threshold. As used herein, the term "width" refers to the time period, or equivalently the radial distance along a track, that the amplitude remains above (or below, depending on the sign of the signal) the amplitude threshold. After the width of a data feature is measured, the width can be used to determine the type of underlying structure (e.g., whether the structure is an analyte-specific signal element or a dust particle), such as by comparing the width to one or more previously identified width values. Such values can be stored in a computer database for automated comparison.

Other characterization methods that can be used in accordance with this invention are Fourier analysis, autocorrelation, and masking.

Returning to process 40, it is determined, in step 43, whether program parameter INWINDOW is true or false. INWINDOW reflects whether the amplitude of a data item satisfies one or more threshold criteria (e.g., is greater or less than an amplitude threshold). Preferably, INWINDOW has a default value of false. In the discussion that follows, when INWINDOW is false, it means that the amplitude of the previously processed data item was less than the amplitude threshold. If INWINDOW is true, it means that the amplitude of the previously processed data item was greater than the amplitude threshold. It will be appreciated that the possible values of INWINDOW could have opposite meanings. See, for example, the discussion of trace chart 172 of FIG. 20, where amplitude thresholds are shown below the baseline, or background level, of each trace.

If INWINDOW is determined to be false in step 43, it is next determined in step 46 whether the current data item has an amplitude that is greater or less than the amplitude threshold. If the amplitude is greater than the amplitude threshold, INWINDOW is set to true and one or more result objects are created. Each result object can be initialized to include positional information, such as the tangential and radial position of the current data. A result object may also include raw data (e.g., one or more data points), quality indicators, structure types, etc. After one or more result objects are created in step 49, control of the process can be returned to a higher level by ending process 40 in step 44 to retrieve another data item. If the amplitude of the item is determined in step 46 to be less than the amplitude threshold, control can be returned to a higher level by ending process 40 in step 44.

It will be appreciated that the amplitude threshold could be positive or negative, depending on the sign of the feature of interest.

Figure 20:
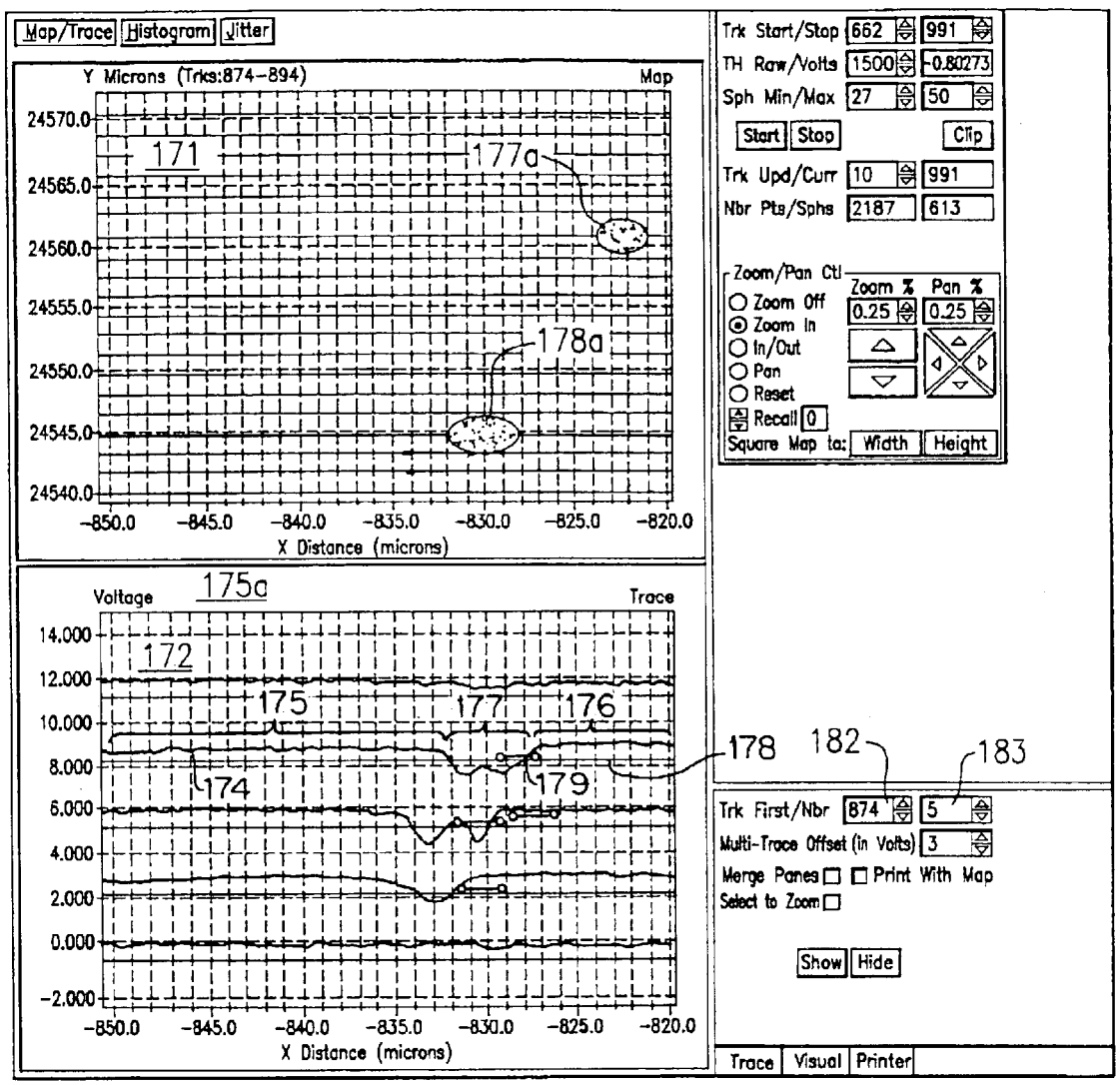
FIG. 20 shows an illustrative embodiment of a graphical user interface, including a map chart and a trace chart, according to this invention.

For example, as shown in trace chart 172 shown in FIG. 20, position-dependent signal 174 includes substantially flat portions 175 and 176 and may include one or bumps and/or dips 177. Although dependent upon the nature of the original data acquisition and storage, a dip typically indicates a decrease in the amount of returned light. To detect such a dip, amplitude threshold 178 preferably has a sign that is the same as the dip and a magnitude that is less than or equal to the dip amplitude (as measured from the flat background portion of the signal). A signal refers to any electrical analog signal generated by a photodetector, or the like, in response to receiving light, and includes, for example, signals derived from a high frequency ("HF") signal, a tracking error signal, a focus error signal, and any combination thereof.

When a data item crosses the amplitude threshold, the trace chart may reflect that cross by including a visual element (such as bar 179).

Conversely, a bump typically indicates an increase in the amount of returned light. As explained more fully below, it is believed that a bump (i.e., an above-baseline signal) may be generated, for example, when a transmissive bead acts as a lens to further focus the incident laser light during reading. To detect a bump, the amplitude threshold preferably has a sign that is the same sign as the bump and a magnitude that is less than or equal to the bump amplitude. As explained above, the sign used to plot the data is arbitrary and could be reversed.

Figure 32A:
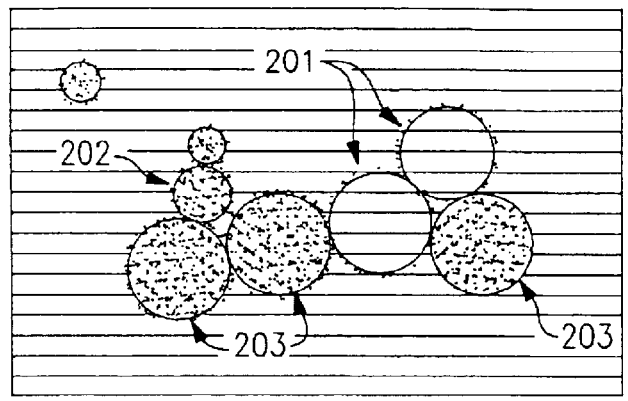
FIG. 32a is a light microscope image of the metal surface of a trackable optical disc, showing an aggregation on the disc's metal surface of beads of disparate size and composition, according to this invention.
Figure 32B:
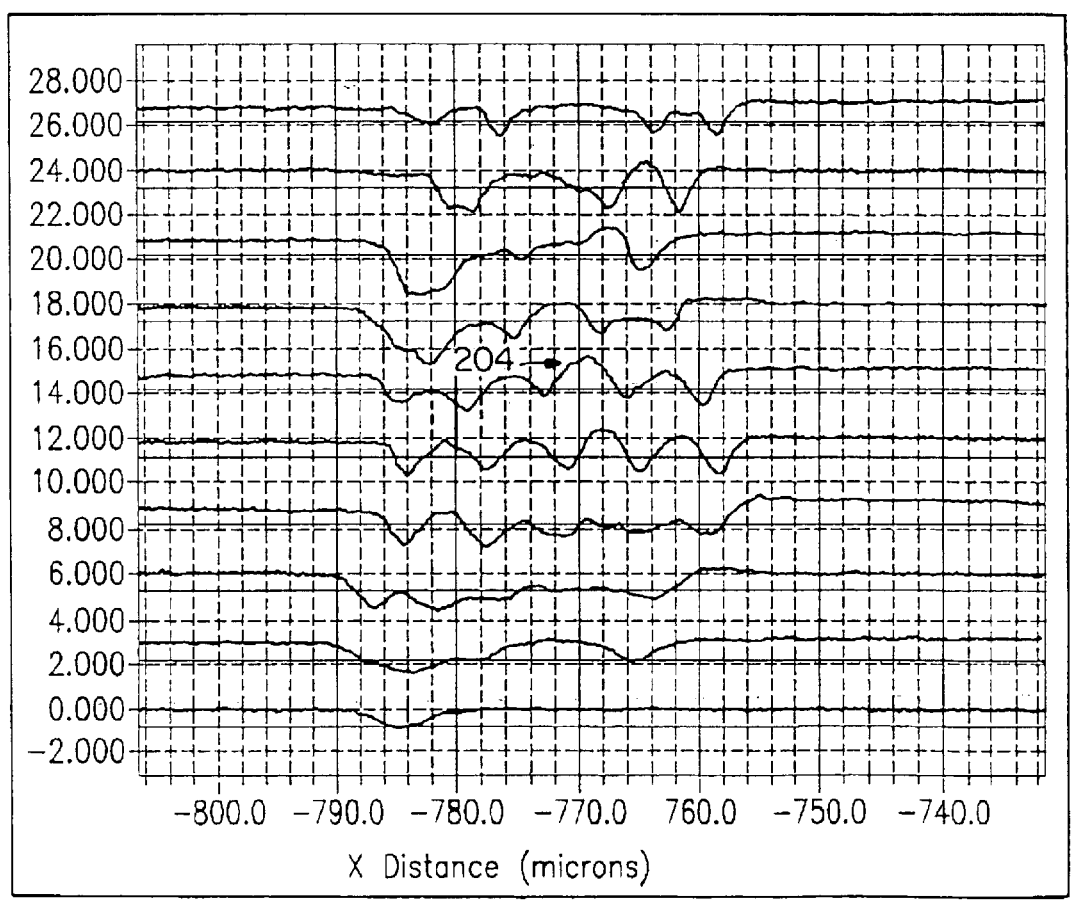
FIG. 32b is a trace chart aligning, in X-axis registration, the electrical responses reported in the buffered HF signal along ten of the tracks that pass through the region of the disc shown photographically in FIG. 32a, according to this invention.

It will further be appreciated that sets of thresholds and/or windows could be used to distinguish data features, particularly when the data features are more complex, such as those shown in FIG. 32b.

For example, if one class of nonoperational data features is known to correspond to data pattern 38a, which includes a combination of two dips of widths W1 and W2 separated by distance D1, that combination can be detected as follows (see FIG. 3a). In a first step, any dips in the data could be identified and stored with their measured widths and position parameters. In a second step, pairs of dips that are separated by distance D1 and having widths substantially equal to W1 and W2 could be selected from all of the identified dips. In another step, the selected pairs could be counted or used for further processing.

An example of further processing could include further distinguishing the selected pairs into subclasses using additional criteria, such as slope of the signal between the dips or the shape of one or both of the dips. For example, as shown in FIG. 3b, data pattern 38b includes a combination of two dips of widths W3 and W4 separated by intermediate distance D2. Some of the data within segment D2 has a deviation that is significantly greater than the data within segment D1. As discussed above, pattern 38b could be detected using an algorithm described above with appropriate threshold criteria. In order to detect the difference between data patterns 38a and 38b, the maximum deviation H of the data within segment D2 can be measured using additional threshold T3, as shown in FIG. 3b, or using any other reference point, such as the baseline. Alternatively, the difference between data patterns 38a and 38b can be detected by measuring width W5 using threshold T3. It will be appreciated that the amplitude deviations measured in FIGS. 3a and 3b use a threshold different from the baseline, those deviations can also be measured from any reference point, including the baseline.

Further processing could also involve analyzing a combination of previously selected data patterns (i.e., a cluster of data features) to determine whether that combination has any reportable property.

This method could also include varying the amplitude threshold and measuring W1, W2, and D1 at different threshold values until an optimal threshold value is obtained. In this way, a more accurate count of the nonoperational features, and therefore the corresponding nonoperational structures, can be made.

These and other algorithms could be stored in a computer database for identifying and classifying detected operational and/or nonoperational data features (e.g., patterns). Therefore, it is a further aspect of this invention to provide a system that includes a computer for processing data according to these identification (i.e., decoding) algorithms and a computer database containing a plurality of these algorithms. The computer can be programmed to run one or more of these algorithms, as desired, to identify one or more nonoperational features and then to report the results of the identification to a user.

Returning to FIG. 4, where only a single amplitude threshold is used, if INWINDOW was determined to be true in step 43, it is next determined in step 45 whether the current data item meets the selection criteria (e.g., whether the amplitude of the current data item is greater than the amplitude threshold). If the criteria are met, one or more previously created result objects can be updated in step 48 to reflect this determination. Once updated, control can be returned to a higher level by ending process 40 in step 44.

If the criteria are not met in step 45, further processing is necessary. When the criteria are not met, the underlying structure no longer provides a sufficiently strong signal. Therefore, in step 47, INWINDOW is reset to false and a WIDTH of the underlying structure (e.g., an analyte-specific signal element) can be calculated (e.g., in units of time or distance). It will be appreciated resetting INWINDOW to false in step 47 could occur at any time before ending in step 44.

In step 41, it is determined whether the value stored in WIDTH meets predefined width criteria. This determination is usually made by comparing WIDTH with one or more time- or position-dependent thresholds. For example, this determination could be based on whether WIDTH is greater and/or less than one or more width thresholds. Typically, a minimum acceptable width and a maximum acceptable width are used together to define a range (i.e., window) of acceptable widths. The width criteria can be selected by the user or by an internal or external process.

If WIDTH meets the width criteria in step 41, one or more of the current result objects can be closed and stored in step 41a. At this point, result objects could be transmitted, posted, or stored for subsequent use or processing.

If the value stored in WIDTH does not meet the width criteria in step 41, current result objects can be deleted in step 41b (or closed and stored for subsequent analysis). Operational data can be stored in result objects as well. After the current result objects are closed, stored, and/or deleted in steps 41a and 41b, WIDTH can be reset to a default value (e.g., null) in step 42, but could at any time after its value is stored. Then, in step 44, control can be returned to a higher level process.

Figure 5:
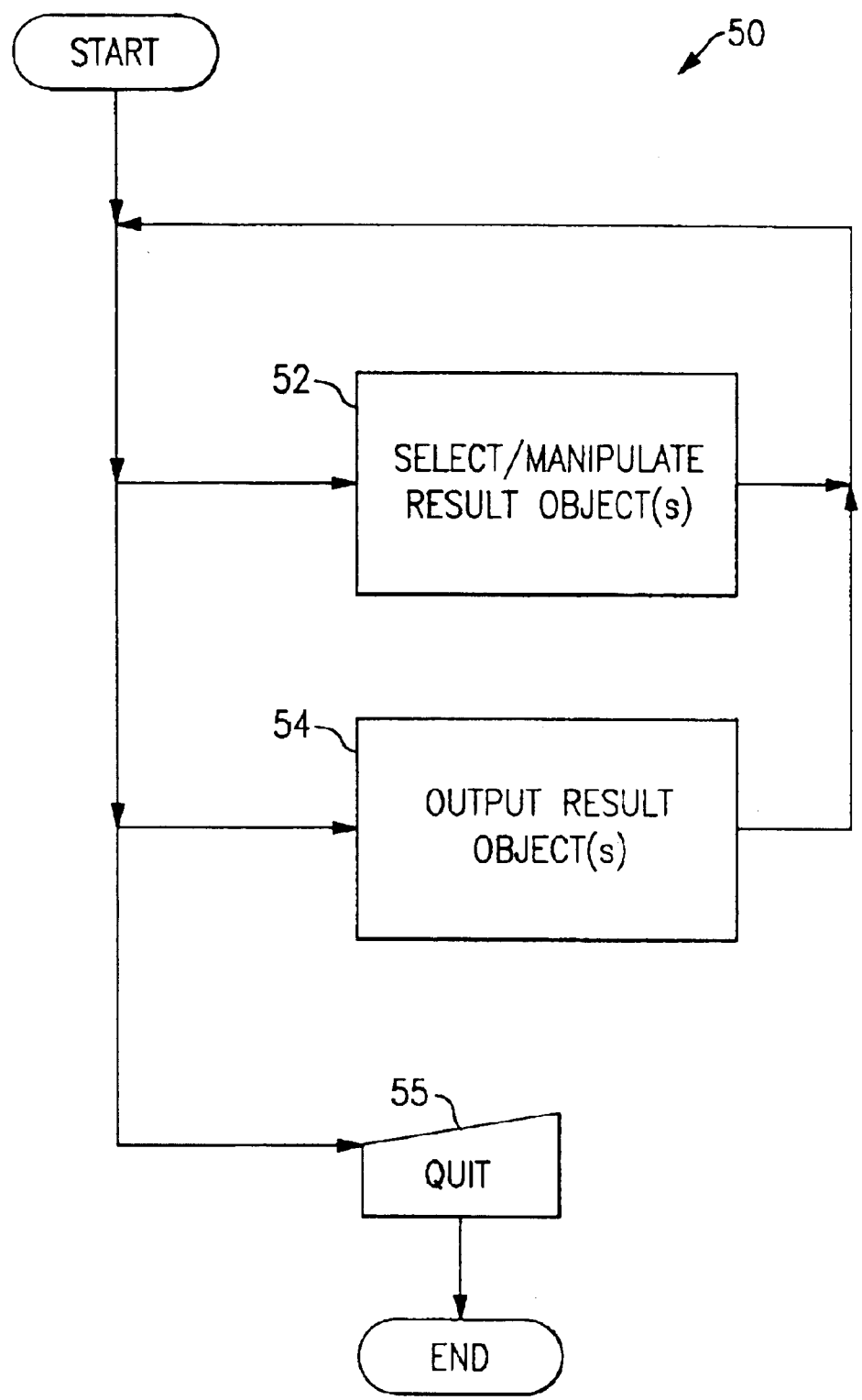
FIG. 5 is a flow chart of steps for carrying out illustrative process 50 of outputting one or more result objects according to step 16 of FIG. 1.

FIG. 5 is a flow chart of steps for carrying out illustrative process 50 of outputting one or more result objects according to step 16 of FIG. 1.

In process 50, a graphical user interface for selecting, manipulating, and outputting result objects is provided. In step 52, a user can select and/or manipulate one or more previously created result objects. Selection of result objects typically involves designating one or more preexisting result objects, but could involve designating result objects that are in the process of being created, such as according to process 40. Manipulation of result objects could include any number of conventional graphical processes, including, for example, zooming, panning, resizing, etc. In step 54, a user can output one or more current result objects, which may be composite objects in accordance with this invention. Outputting result objects can include storing them as files, displaying them on a display screen, and/or printing them on any printing medium (e.g., paper). FIG. 5 indicates that either of steps 52 and 54 can be performed repeatedly, and in any combination, as desired. At any time during process 50, a user may elect to quit in step 55. It will be appreciated that process 50 could be run according to this invention as an entirely separate thread or process.

Figure 6:
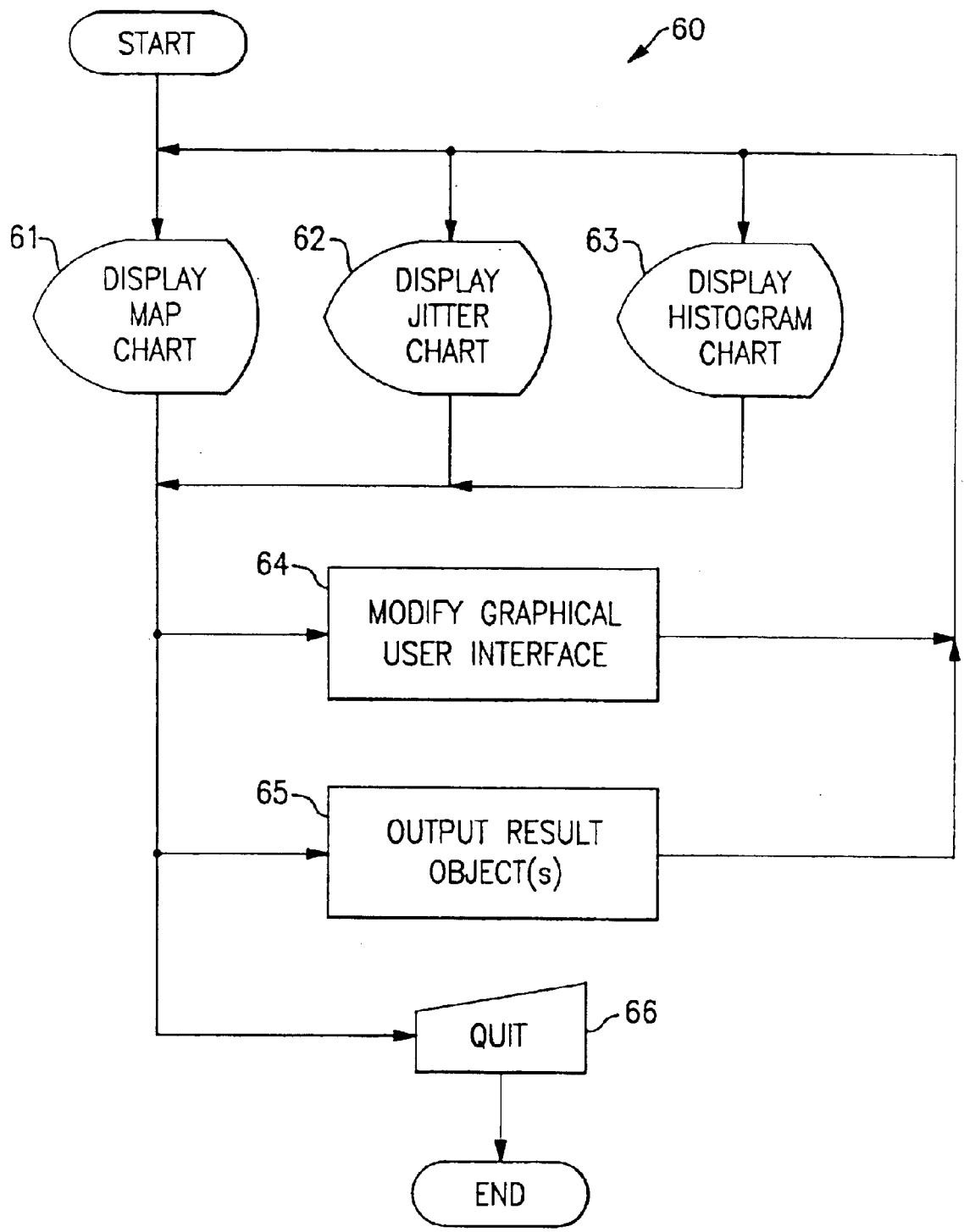
FIG. 6 is a flow chart of steps for carrying out an illustrative embodiment of process 50 according to this invention.
Figure 35:
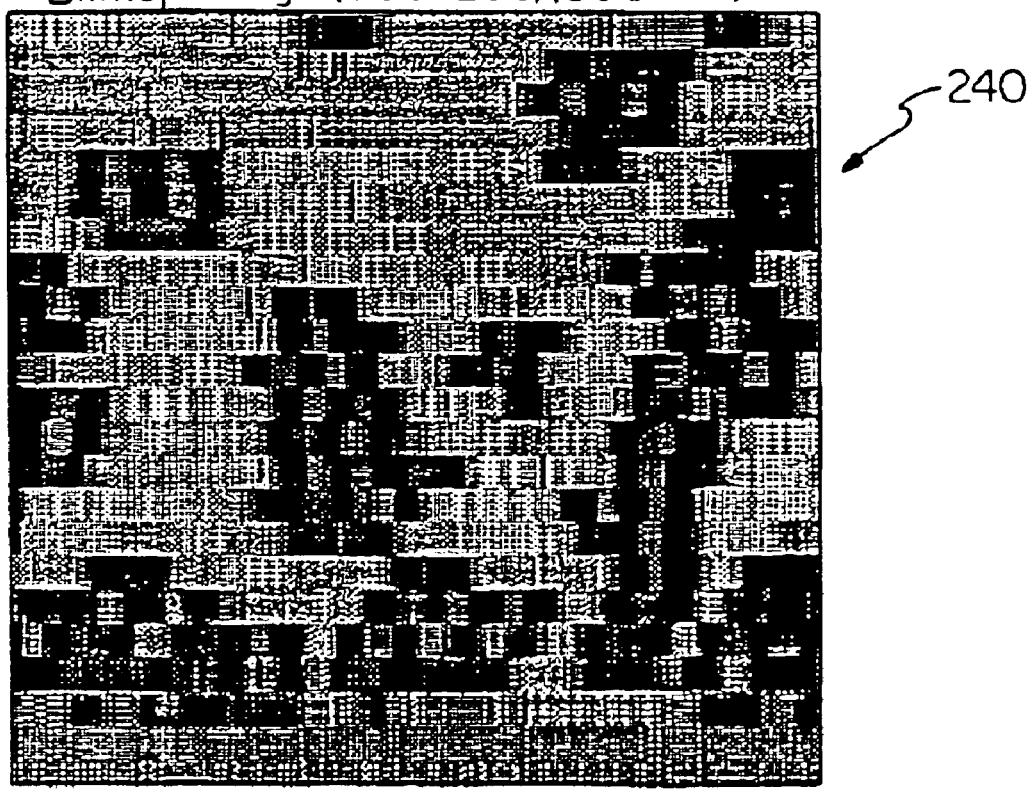
FIG. 35 shows an image chart that corresponds to the wobble tracks that pass through the boxed area of the disc shown in FIG. 33, according to this invention.

FIG. 6 is a flow chart of steps for carrying out an illustrative embodiment of process 50 according to this invention. Although any number of result objects can be created and displayed according to this invention, three composite result objects, which were created according to this invention, are described in detail below. The three result objects include a map chart, which can be displayed in step 61, a jitter chart, which can be displayed in step 62, and a histogram chart, which can be displayed in step 63. As explained more fully below, FIG. 8, for example, shows user selectable buttons 101, 102, and 103, which are labeled "Map/Trace," "Histogram," and "Jitter," respectively, for displaying respective charts in steps 61–63. Each of these result objects were designed to capture different aspects of data retrieved in step 13 of FIG. 1. It will be appreciated that other result objects can be designed to capture other aspects of the data, including, for example image chart 240, as shown in FIG. 35.

A "map" chart is a result object that can be used for graphically displaying operational and nonoperational features as a function of position. In one embodiment, the features are superimposed on a schematic of an optical disc. Examples of operational data features that have been used according to this invention include track markers and data collection start and stop markers. Examples of nonoperational data features include data features that corresponds to nonoperational structures, such as beads. It has been found that a map chart displayed in accordance with this invention is useful for finding spatially-dependent correlations between mapped features on nearby (e.g., adjacent) tracks and for finding other qualitative relationships between such data features.

Figure 11A:
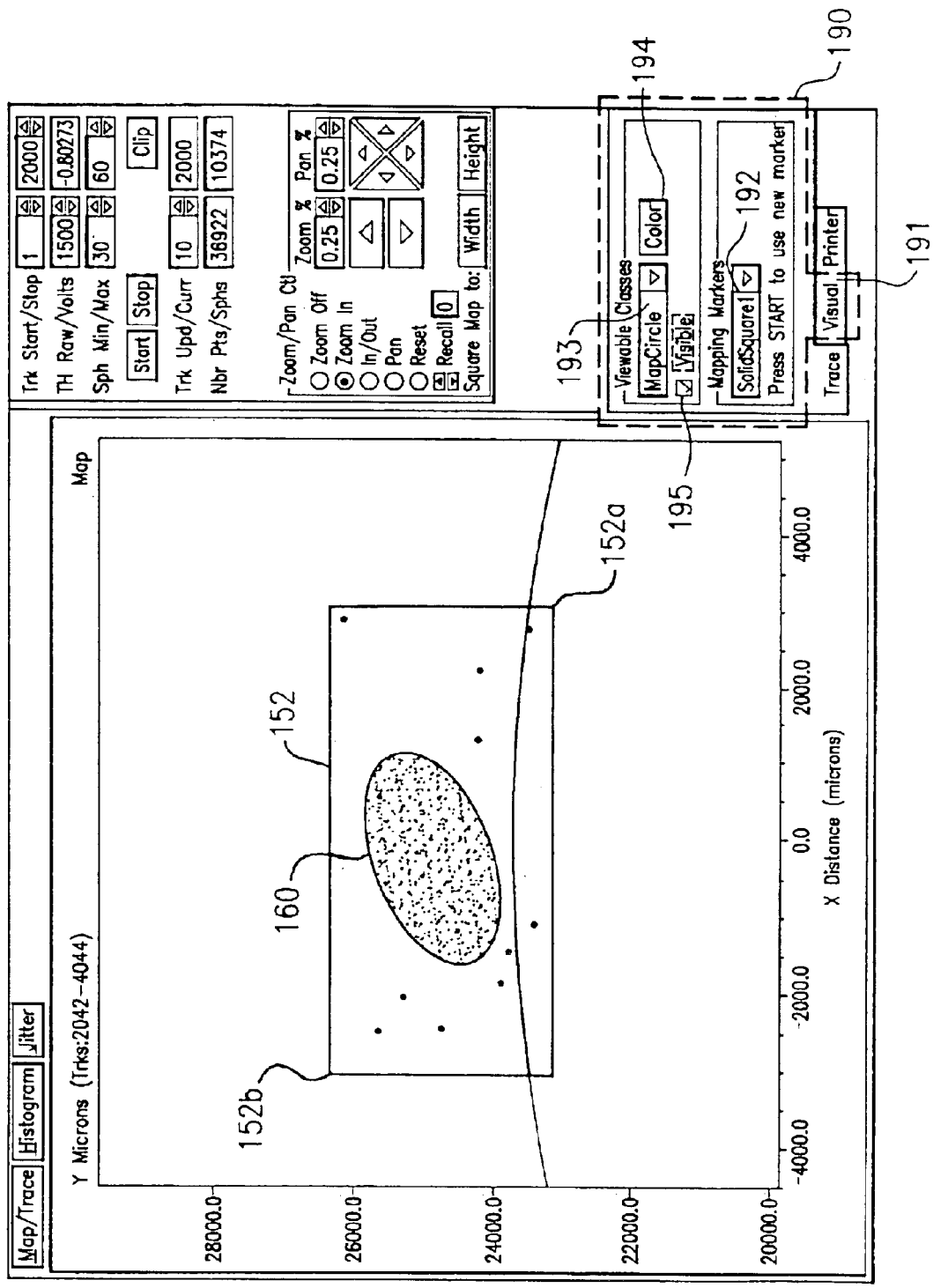
FIG. 11a shows a zoomed region of the same map chart shown in FIG. 10 according to this invention.
Figure 11B:
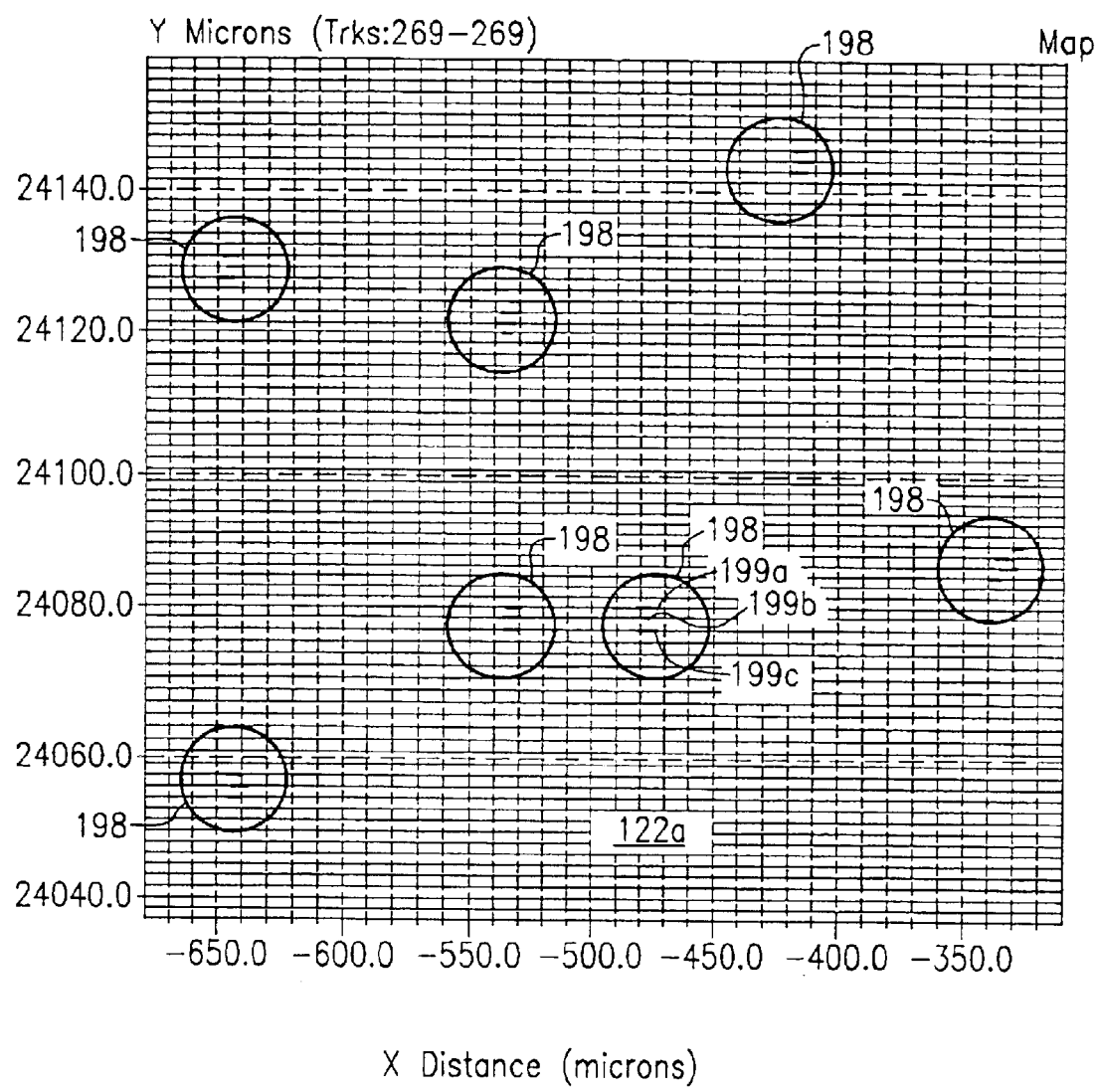
FIG. 11b shows a zoomed region of a map chart including seven clusters, each of which includes three or four distinct features according to this invention.

For example, a map chart (and/or a "trace" chart, which is discussed more fully below) can be helpful in determining whether multiple amplitude variations on two or more adjacent tracks correspond to a single, underlying structure. This could occur, for example, when a single nonoperational structure, such as an analyte-specific signal element (e.g., a bead), is sufficiently large to produce amplitude variations (i.e., a cluster of amplitude variations) on two or more tracks. A "cluster profile" characterizes the spatial arrangement, magnitude, and/or shape of such amplitude variations. It has been discovered that different types of signal elements can produce different cluster profiles. Therefore, according to this invention, data that includes a cluster of amplitude variations can be compared, using any conventional comparison technique, with one or more known cluster profiles in order to identify the type of underlying structure. As mentioned above, map and/or trace charts can be used to visually identify clusters. FIG. 11*b*, for example, is a zoomed-in map chart 122*a* that shows seven clusters 198, each of which includes three or four distinct features (e.g., features 199*a*, 199*b*, and 199*c*).

As described briefly above with respect to distinguishing complex data features, an automated process can be used to identify unknown clusters appearing in the data. One example of such an automated process includes detecting and/or identifying a first data feature (e.g., according to process 40) using a first set of criteria (e.g., amplitude and width criteria), and then detecting and/or identifying a second "local" feature using a second set of criteria. If a known cluster profile includes three or more features, the automated process for identifying such a cluster can include additional detection steps. Once again, these data features correspond to physical structures and that the term local could be either refer to the real physical position of the underlying structure of the mapped physical representation of the data feature.

As used herein, a local feature is one that is in close physical proximity to another feature. Close physical proximity can be defined using any convenient selection rule. For example, a structure may be considered local if it is found in a physical region defined with respect to the position of the first structure. A local physical region could be a substantially two-dimensional physical surface or a three-dimensional volume of physical space. Alternatively, a structure may be local if the mapped feature is within, or located at, a specified radial or tangential distance from the first structure (i.e., mapped feature) or located at a specified angular orientation with respect to the track or plane of the first structure (i.e., mapped feature). For example, local features might be only those mapped features located in the radial plane at 0° and 180° measured from the track of the first mapped feature. Then, only features on the first track would be considered local. Alternatively, local features may be only those located in the radial plane between 0° and 180° from this track. Then, only structures located on one side of the track in the radial plane would be considered local.

It will be appreciated that a cluster of data features could appear in the data when two or more discontinuous data features (e.g., patterns) correspond to different structures (e.g., different physical portions of a single bead, multiple coupled beads, etc.) positioned about 360° apart (e.g., on adjacent turns) of a spiral track. It will be further appreciated that any useful selection rules could be used to identify such clusters and that the "local" definitions described above are merely demonstrative. It will be further appreciated that two or more of these selection rules could be used in combination, as necessary.

A "histogram" chart is an example of a result object that can be used for graphically displaying (i.e., in a histogram) information regarding nonoperational structures. In particular, it has been found that a histogram chart displayed in accordance with this invention (such as the one shown in FIG. 12) can be useful for determining appropriate amplitude thresholds, such as for use in process 40 of FIG. 4.

Figure 12:
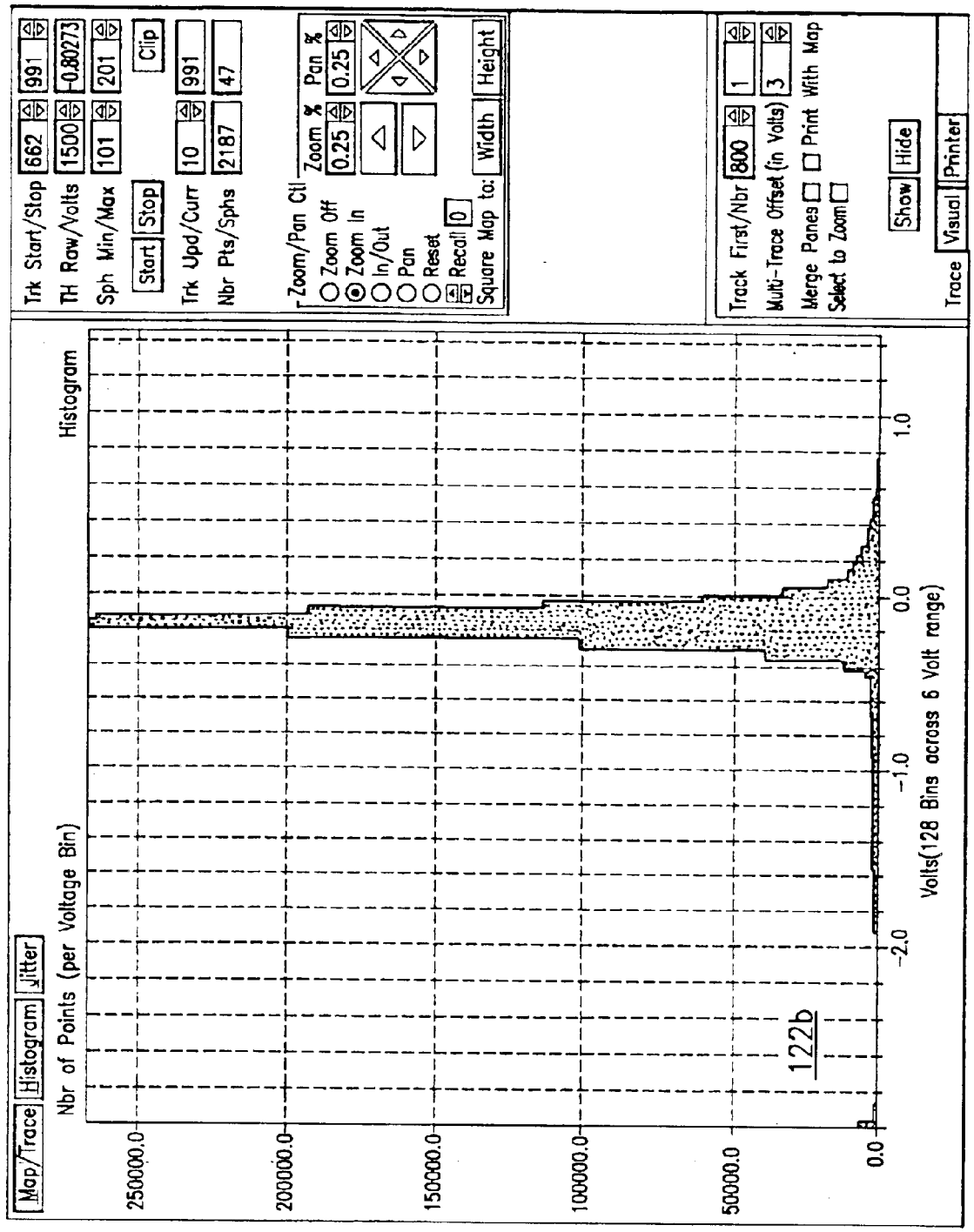
FIG. 12 shows an illustrative embodiment of a graphical user interface with a histogram chart according to this invention.

For example, FIG. 12 shows a histogram chart in which each segment (i.e., bin) along the X-axis corresponds to a range of amplitudes for all data points. FIG. 12, then, shows that the majority of the sample data points is just above −0.6 volts. This helps to determine the threshold that can be used to separate random noise from the features of interest. The goal, then, could be to set the threshold as low as possible without processing an inordinate amount of data points. Thus, if the threshold were set to only count features below −0.6 volts, then, according to FIG. 12, the majority of the data would not be processed.

A "jitter" chart is another example of a result object that can be created and output according to this invention. A jitter chart may be used for graphically displaying (e.g., in a histogram) jitter. Jitter normally refers to any rapid variation in the amplitude, frequency, or other characteristic of a signal, including, for example, variation in the width of data features. Process 40 of FIG. 4 shows one way to detect data features and to determine widths for a given data set.

Figure 13:
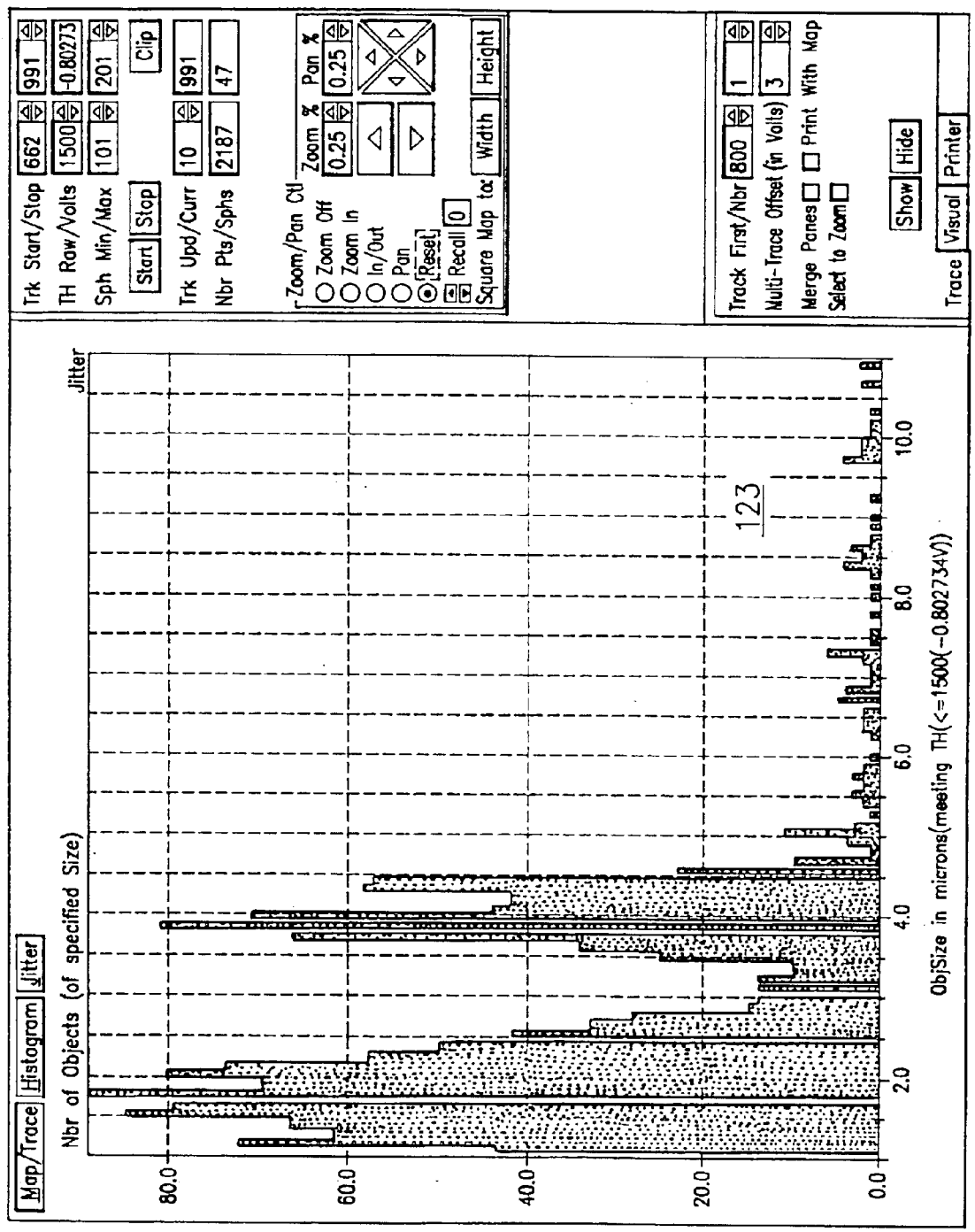
FIG. 13 shows an illustrative embodiment of a graphical user interface with a jitter chart, according to this invention.

FIG. 13 shows jitter chart 123, in which each segment (i.e., bin) along the X-axis corresponds to a range of detected feature widths. It has been found that display of a jitter chart in step 62 can be useful for determining minimum and maximum acceptable widths. For example, FIG. 13 shows a collection of features between about 3.4 $\mu$m and about 4.6 $\mu$m. If the same range is chosen by setting the minimum and maximum acceptable widths to 3.4 and 4.6 $\mu$m, substantially the entire collection could be accurately counted.

Returning to FIG. 6, a user is provided with an ability to modify and output result objects, which may already be displayed, in steps 64 and 65. These steps have already been described to some degree with reference to steps 52 and 53, so their description here is abbreviated. Modifying in step 64 can include, for example, selecting, zooming, and panning result objects. In a preferred embodiment, a user can manipulate global aspects of the result objects. Zoom level and pan position are examples of global aspects because they can be used with more than one result object. In step 65, one or more result objects (or components thereof) can be output as desired.

Figure 7:
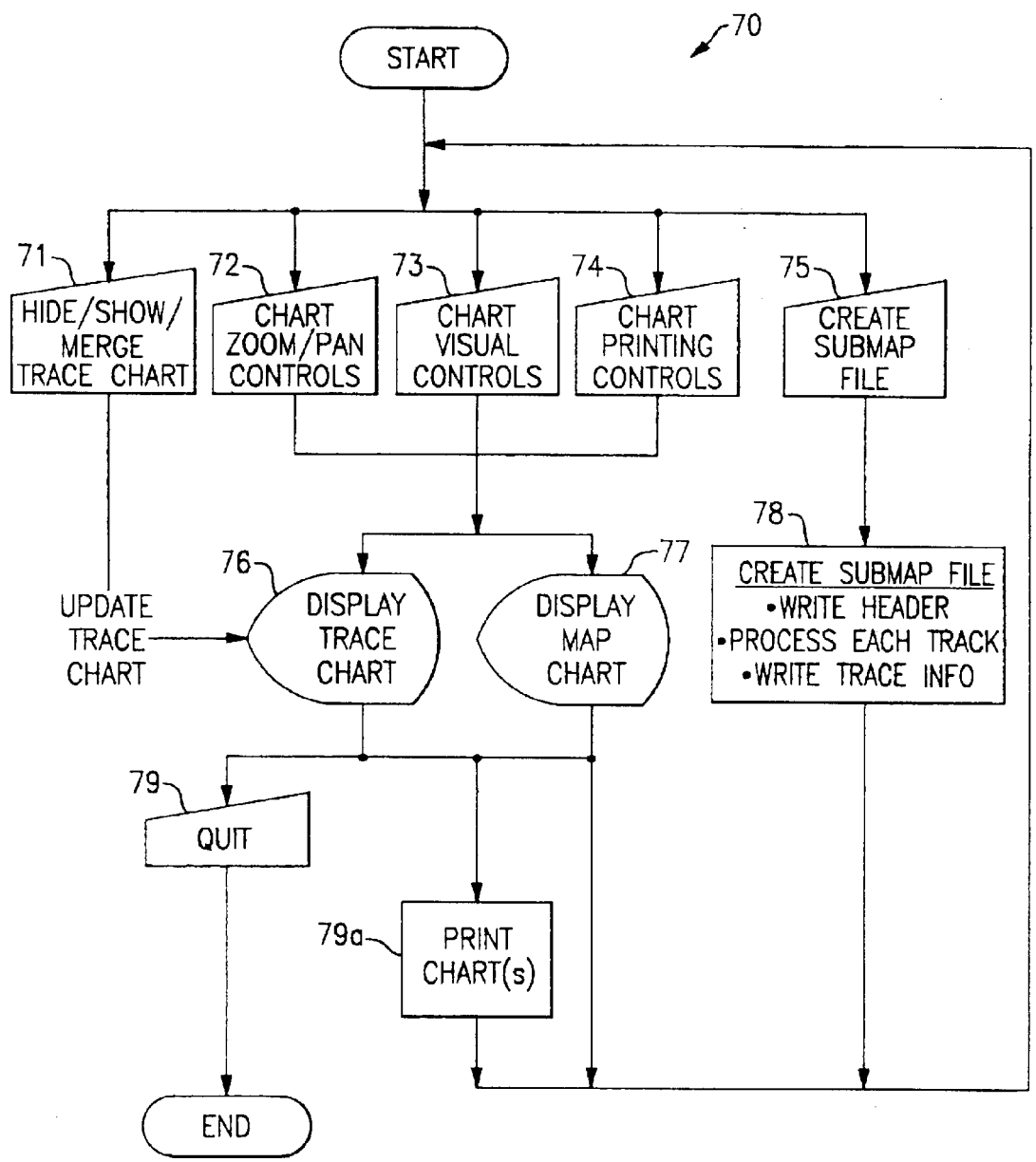
FIG. 7 is a flow chart of steps for carrying out process 70, which is an illustrative embodiment for outputting a map chart (and an optional trace chart) according to step 16 of FIG. 1, step 54 of FIG. 5, or step 61 of FIG. 6 of this invention.

FIG. 7 is a flow chart of steps for carrying out process 70, which is an illustrative embodiment for outputting a map chart (and an optional trace chart) according to step 16 of FIG. 1, step 54 of FIG. 5, or step 61 of FIG. 6 of this invention.

In step 71, a user is provided with a number of control options associated with a trace chart, such as trace chart 172 of FIG. 20. Although these options are only for use with a trace chart in the example shown, these options can also be used with any other result object, if desired. A trace chart displays raw or processed data. For example, as shown in FIG. 20, trace chart 172 displays the raw data that underlies certain features shown in map chart 171.

Figure 8:
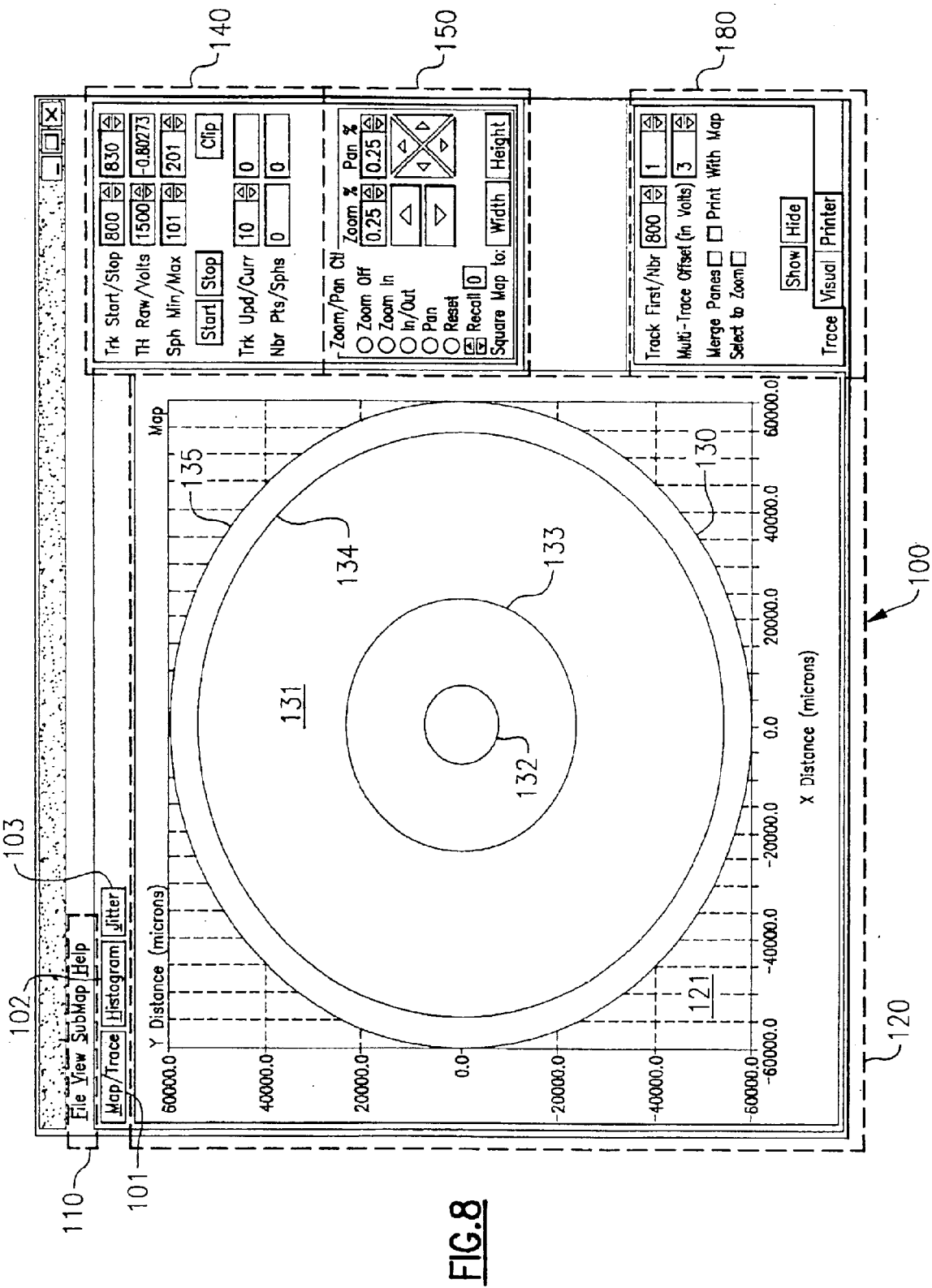
FIG. 8 shows an illustrative embodiment of initial graphical user interface screen 100 according to this invention.
Figure 8A:
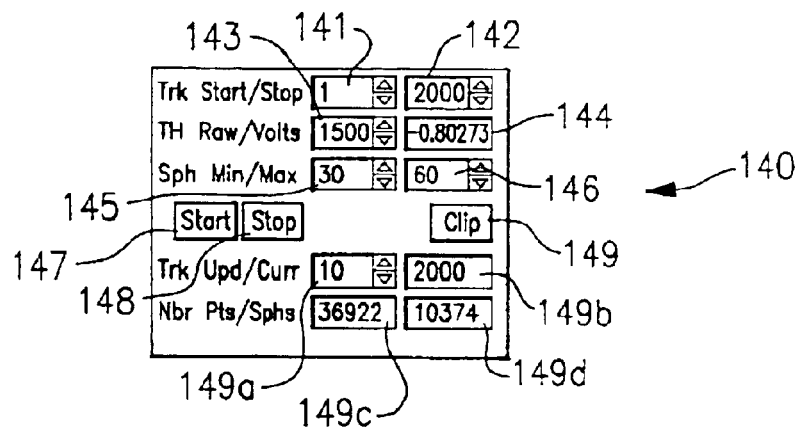
FIG. 8a shows an illustrative embodiment of panel 140 shown in initial graphical user interface screen 100 of FIG. 8 according to this invention.
Figure 8B:
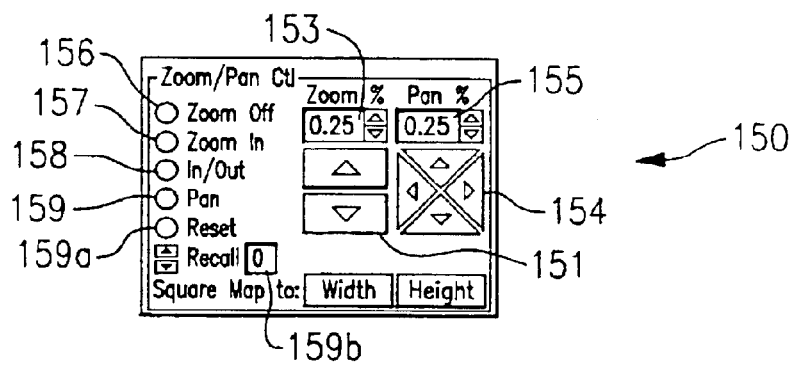
FIG. 8b shows an illustrative embodiment of panel 150 shown in initial graphical user interface screen 100 of FIG. 8 according to this invention.
Figure 8C:
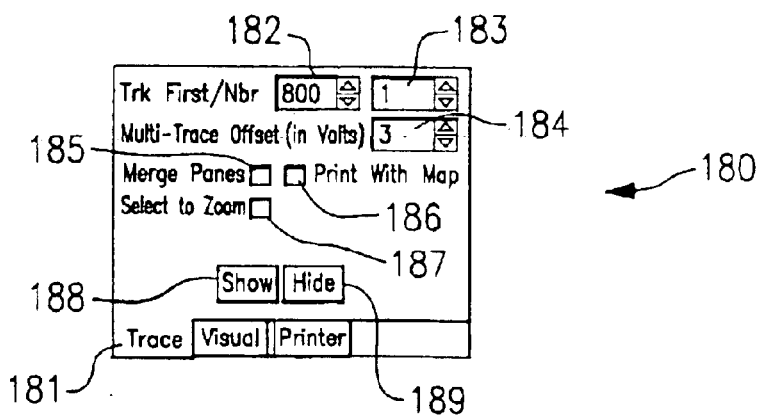
FIG. 8c shows an illustrative embodiment of panel 180 shown in initial graphical user interface screen 100 of FIG. 8 according to this invention.

Trace options can be provided to a user in step 71. As shown in FIG. 8 (best in FIG. 8c), these options may be provided to a user in trace region 180 when trace tab 181 is selected, or, alternatively, be permanently available (not shown). It will be appreciated that the exact positions of trace region 180 and trace options 182–189 are merely illustrative.

Located at the top of trace region 180 is "Track Frst/Nbr," which identifies first trace track 182 and trace number 183. As shown in FIG. 20, track 182 is the first trace displayed in trace chart 172. Trace number 183 is the number of tracks displayed in trace chart 172. Together, first track 182 and trace number 183 define the range of traces (i.e., tracks) included in trace chart 172. This range may be useful because it can include substantially fewer tracks than are shown in map chart 171. By choosing an appropriate range, a user can display a convenient subset of tracks for detailed analysis of raw or processed data. In one embodiment, the tracks included in the trace chart can be highlighted, or otherwise identified, in the map chart.

Figure 19:
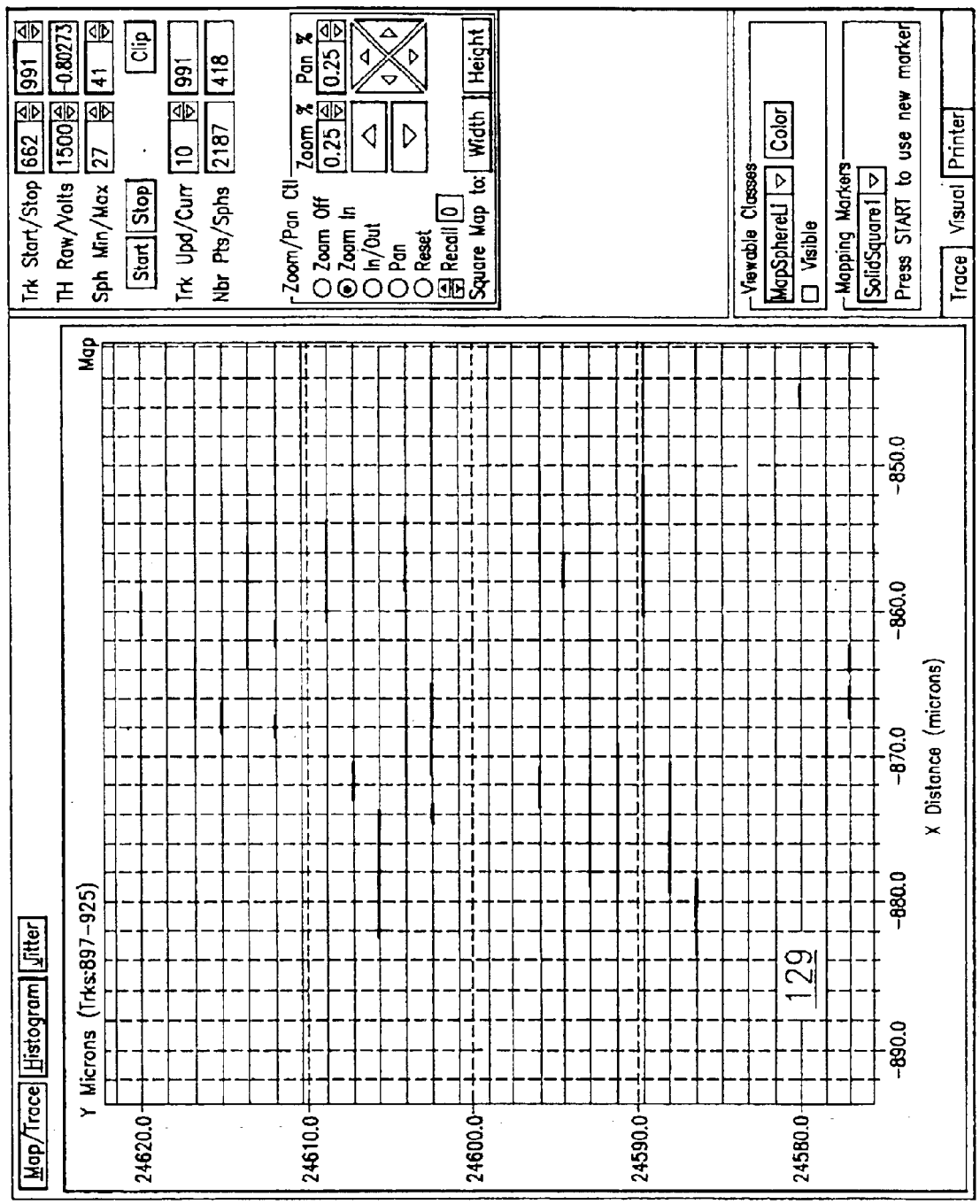
FIG. 19 shows an illustrative embodiment of a graphical user interface, including yet a further map chart, according to this invention.

"Multi-Trace Offset (in Volts)" identifies offset 184 and is located in trace region 180. Offset 184 contains a value in volts that determines the vertical distance between successive traces of trace chart 172. Without an offset, all of the traces would be superimposed on top of one another. "Merge Panes" identifies merge button 185. When selected, merge button 185 eliminates space 175 between map chart 171 and trace chart 172, causing the two charts to merge (not shown). This allows more resolution and space for displaying map and trace charts by eliminating "dead" space between the two charts. "Print with Map" identifies print button 186. When button 186 is selected, trace chart will automatically print when a map chart prints. "Select to Zoom" identifies zoom button 187. When selected, a user is provided with an opportunity to select with a pointing device (e.g., a mouse) a region (i.e., subset) of map chart for display in a trace chart without specifying the first trace track and number of traces. "Hide" and "Show" identifies Hide and Show Trace buttons 188 and 189. When a map chart is being displayed in accordance with this invention, "Show" button 188 provides a user with an ability to simultaneously display a trace chart. Alternatively, "Hide" button 189 provides a user with an ability to not display a trace chart. In FIG. 20, for example, map chart 171 is displayed simultaneously with trace chart 172. In FIG. 19, map chart 129 is displayed without a trace chart. Although a trace chart can be linked to a map chart in one illustrative embodiment of this invention, it will be appreciated that the trace chart and the map chart need not be linked and could be displayed separately.

In step 72, a user is provided with a number of zoom and pan control options for displaying result objects according to this invention. As shown throughout FIGS. 8–20, these options may be used with any type of result object, including map and trace charts, histogram charts, and jitter charts. The location and functions of these zoom and pan control options are shown and described below.

In step 73, visual options are provided to a user. These options can be made provided in a visual control, such as panel 190, when visual tab 191 is selected (FIG. 11). It will be appreciated, however, that a graphical user interface according to this invention could provide visual control options to a user at any time, if no such tab were used. When a current result object is a composite one, visual control panel 190 may allow a user to select one or more component result objects (e.g., viewable classes) for individual or combined display.

Rather than display data, a map chart replaces raw or processed data (e.g., that correspond to particular nonoperational structures) with mapping markers. A mapping marker is used to identify any discernible feature in the data, including, for example, a single data item, a group of data items, or a cluster of features. Mapping markers of any type can be used according to this invention, including the solid squares shown in FIG. 11. Preferably, the type of markers displayed is user-selectable. Some of the different types of markers that may be selected and displayed on a map chart include, but are not limited to, solid and open squares (e.g., "■" and "□") solid and open diamonds (e.g., "♦" and "◊"), solid and open circles (e.g., e.g., "●" and "○"), up and down carets (e.g., "^" and "ˇ"), etc. Furthermore, markers of different types, sizes, and colors can be displayed simultaneously on a single map chart to identify and differentiate between different types of data features. "Mapping Markers" identifies marker type 192 in visual panel 190. In FIGS. 10, 11, 14–20, "Solid Square1" is the selected type of mapping marker, and is used for display in their respective map charts.

Features can be grouped into viewable classes for inclusion in result objects and output, such as in map charts. An example of a viewable class is the set of features that meets specific selection rules (e.g., width criteria). Map charts can then display the selected viewable class by replacing the data corresponding to selected features with viewable elements. Any type of viewable element can be displayed in map charts in accordance with this invention, including, for example, circles, lines, spheres, ellipses, etc. Preferably, the type of viewable classes displayed is user-selectable. Some of the different types of viewable classes that may be selected (e.g., as shown in FIGS. 10, 11, 14–20) and displayed in a map chart include, but are not limited to, "MapBounds," "MapCircle," "MapTrack," "MapTracedTrack," "MapPoint," "MapSphereEllipse," "MapSphereCircle," "MapsphereLine," "MapObectLine," "TraceLine," "TraceThreshold," etc. Each viewable class can be defined differently and, when used to create a map chart, can provide a user a unique different way to view the data. As shown in the FIGS., the ability to select a particular viewable class can be provided on visual panel 190 as viewable class 193 and is identified by "Viewable Classes." "Color" button 194, when selected, provides the user to select one or more colors.

Rather than displaying viewable classes on a map chart, another embodiment according to this invention displays raw or processed data on a map chart. In this case, data are not replaced with viewable elements. Rather, raw or processed data are superimposed on a representation of an optical disc, which allows a user to analyze representations of mapped data. Such analysis can be facilitated with one or more image processing features (e.g., smoothing, amplification, etc.).

Figure 14Q:
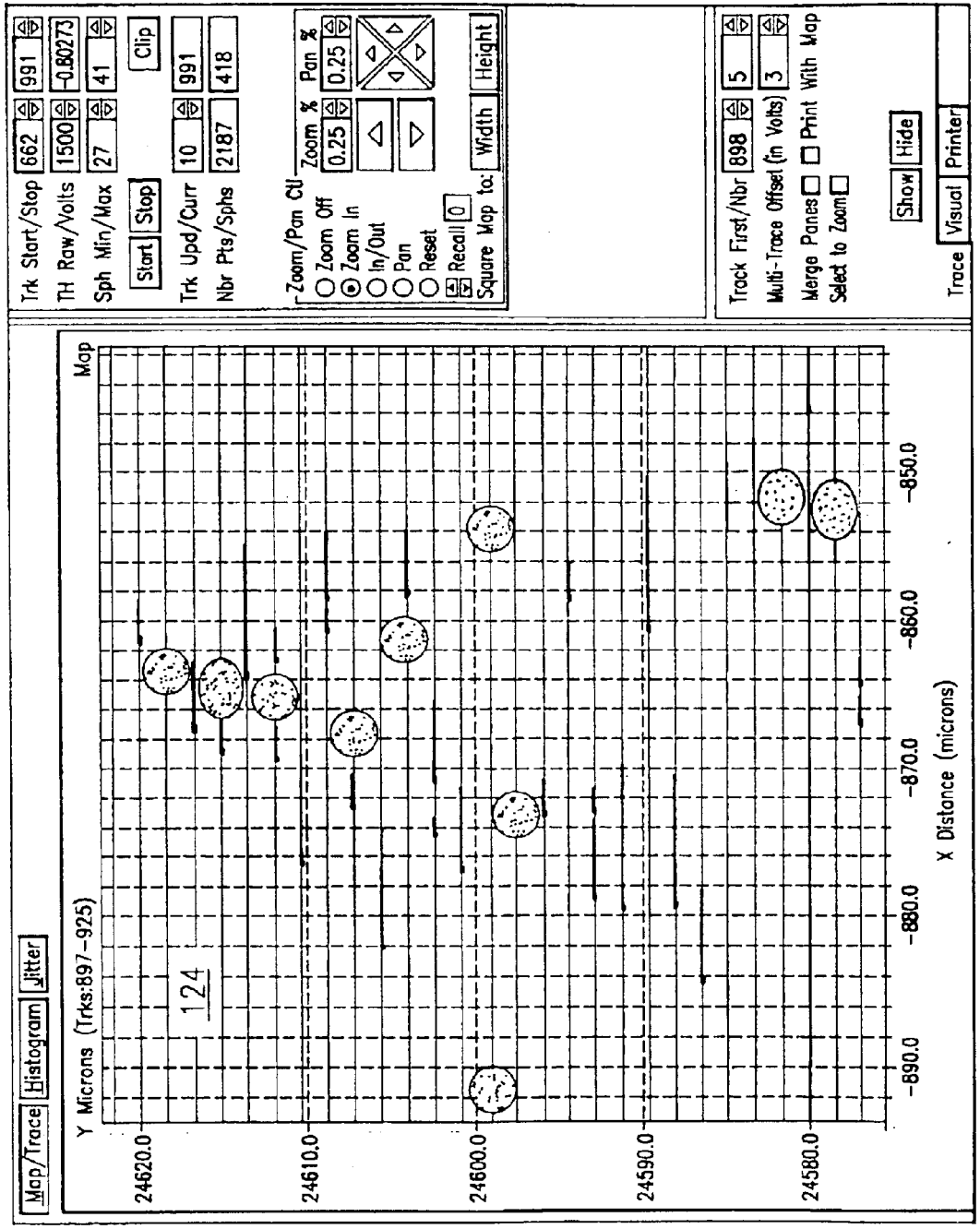
FIG. 14a shows an illustrative embodiment of a graphical user interface, including a map chart, according to this invention.
FIG. 14b shows an illustrative embodiment of a printer panel for use in a graphical user interface according to this invention.
Figures 9, 14B:
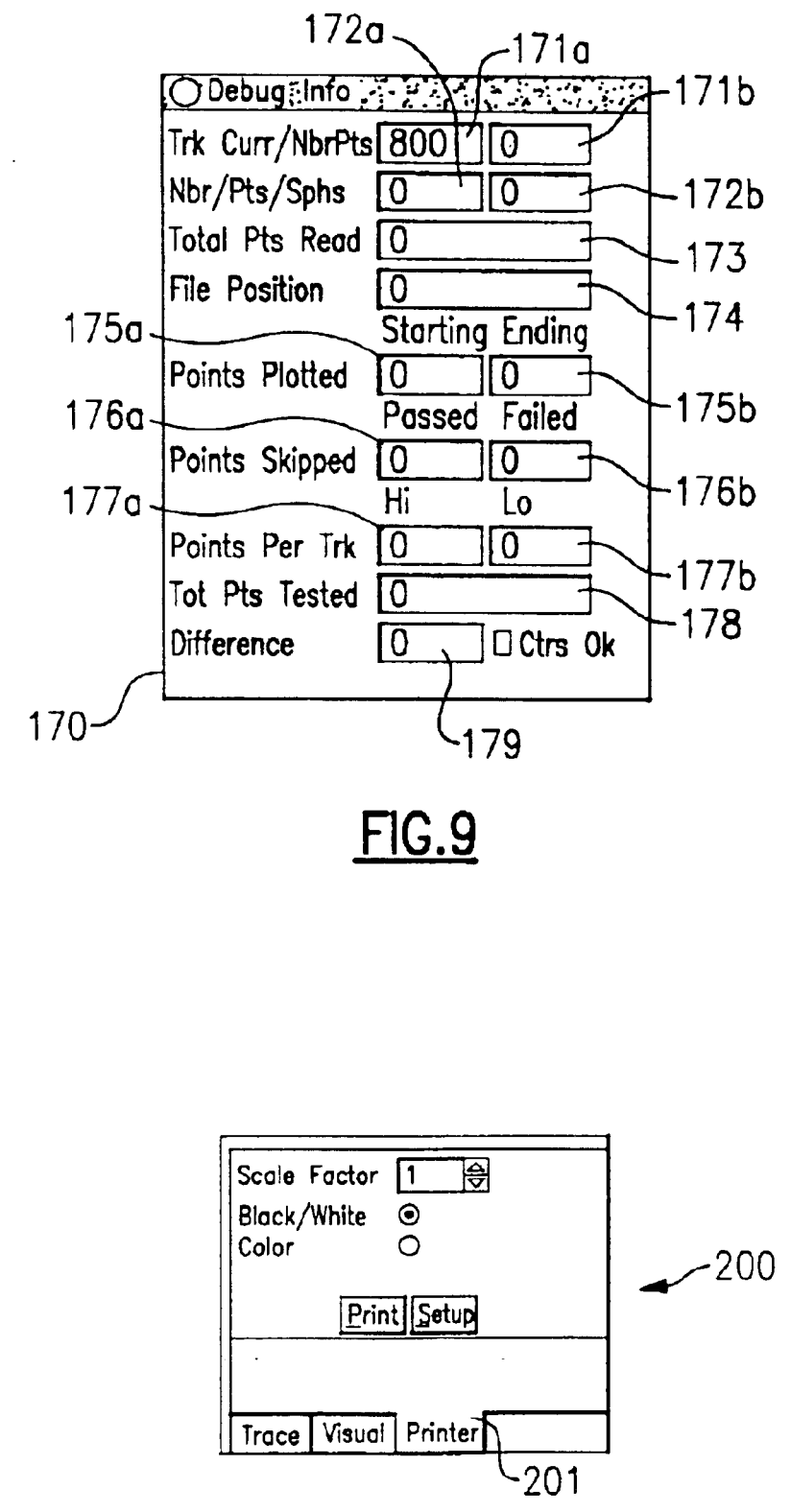

As shown in FIG. 14b, printing options are provided to a user in step 74 with "Print" and "Print SetUp" buttons, possibly on printer panel 200 when printing tab 201 is selected. Alternatively, printing options can be provided to a user on a drop down menu.

After any of steps 72, 73, and 74, a map chart may be displayed in step 76, with or without a trace chart in step 77, in accordance with the particular display options selected (e.g., whether "Hide" button 188 or "Show" button 189 is engaged). After selected result objects are displayed in steps 76 and 77, a user can repeat the process by immediately returning to the beginning of process 70 or by printing the map and/or trace chart(s) in step 79*a* directly. In step 79, a user may select to exit process 70.

Alternatively, a user may be provided an opportunity to create a submap file in step 75, such as by modifying a current map chart and then saving the modified object. This opportunity could be made available to a user when the user selects "file" and then "Save" (see below). In one embodiment, the user is provided with an ability to specify a submap filename and header information, and to process map data and trace information.

Illustrative embodiments of graphical user interfaces according to the present invention, showing various features and options, are shown in FIGS. 8–20. Because many of the features of this invention have already been described in some detail above, the description of the graphical user interface that follows is somewhat abbreviated.

FIG. 8 shows an illustrative embodiment of initial graphical user interface screen 100 according to this invention.

Region 110 of screen 100 includes a number of Windows™-based options, including "File," "View," "SubMap," and "Help." When selected, these options provide a user with a drop-down menu that includes additional details or options.

When "File" is selected, a drop-down menu may be provided to a user. Such a drop-down menu can contain various file-related options, including "Open," "Save," "Print," and "Print Setup." An "Open" option can be one way to initiate data retrieval according to step 13 of FIG. 1. "Save" and "Print" options can be used to initiate data analysis and output in steps 14 and 16 of FIG. 1. A standard option that may be further included in such a drop down menu, even though unrelated to file activities, is the self-explanatory "Exit" button.

When "View" is selected, a drop-down menu can be provided to a user. Such a drop-down menu can contain various result object viewing options, including "Map," "Trace," "Histogram," "Jitter," and "Debug Information." When "Map," "Trace," "Histogram," or "Jitter" is selected, the respective chart(s) may be displayed in charting region 120. As explained above, another way to display these charts is through user selectable buttons 101, 102, and 103. "When "Debug" is selected, a debug information panel, such as panel 170 of FIG. 9, may be provided. Some of the information that can be included in panel 170 is current track being processed and number of data points processed (i.e., "Trk Curr/NbrPts") 171*a* and 171*b*, number of features detected and number of these features that meet the width criteria, i.e., identified as spheres ("Nbr Pts/Sphs") 172*a* and 172*b*, total number of data points read from the file ("Total Pts Read") 173, current position of the data file in bytes ("File Position") 174, starting and ending points plotted in the chart ("Points Plotted") 175*a* and 175*b*, number of skipped points passed and failed ("Points Skipped") 176*a* and 176*b*, high and low numbers of points per track ("Points Per Trk") 177*a* and 177*b*, total number of data points tested during processing ("Total Pts Tested") 178, and difference between the number of detected features and number of those features determined to correspond to spheres ("Difference") 179.

When "Submap" is selected, a drop-down menu may also be provided to a user that contain one or more options relating to a subset of the map chart, including "Save" and "Restore." The "Save" option can be one way to initiate data storage according to steps 75 and 78 of FIG. 7. The "Restore" option can be used to retrieve previously stored data or result objects, such as according to step 13 of FIG. 1.

In FIG. 8, no data are displayed in map chart 121. In this embodiment, and as explained in more detail above, a map chart can be used to map result objects (e.g., that may include operational and/or nonoperational data) onto optical representation 130. For this purpose, the concentric circles superimposed on chart 110 depict various physical and/or logical boundaries of disc 130. For example, innermost circle 132 may depict the outermost circumference of the mounting ring of disc 130, with circle 135 depicting the outer diameter of optical disc 130. Circle 133 may depict the stacking ring or, alternatively, may depict the innermost edge of data storage region 131, commonly referred to as the "lead-in" boundary. Similarly, circle 134 will often depict the outermost edge of data storage region 131 and is, in such cases, sometimes referred to as the "lead-out" boundary. The x and y axes of chart 120 are measured in distance (i.e., $\mu$m) from the center of optical disc 120.

Turning now to process control panel 140 (shown best in FIG. 8*a*), it can be seen that a user can specify various program parameters for processing data according to one or more decoding processes (e.g., process 40 of FIG. 4). After specifying appropriate program parameters, data can be analyzed and result objects can be created (i.e., step 14 of FIG. 1). In an alternative embodiment, data analysis can be performed using one or more default or predetermined program parameters. The program parameters shown in panel 140 are now described.

Figure 10:
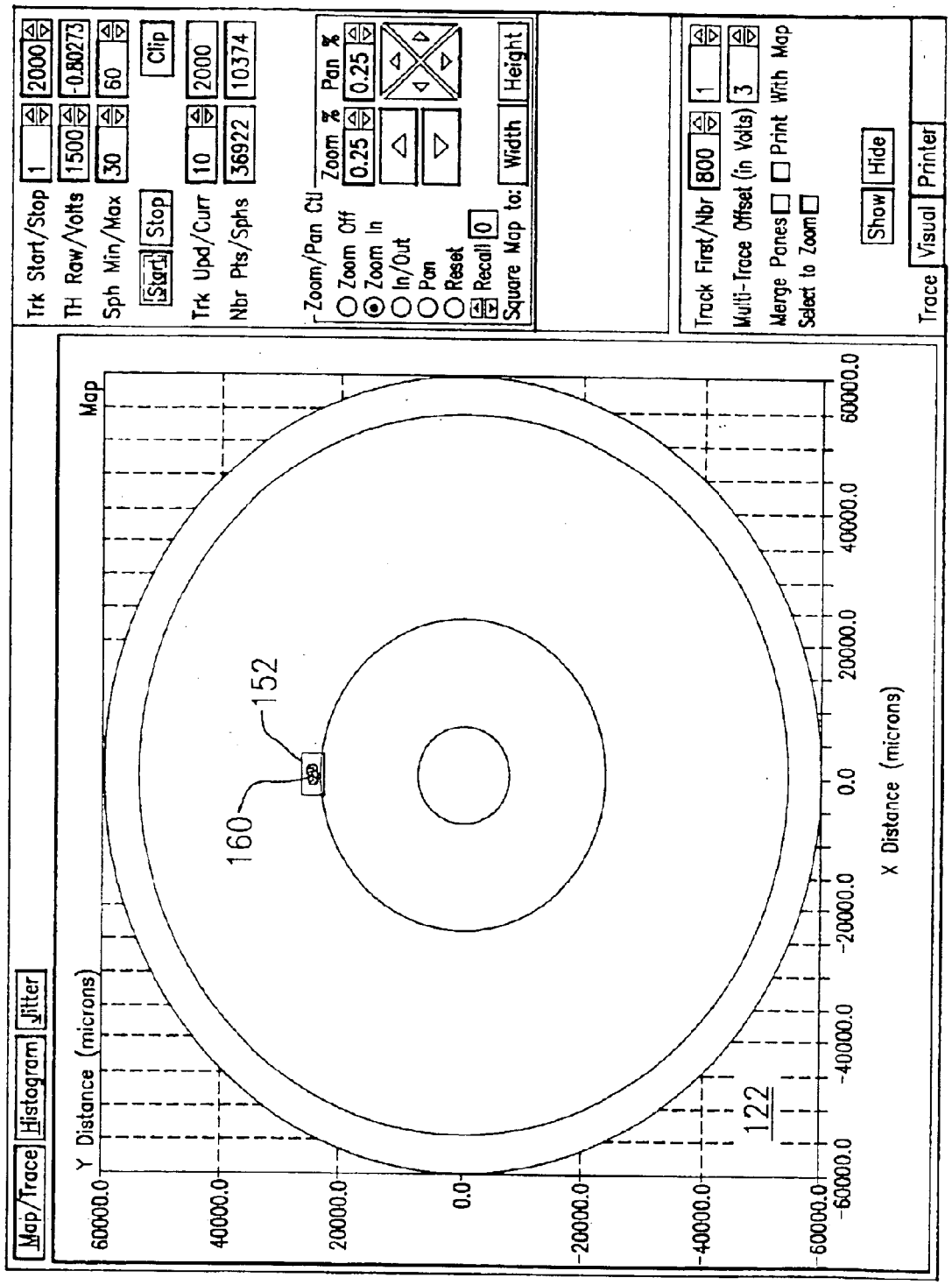
FIG. 10 shows an illustrative embodiment of a map chart displayed according to this invention.

"Trk Start/Stop" identifies start and stop data track fields 141 and 142 used in a decoding process according to this invention. Together, fields 141 and 142 define a range of tracks. As shown in FIG. 8, the default values of these track fields are 800 and 830. After data 160 is loaded, a map chart can be displayed, as shown in FIG. 10. The start and stop tracks used in FIG. 10 are 1 and 2,000. It will be appreciated that although a user may choose to zoom in on data 160 of map chart 120 with zoom window 152, as shown in FIG. 11 (where only a subset of tracks is displayed), the start and stop tracks specified in fields 141 and 142, respectively, remain unchanged. Alternatively, the start and stop tracks displayed in fields 141 and 142 could reflect the dimensions of the zoom window.

"TH Raw/Volts" identifies amplitude threshold fields 143 and 144. Field 143 contains a digital representation of the amplitude threshold between 1 and 4096. It will be appreciated that the maximum value depends on the level of quantization performed by the analog-to-digital converter used to convert the time-varying signal. The value in field 144 is an equivalent voltage corresponding to the value in field 143. As explained above, other threshold criteria could be used, including the sign and/or slope of the time-varying signal.

"Sph Min/Max" identifies minimum and maximum acceptable widths 145 and 146. As already described with respect to step 47 of FIG. 4, a width can be calculated for a feature (such as a bump or a dip) in a time-varying signal. The width corresponds to the size (in units of time or distance) of the underlying structure and scales with the number of data items (e.g., points) that meet the amplitude threshold criteria. If the measured width falls within the range defined by fields 145 and 146 (e.g., see step 50 of FIG. 4), a result object corresponding to the feature can be stored for output. Together, the minimum and maximum acceptable widths defines a range (i.e., a window) of acceptable widths.

Three user-selectable buttons are provided in panel 140. "Start" button 147 and "Stop" button 148 starts and stops data analysis (e.g., processing according to process 40 of FIG. 4). "Clip" button 149 provides a user with another opportunity to save a modified map chart (e.g., creating a Submap according to steps 75 and 78). Once again, the user can be provided with an ability to specify a Submap filename and/or header information, and to further process map data and/or trace information.

Near the bottom of panel 140 are a few display-related information boxes. "Trk Upd/Curr" identifies both the number 149a of tracks to be processed between display updates and the number 149b of the current track being processed. "Nbr Pts/Sphs" identifies the number 149c of data points processed and the number 149d of data features that meet the width criteria—namely, the number of features that fall within the range defined by minimum and maximum acceptable widths 145 and 146.

Control panel 150 (shown best in FIG. 8b) includes various zoom and pan control options. Although control panel 150 is shown on the right hand side of the interface, it will be appreciated that panel 150 can be located at any convenient position. Zooming may be controlled with a pointing device (e.g., a mouse), zoom arrows 151, and/or zoom edit box 153. Similarly, panning may be controlled with a pointing device (e.g., a mouse), pan arrows 154, and/or pan edit box 155.

Control panel 150 includes three options that are used exclusively for controlling zoom. First, "Zoom Off" identifies Zoom Off button 156. When selected, button 156 prevents a pointing device from controlling the zoom control. Second, "Zoom In" identifies Zoom In button 157. When selected, button 157 allows a pointing device to be used for selecting a window (i.e., box) in a currently displayed result object (e.g., a map chart). After being selected, the current result object (e.g., map chart) is redisplayed with the portion defined by the box enlarged. Third, "In/Out" identifies In/Out button 158. The purpose of In/Out button 158 is essentially the same as Zoom In, except for one difference. If a zoom box (e.g., box 152) is drawn from lower right hand corner 152a to upper left hand corner 152b, the zoom power will be adjusted in proportion to the area of the box compared to the area of the current chart.

Control panel 150 also includes one option that is used exclusively for controlling the pan direction. "Pan" identifies pan button 159, which, when selected, allows a map chart to be panned by a user.

Finally, control panel 150 includes two options that can affect both the zoom and pan settings. First, "Reset" identifies reset button 159a, which, when selected, resets a map chart to a default display size and position. Second, "Recall" identifies recall representation 159b, which identifies which of the previously used zoom (and/or pan) displays is currently being viewed.

FIG. 12 shows an illustrative embodiment of a graphical user interface with histogram chart 122b constructed according to this invention. A histogram chart shows occurrences of various events as a function of some variable and usually includes a number of vertical (or horizontal) rectangles of varying lengths. Histogram chart 122b shows the number of data points in various segments of the signal amplitude (e.g., volts) band. Thus, the x-axis of chart 122b represents the band of possible signal amplitudes of data points detected during a decoding process (e.g., process 40 of FIG. 4). The y-axis represents the number of data points detected within a segment (i.e., bin) of the amplitude band. As shown in FIG. 12, chart 122b has a substantial peak at about −0.2 Volts.

FIG. 13 shows an illustrative embodiment of a graphical user interface with jitter (e.g., width) histogram chart 123 constructed according to this invention. Although jitter chart 123 is a histogram, the term "jitter" is used to distinguish it from amplitude histogram chart 122b. Jitter chart 123 shows the number of data points in various segments of a width band. Thus, the x-axis has units of distance (e.g., $\mu$m) or time and represents the width of a data feature detected during a decoding process (e.g., process 40 of FIG. 4). The y-axis represents the number of features that fall within a particular width segment. As shown in FIG. 13, chart 123 includes a plurality of distinct peaks, including peaks at about 1.8, 3.8, and 4.4 $\mu$m.

It has been discovered that the region around the 1.8 $\mu$m peak likely corresponds to dust and other undesirable particles on or within the optical disc. It has also been discovered that the peak that extends from 3.8 $\mu$m to 4.4 $\mu$m correspond to analyte-specific signal elements (i.e., paramagnetic beads) that are known to have diameters of about 2.8 $\mu$m. Jitter chart 123, then, can be used to set the minimum and maximum acceptable widths 145 and 146. Specifically, by setting the minimum and maximum acceptable widths to 3.5 $\mu$m and 4.3 $\mu$m, nearly all the data features that correspond to the beads can be accurately sorted, such as for counting.

It will be appreciated that amplitude threshold 143 (i.e., used by process 40) will affect calculated feature widths and, thus, will affect sorting and counting accuracy. Thus, minimum and maximum acceptable widths should be adjusted accordingly. For example, if amplitude threshold 143 were to be decreased, widths measured by process 40 would correspondingly increase. This increase is reflected by a rightward shift of the peaks in jitter chart. Then, in order to ensure that the proper range of acceptable widths is used, the minimum and maximum acceptable widths 145 and 146 should be increased accordingly. Therefore, it will be appreciated that the best choice of values for amplitude threshold 143, and minimum and maximum acceptable widths 145 and 146, are interdependent.

Based on this interdependent relationship, an automated method of selecting a amplitude threshold is provided. In a first step, data is provided. In a second step, an amplitude threshold estimate is selected and used in a decoding process, such as the one shown in FIG. 4. A result object is thereby generated that includes the width of each detected feature in the data. In the next step, these widths are analyzed by segregated them into a series of width segments (which could be used to render a histogram chart). Next, the maximum number of features in a single segment (or a group of adjacent segments) is stored along with the amplitude threshold used by the decoding processes to calculate the widths. The process can then be repeated with varying thresholds until the optimal threshold is selected that produces the largest maximum number of features that fall within the single segment or group of adjacent segments.

It will be appreciated that this process could be used for detecting multiple optimal thresholds. For example, when an optical disc includes two or more types of nonoperational structures, each corresponding feature may have different optimal thresholds. In this case, different optimal thresholds can be selected by repeating the above-described process for each maximum (i.e., largest number of features) in the histogram that corresponds to a different nonoperational structure.

An automated method of counting nonoperational features is also provided, and can be used after a amplitude threshold has been selected according to the method described above. Based on the statistical distribution of segregated widths described above, a method of counting the nonoperational features includes (1) calculating a standard deviation a of the distribution of widths about a peak (e.g., the segment or segments with the maximum number of features), and then adding the number of features that fall within a certain number of those standard deviations. For example, if it is determined that the maximum number of features fall in a bin (i.e., segment) centered at 2.8 μm, and that σ is 0.5 μm, then the number of features that fall within 2.8±0.5 μm, where n is an integer, could be easily calculated by adding the features that fall within the segments defined by that range. Although the value of n can be any integer, the value is preferably between 1 and 5, and a value of 3 has been successfully used.

It will be appreciated that this counting process could be used for counting two or more types of features in a single data set by repeating the process for secondary maxima (i.e., largest numbers of features). For example, when an optical disc includes two or more types of nonoperational structures, each type of nonoperational structure could correspond to peaks centered about different widths (e.g., 2 μm and 5 μm). Because each peak will normally have different statistical distributions, a different standard deviations can be calculated and used for each count.

FIG. 14a shows an illustrative embodiment of a graphical user interface, including map chart 124, that has been constructed according to this invention. As indicated by control panel 150, map chart 124 only shows a zoomed-in area. Specifically, map chart 124 shows the tracks located in the region between about 24,575 and about 24,620 μm of the y-axis and between about −842 and −894 μm of the x-axis. Two different types of objects are included in map chart 124: horizontal lines and ellipses. The ellipses of map chart 124 represent detected features that meet the width criteria defined by the minimum and maximum acceptable widths 145 and 146 (i.e., greater than 2.7 μm and less than 4.1 μm). The size (e.g., horizontal distance) of the ellipses correspond to the magnitudes of the underlying structures. The horizontal lines of map chart 124 represent the width of detected features that do not meet the width criteria. Thus, data features that have widths less than 2.7 μm and greater than 4.1 μm appear as horizontal lines.

Figure 15:
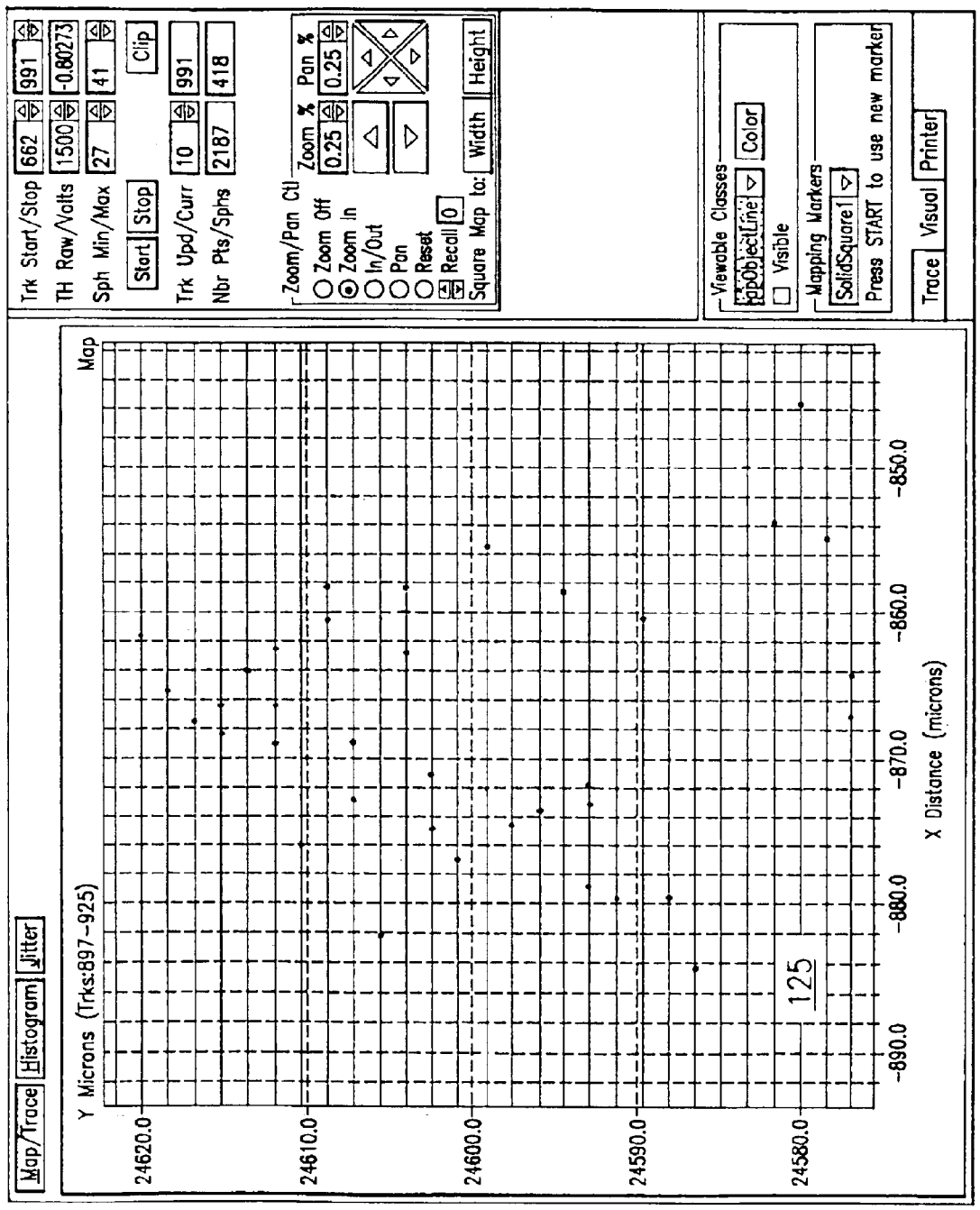
FIG. 15 shows an illustrative embodiment of a graphical user interface, including another map chart, according to this invention.

FIG. 15 shows an illustrative embodiment of a graphical user interface, including map chart 125, that has been constructed according to this invention. Like map chart 124, map chart 125 only shows the tracks located in the region between about 24,575 and 24,620 μm of the y-axis and between about −842 and −894 μm of the x-axis. Only solid square mapping markers are shown in FIG. 15. There can be no visible viewable objects shown because viewable classes "visible" button 195 is not selected. The mapping markers shown in FIG. 15 correspond to all of the data features found within the zoomed region, regardless of their widths.

Figure 16:
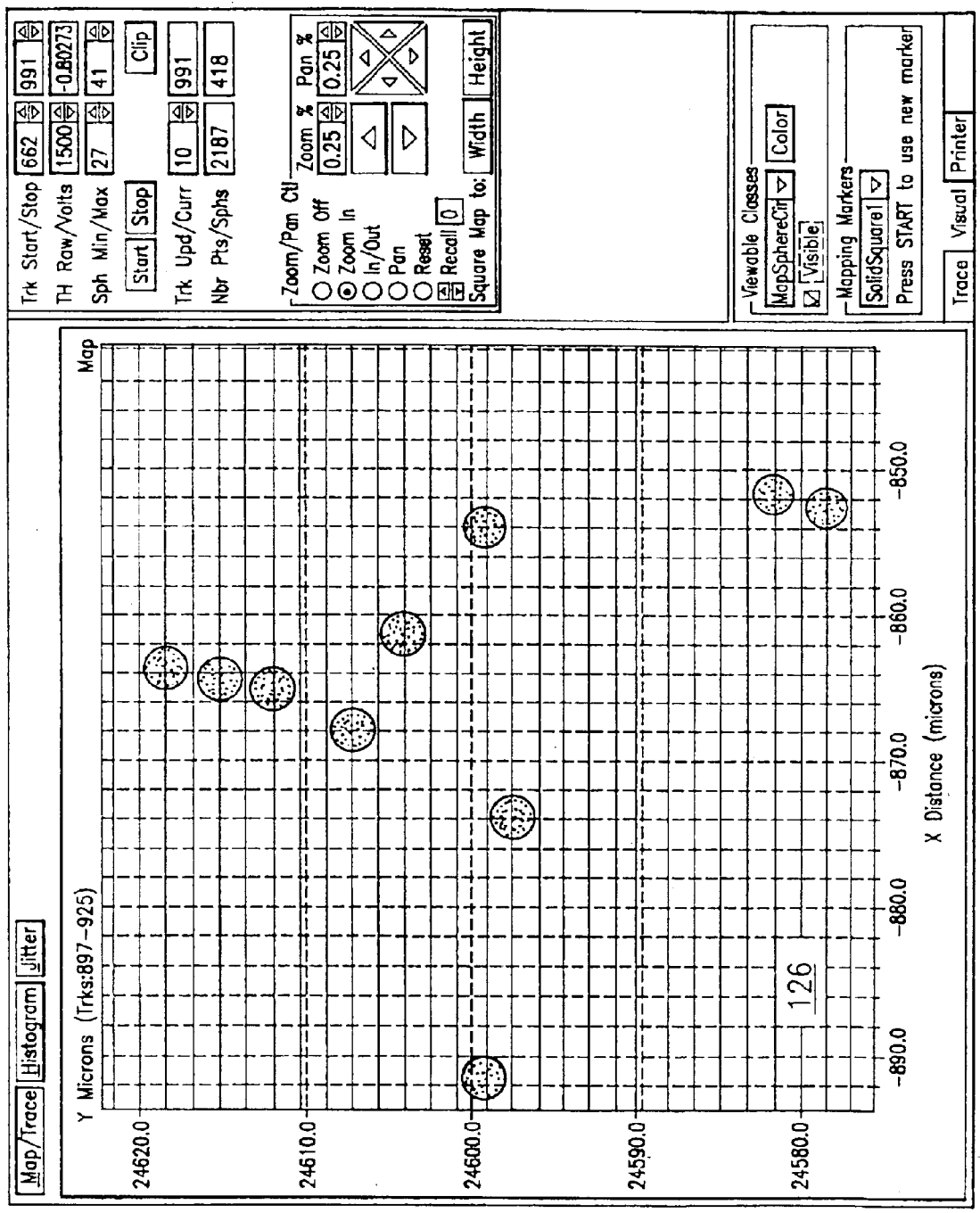
FIG. 16 shows an illustrative embodiment of a graphical user interface, including yet another map chart, according to this invention.

FIG. 16 shows an illustrative embodiment of a graphical user interface, including map chart 126, that has been constructed according to this invention. Like map charts 124 and 125, map chart 126 only shows the tracks located in the region between about 24,575 and 24,620 μm of the y-axis and between about −842 and −894 μm of the x-axis. Unlike map chart 125, which includes solid square mapping markers, map chart 126 includes no mapping markers. Rather, map 126 includes one viewable class—spheres. The spheres were created using minimum and maximum acceptable widths of 2.7 μm and 4.1 μm, respectively.

Figure 17:
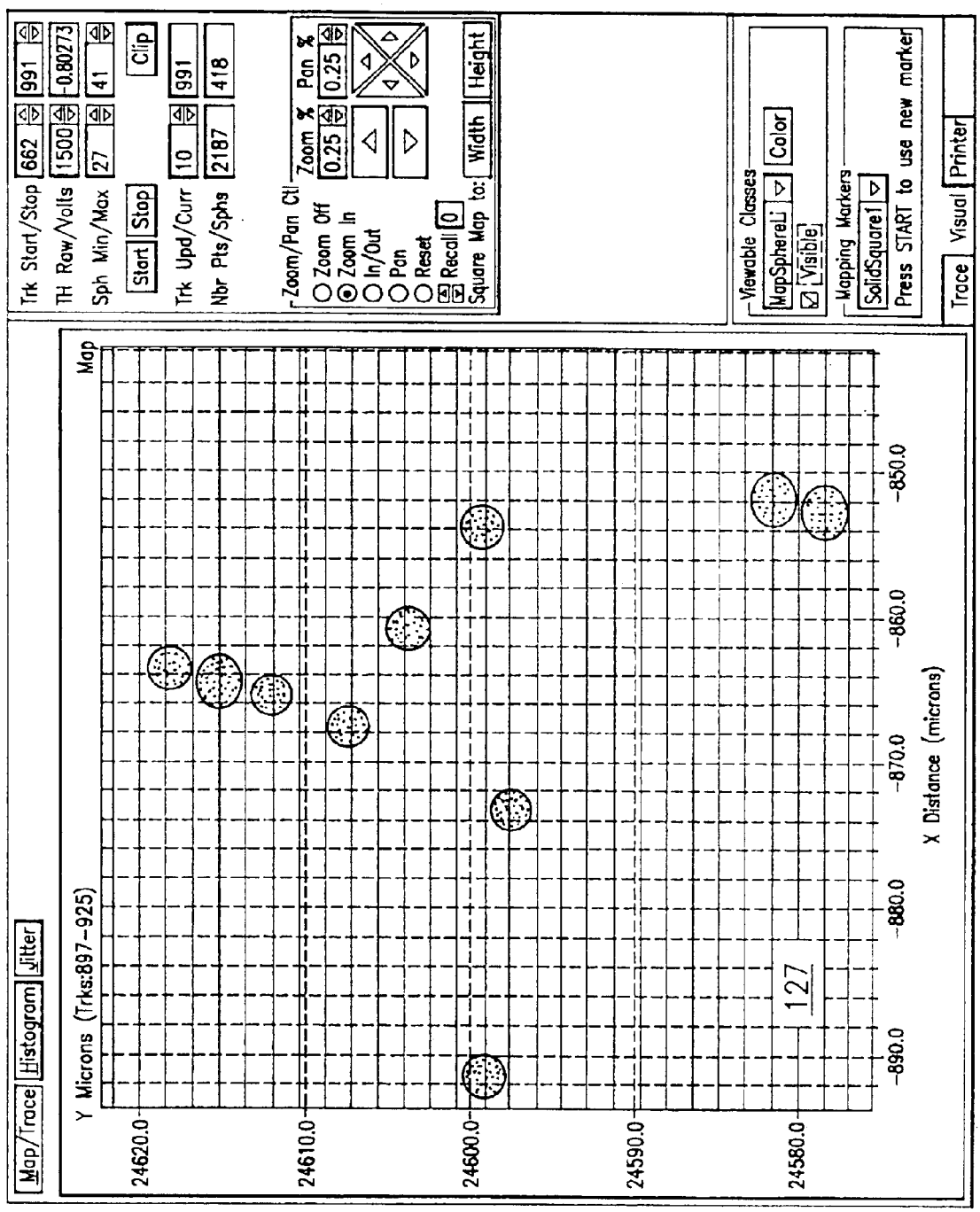
FIG. 17 shows an illustrative embodiment of a graphical user interface, including still another map chart, according to this invention.

It will be appreciated that a map chart created according to this invention can include any number of viewable classes with different width criteria for detecting different size or type signal elements. For example, FIG. 17 shows an illustrative embodiment of a graphical user interface, including map chart 127, that has been constructed according to this invention. Like map charts 124–126, map chart 127 only shows the tracks located in the region between about 24,575 and 24,620 μm of the y-axis and between about −842 and −894 μm of the x-axis. Unlike map chart 126, which includes a viewable class of spheres, map chart 127 includes a different viewable class—ellipses. The spheres and ellipses included in map charts 126 and 127 were created with different processes using different width criteria. In particular, the spheres were created using minimum and maximum acceptable widths of 2.7 and 4.1 μm, respectively, and the ellipses were created for any features that met the threshold criteria (i.e., crossed the threshold). The width of each ellipse represents the length of time the data met the criteria (see FIG. 4).

Figure 18:
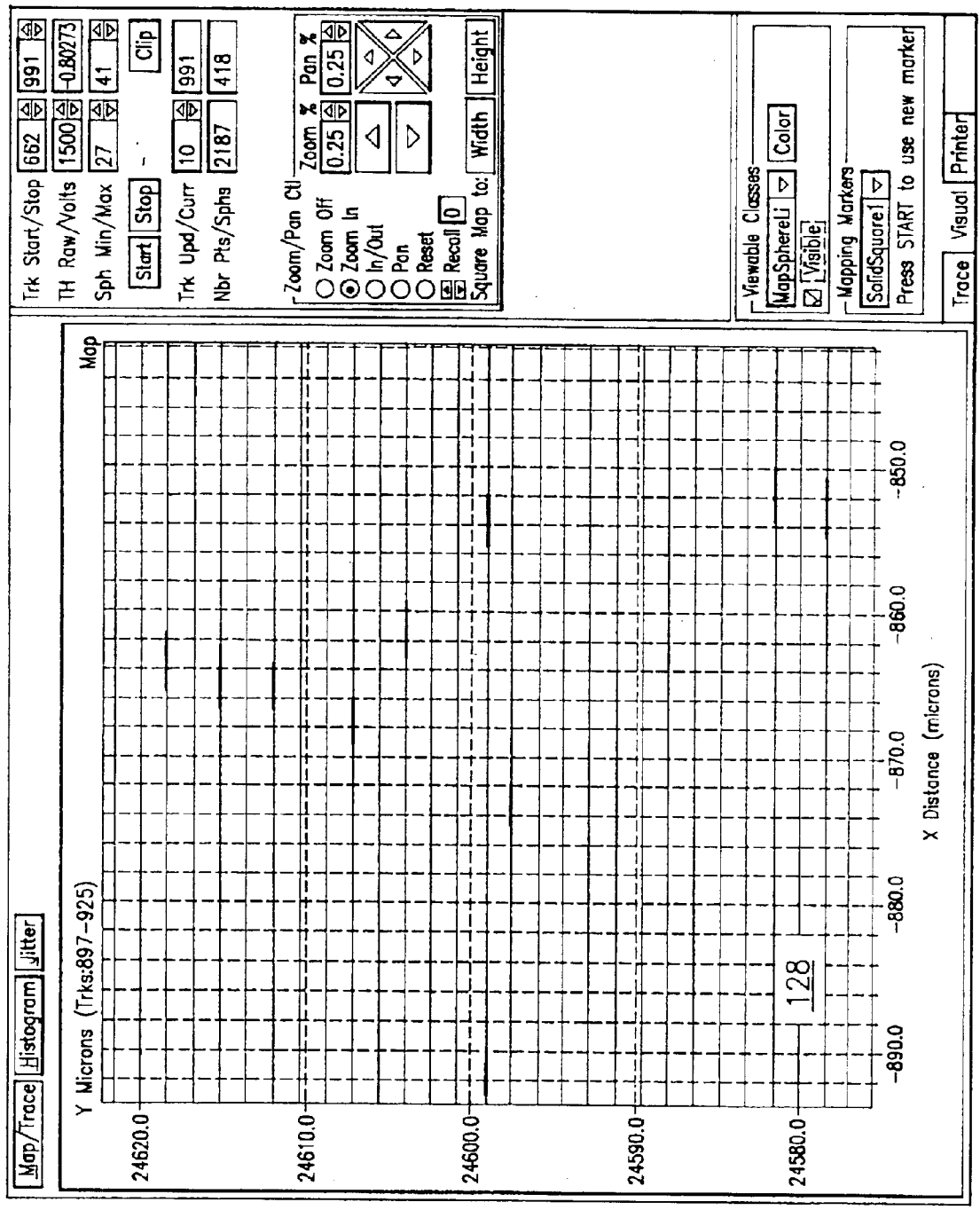
FIG. 18 shows an illustrative embodiment of a graphical user interface, including a further map chart, according to this invention.

FIGS. 18 and 19 show illustrative embodiments of a graphical user interface, including map charts 128 and 129, respectively, that have been constructed according to this invention. Like map charts 124–127, map charts 128 and 129 only show tracks located in the region located between about 24,575 and 24,620 μm along the y-axis and between about −842 and −894 μm along the x-axis. Like map chart 127, map chart 128 only shows features that have widths that fall between the minimum and maximum acceptable widths of 2.7 and 4.1 μm, respectively. The only difference between map chart 127 and map chart 128 is that map chart 128 uses one viewable class of horizontal lines—not two viewable classes of spheres and ellipses. Furthermore, map chart 129 only shows features that have widths that fall outside the range defined by the minimum and maximum acceptable widths of 2.7 and 4.1 μm, respectively. The same features were also shown in FIG. 124, but in combination with features (i.e., two viewable classes of spheres and ellipses) that fall inside the same range. The physical widths used by this process were calculated by dividing by 10 the values used in minimum and maximum acceptable widths 145 and 146.

FIG. 20 shows an illustrative embodiment of a graphical user interface, including map chart 171 and trace chart 172, that has been constructed according to this invention. Map chart 171 only shows the tracks located in the region between about 24,540 and 24,570 μm of the y-axis and between about −820 and −850 μm of the x-axis. Map chart 171 includes one sphere 177a and one ellipse 178a that were created separately (using different minimum and maximum acceptable widths) according to process 40 of FIG. 4. Trace chart 172 only includes the bottom five tracks of map chart 171. In particular, trace chart 172 only includes the tracks 874, 879, 884, 889, and 894, which is specified by first trace track 182 and trace number 183 with an offset of 3 volts.

The following examples are offered by way of illustration and not by way of limitation.

EXAMPLE 1

Positional Mapping of Stochastically Disposed Beads on the Surface of an Optical Disc A single data layer inverted wobble groove optical disc was manufactured essentially as described in co-pending and commonly owned U.S. patent application Ser. No. 09/311,329 filed May 14, 1999, incorporated herein by reference in its entirety. The disc was cleaned with oxygen plasma at 75 Watts for 1 minute. A 1.5 μL aliquot of streptavidin-coated magnetic Dynabeads® (2.8 μm diameter, Dynal, suspended in water at approximately 1,000 beads/μL) was spotted onto the disc's cleaned gold surface approximately 25 mm from the physical center of the disc (i.e., from the center of the mounting ring).

The disc was placed on a CD chuck with embedded magnets aligned partially to constrain the movement of the beads. An air gun was then used both to remove the water and to align the beads radially, that is, along the spiral wobbled groove. The beads remained adherent to the dried disc presumably through noncovalent interactions with the disc's metallic surface.

Figure 21:
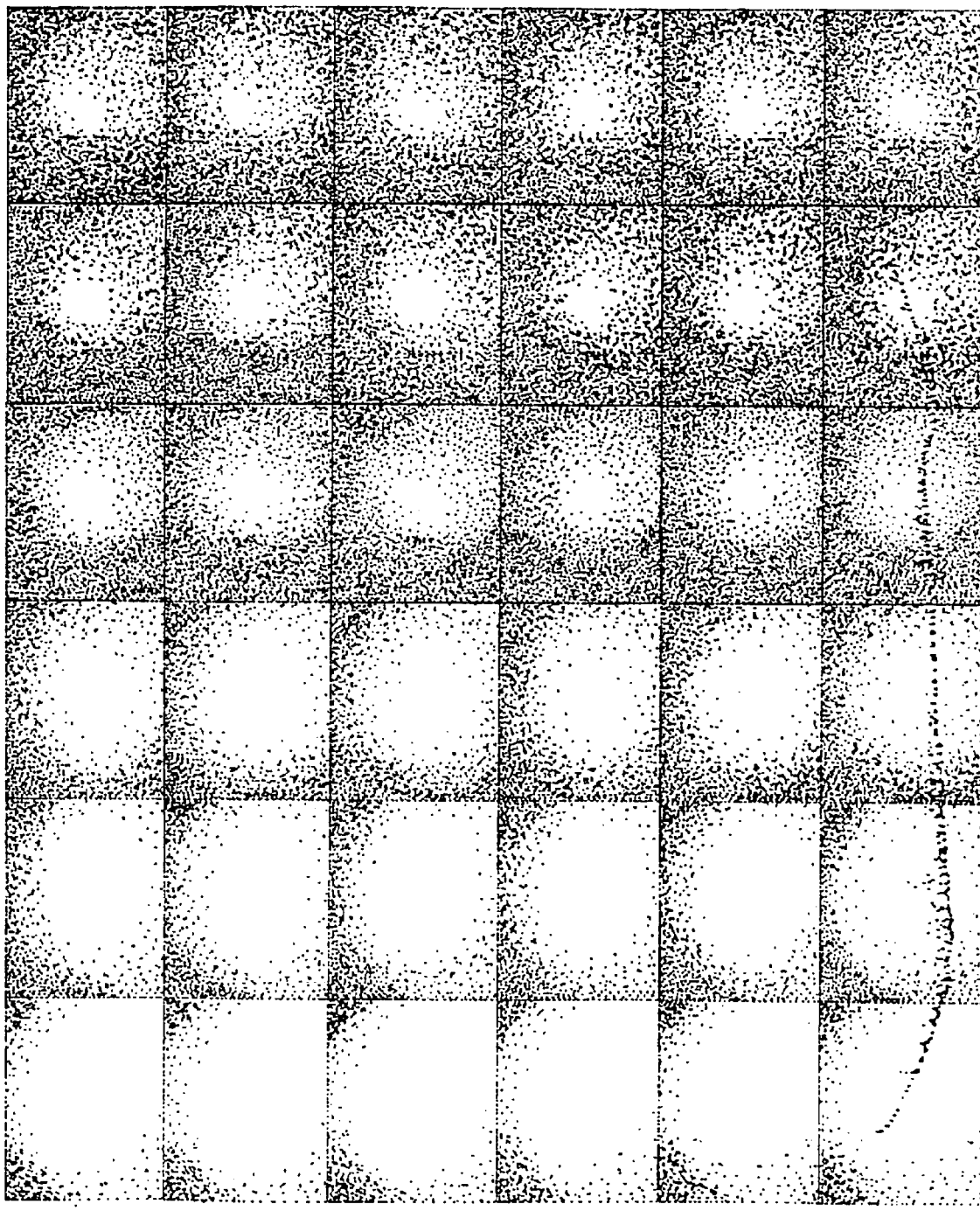
FIG. 21 shows a two-dimensional composite light microscopic image of the laser proximal surface of a trackable disc with 2.8 $\mu$m spheres electrostatically adherent to the metalized surface and manually aligned substantially along a wobbled groove, according to this invention.

FIG. 21 shows a two-dimensional composite light microscopic picture of the laser proximal surface of the disc. The lighter areas in the center of each individual field are reflection artifacts of the microscopic illumination. The adherent spheres can be seen aligned substantially in the radial direction.

Figure 22:
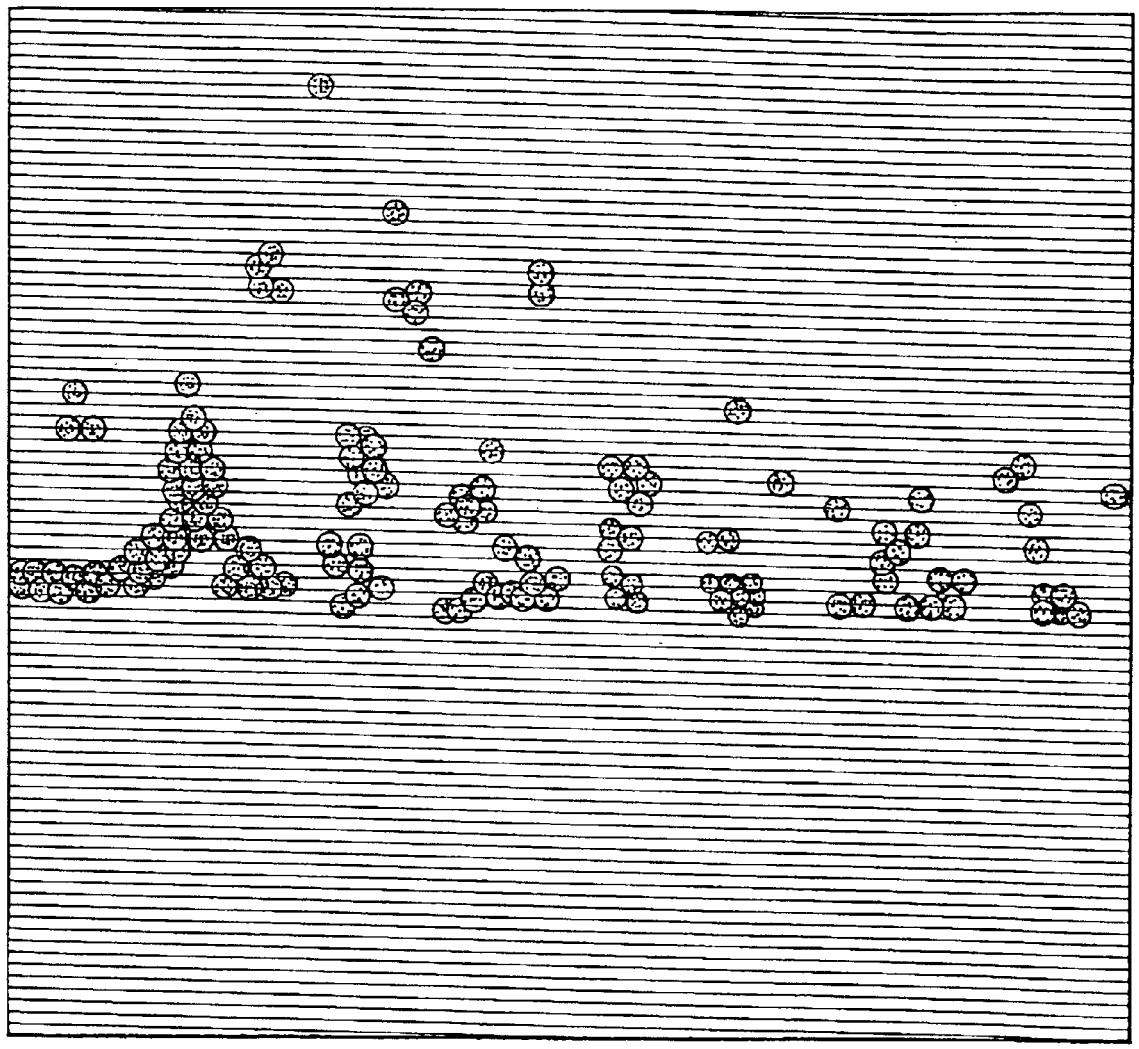
FIG. 22 shows a higher magnification light microscopic image of a portion of the same disc as shown in FIG. 21 according to this invention.

FIG. 22 is a higher magnification light microscopic picture showing a portion of the same disc as shown in FIG. 21. The disc's continuous wobbled groove may be seen at this magnification as a series of essentially parallel tracks, with the groove's radial direction disposed horizontally in the light microscopic image and the disc's tangential direction being disposed vertically. The spheres are seen collectively to extend over the entire radial extent of the light microscopic field, and to overlie a number of separate tracks.

A polycarbonate disc cover, manufactured essentially as described in copending and commonly owned U.S. patent application Ser. No. 09/311,329 filed May 14, 1999, incorporated herein by reference in its entirety, was then attached over the disc's metal surface using several drops of methylethylketone applied to the disc's clamping ring, followed by mild pressure.

The disc with attached cover was then read using a Ricoh 6200S CD-RW optical disc drive, with the drive's nonequalized HF output tapped, filtered, buffered, and discontinuously sampled using an ULTRAD-1280 dual 40 MHZ 12 bit A/D PCI data acquisition board (Ultraview Corporation, Orinda, Calif.). The digital data were written to a file on computer hard disk. The digital data were thereafter input into a software program according to the present invention.

Figure 23:
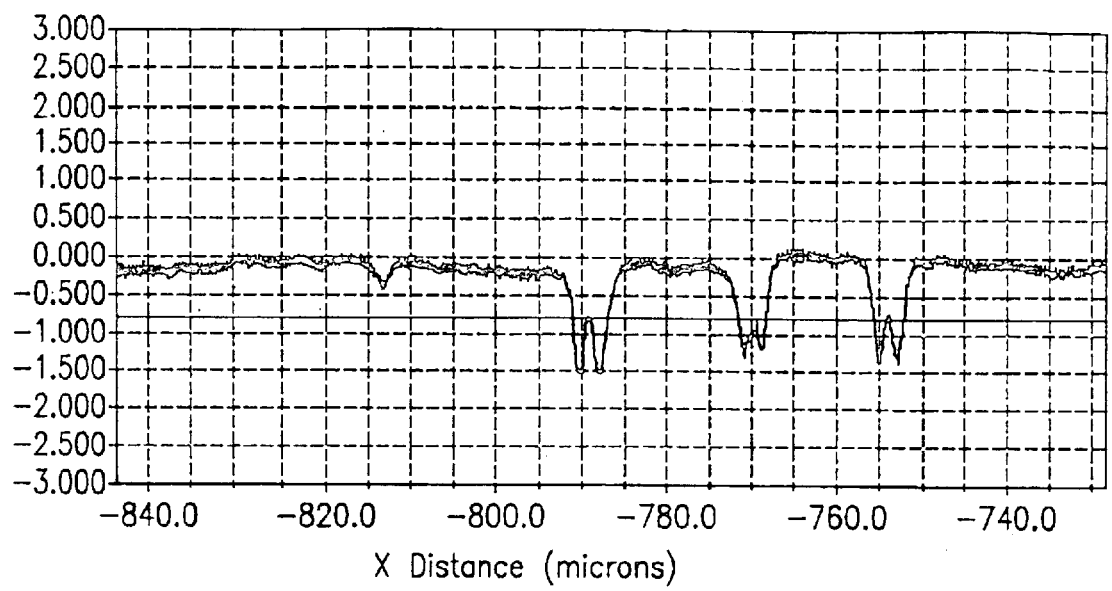
FIG. 23 shows a trace chart displaying a single electrical response reported in the buffered HF signal during reading along a single one of the wobble tracks that passes through the area of the disc shown in FIG. 22, according to this invention.

FIG. 23 shows a trace chart generated by the software, displaying the electrical response reported in the buffered HF signal during reading along a single one of the tracks that passes through the area of the disc shown in FIG. 22. Several deviations from baseline, representing discrete data features, are readily visible to visual inspection.

Three data features are approximately equal in width, shape, and maximum amplitude; the left-most one is smaller.

With respect to the three similar data features, the maximum width of 5 μm agrees with the size expected by combining the known diameter of the beads with the expected diameter of the laser beam at the center of the bead of the disc's metal surface. The biphasic shape is consistent with expectations of changes in reflectivity as the laser traverses (climbs) the leading edge of the spherical bead, traverses its center, and then traverses (descends) the lagging edge.

Figure 24:
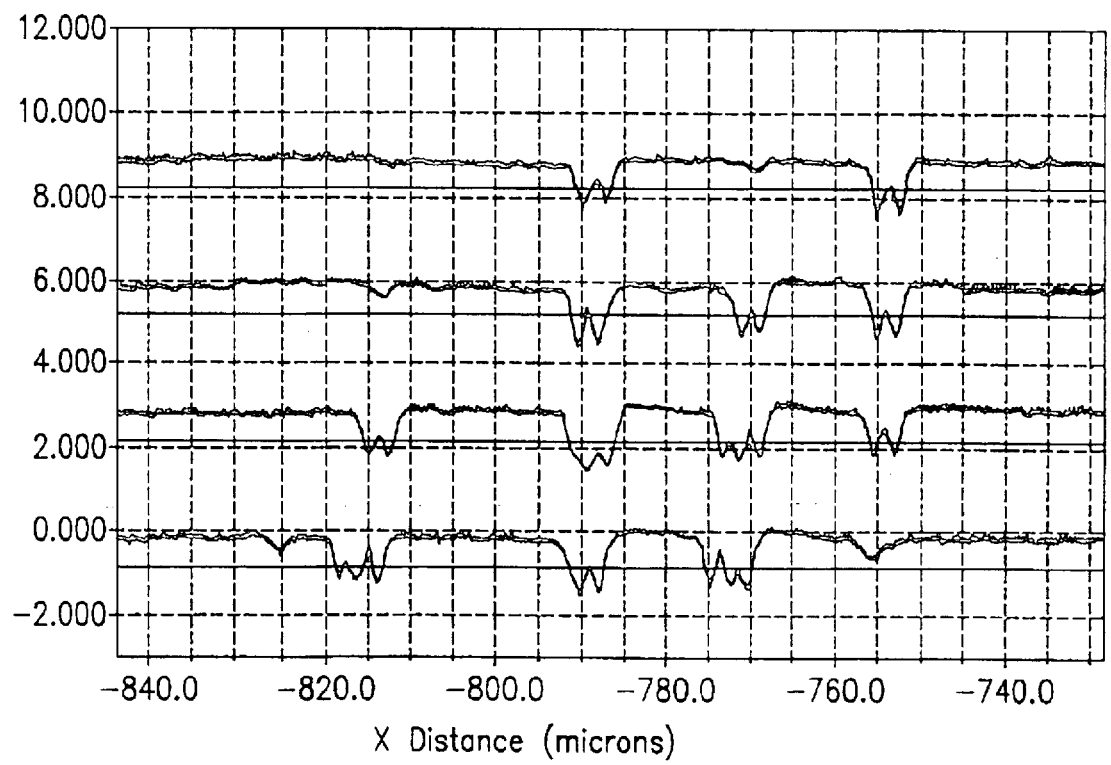
FIG. 24 shows a trace chart displaying multiple electrical responses reported in the buffered HF signal along four of the wobble tracks that pass through the area of the disc shown in FIG. 22, with the track shown in FIG. 23 appearing as the second track from the top, which have been aligned in X-axis registration, according to this invention.
Figure 25:
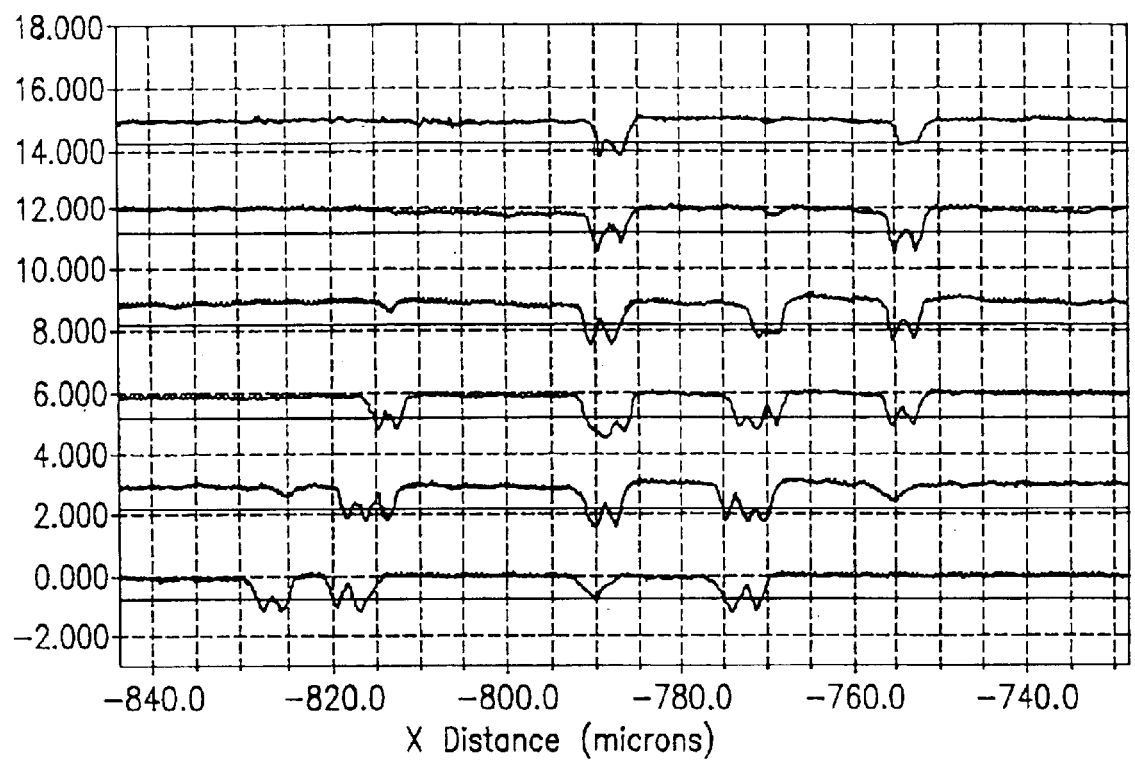
FIG. 25 shows a trace chart displaying multiple electrical responses reported in the buffered HF signal along six of the wobble tracks that pass through the area of the disc shown in FIG. 22, which have been aligned in X-axis registration, according to this invention.
Figure 26:
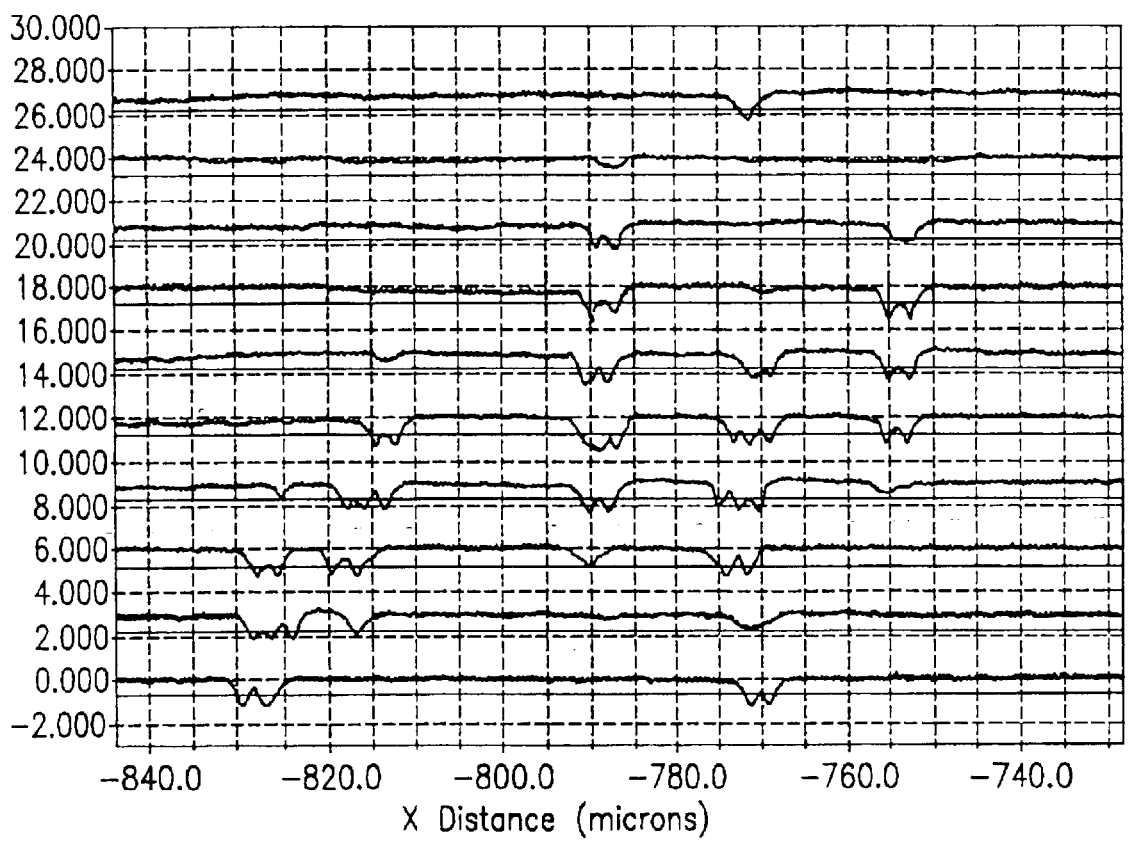
FIG. 26 shows a trace chart displaying multiple electrical responses reported in the buffered HF signal along ten of the wobble tracks that pass through the area of the disc shown in FIG. 22, which have been aligned in X-axis registration, according to this invention.

FIG. 24 shows a trace chart aligning, in X axis (i.e., radial) registration, the electrical responses reported in the buffered HF signal along four of the tracks that pass through the area of the disc shown in FIG. 22, with the track shown in FIG. 23 appearing as the second track from the top. FIG. 25 shows a trace chart aligning, in X axis (i.e., radial) registration, the electrical responses reported in the buffered HF signal along six of the tracks that pass through the area of the disc shown in FIG. 22. FIG. 26 shows a trace chart aligning, in X axis registration, electrical responses reported in the buffered HF signal along ten of the tracks that pass through the area of the disc shown in FIG. 22.

The radial alignment of the traces in FIG. 26 allows visual identification of data features clustered in the tangential direction. The uniphasic, low amplitude, data feature shown in FIG. 23 is now suggested by the aligned traces of FIG. 26 to represent the edge of a nonoperational structure, the center of which produces higher amplitude, biphasic signals in adjacent traces.

Figure 27:
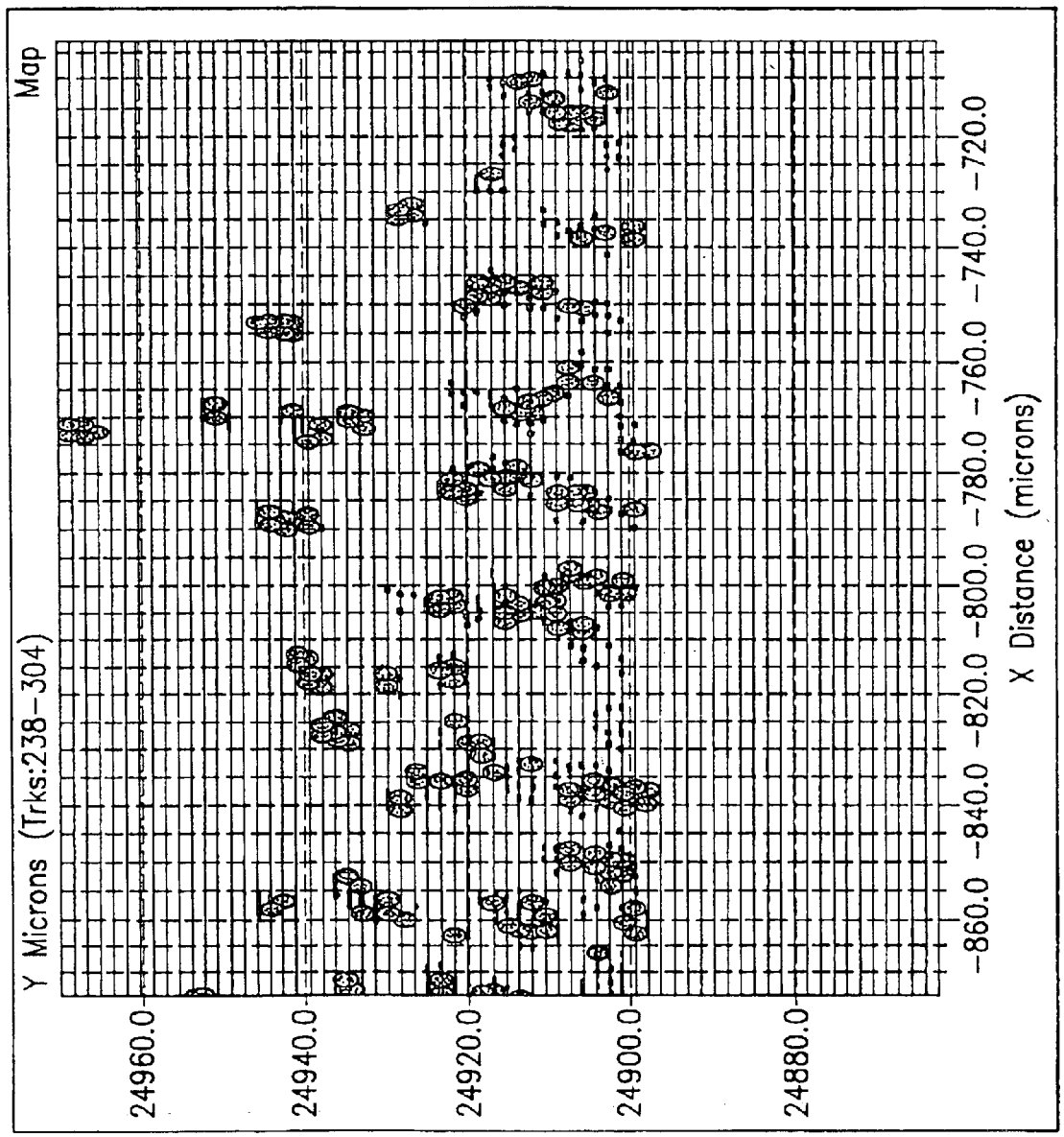
FIG. 27 shows a map chart of a portion of the disc shown optically in FIGS. 21–22 and electrically, by means of trace charts, in FIGS. 23–26, according to this invention.
Figure 28:
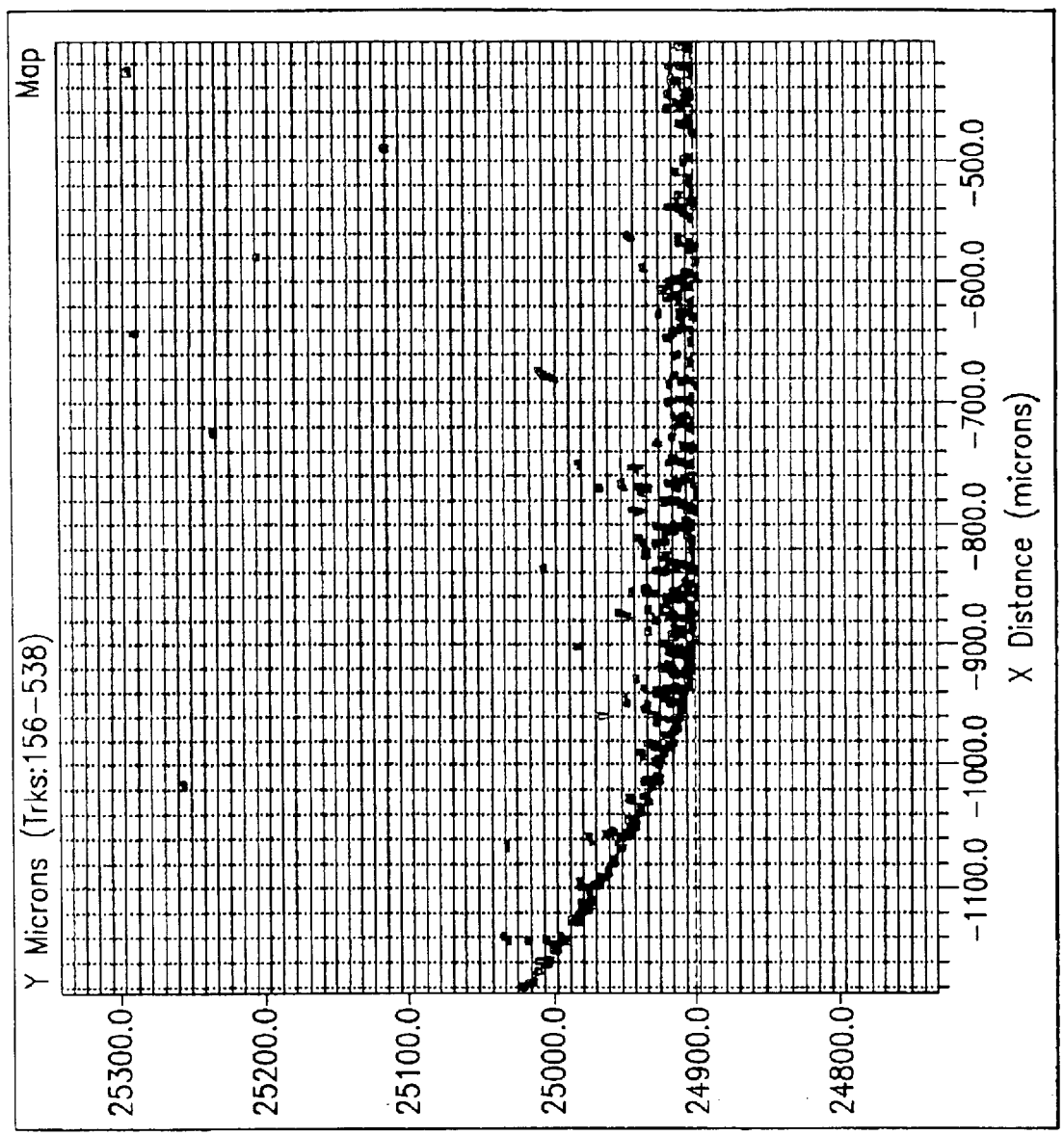
FIG. 28 shows a map chart of the same disc shown optically in FIGS. 21–22 and electrically in FIGS. 23–26, at lesser zoom than in FIG. 27, according to this invention.
Figure 29:
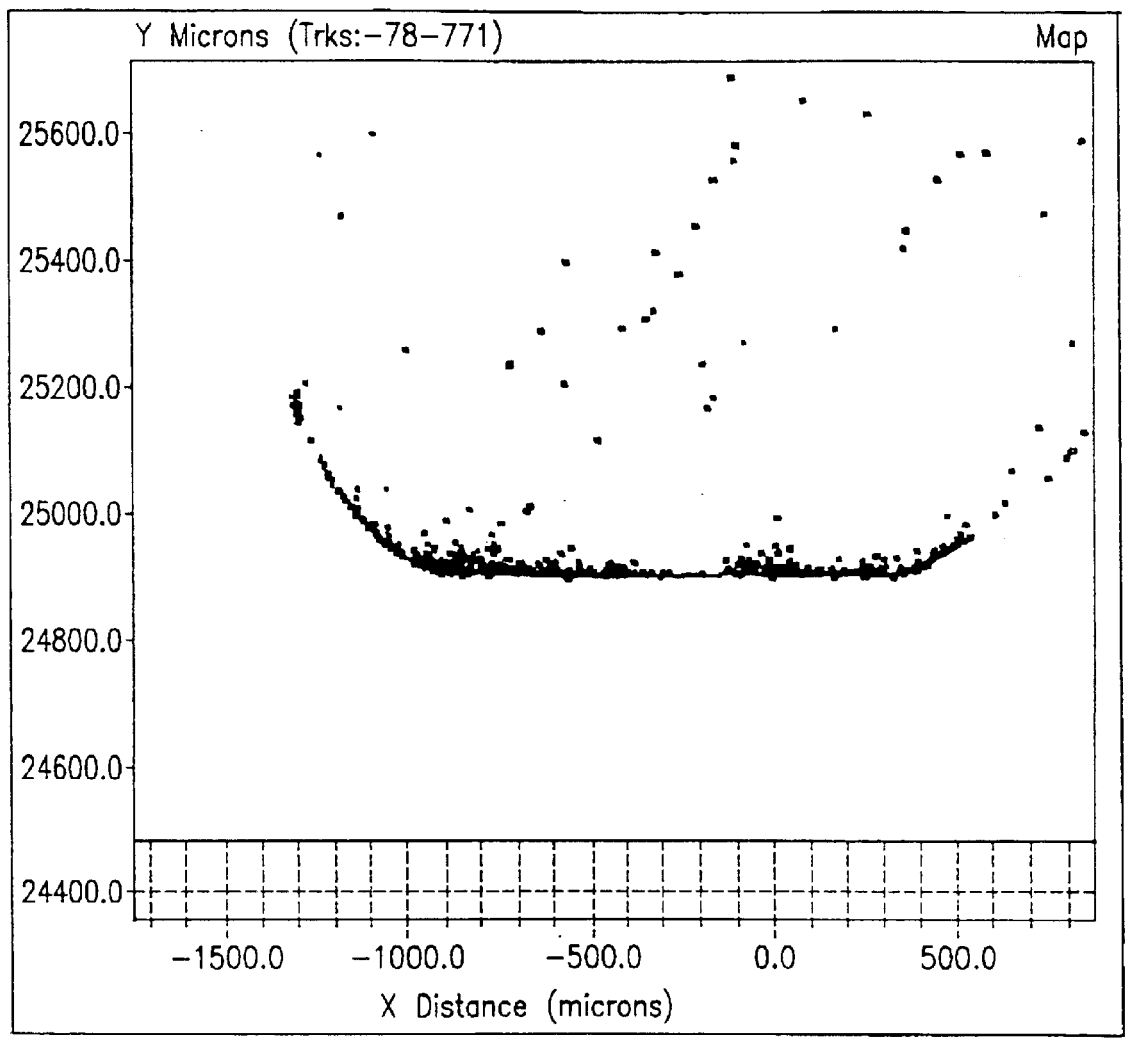
FIG. 29 shows a map chart of the same disc shown optically in FIGS. 21–22 and electrically in FIGS. 23–26, at lesser zoom than in FIG. 28, according to this invention.

FIG. 27 shows a map chart generated from the same data. Ellipses mark the location of data features that meet the amplitude and/or width criteria set in the software for identification of beads; dots mark the location of data features that fail the amplitude and/or width criteria for beads. Comparison of the map chart in FIG. 27 with the microscope photograph presented in FIG. 22 validates the initial mapping criteria and allows further refinement.

Figure 30:
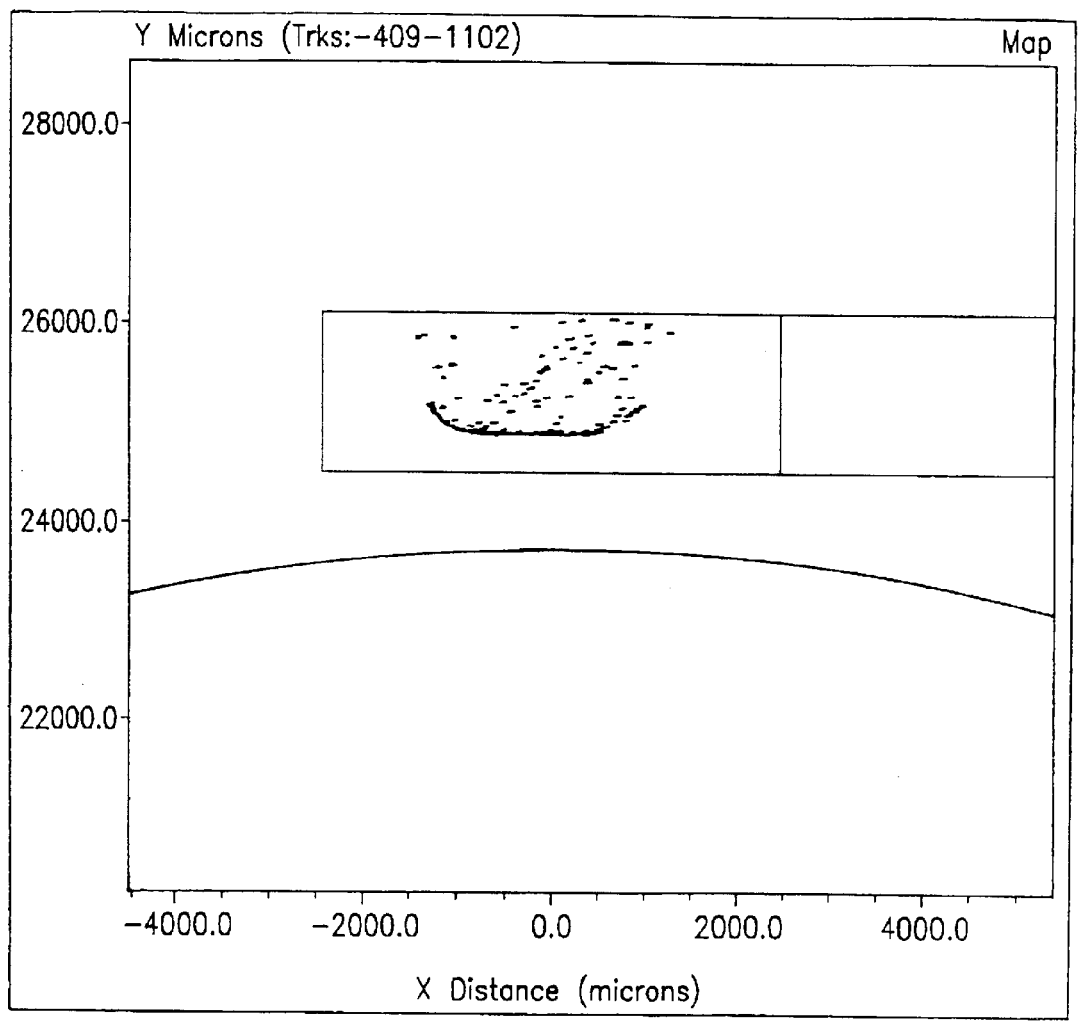
FIG. 30 shows a map chart of the same disc shown optically in FIGS. 21–22 and electrically in FIGS. 23–26, at lesser zoom than in FIG. 29 and with the acquired digital data, shown boxed, mapped to a representation of an optical disc, according to this invention.
Figure 31:
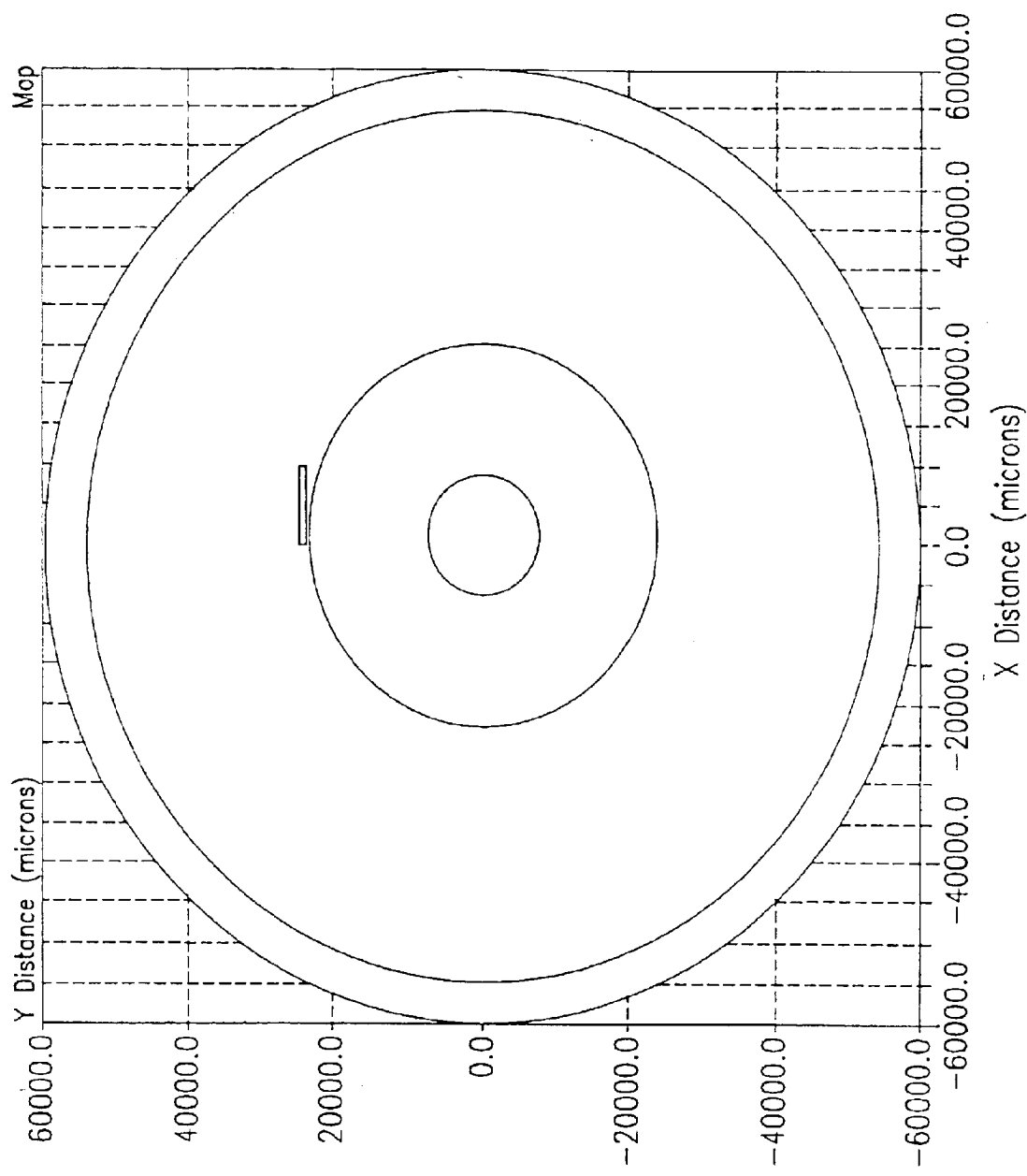
FIG. 31 shows a map chart of the same disc shown optically in FIGS. 21–22 and electrically in FIGS. 23–26, at still lesser zoom than in FIG. 31, according to this invention.

FIGS. 28–31 show map charts of the same data at progressively lesser degrees of zoom than in FIG. 27, with FIGS. 30 and 31 additionally superimposing the mapped features upon a schematic of an optical disc. Comparison of FIGS. 29 and 30 with the composite photograph of FIG. 21 demonstrates the ability of the methods and apparatus of the present invention digitally to mimic optical microscopic inspection of the disc surface.

EXAMPLE 2

Discrimination and Classification of Nonoperational Feature Structures Using Data Feature Patterns A single data layer inverted wobble groove optical disc was manufactured essentially as described in co-pending and commonly owned U.S. patent application Ser. No. 09/311,329 filed May 14, 1999, incorporated herein by reference in its entirety.

An aliquot of 4 μm diameter blue polystyrene beads (available from Spherotech, Inc., of Libertyville, Ill.), 6.8 μm diameter blue polystyrene beads (available from Spherotech), and silica beads (available from Sigris Research, Inc., of Brea, Calif.) was mixed in water and spotted onto the metal surface of the disc. The disc was then air dried. FIG. 32a is a light microscope image of the disc surface, showing an aggregation of beads that includes two silica beads 201, a single 4 μm blue polystyrene bead 202, and three 6.8 μm blue polystyrene beads 203.

A polycarbonate cover was affixed to the disc and the disc assembly read as described in Example 1. The stored digital data were thereafter input into a software program according to the present invention.

FIG. 32b is a trace chart aligning, in X-axis (radial) registration, the electrical responses reported in the buffered HF signal along ten of the tracks that pass through the region of the disc shown photographically in FIG. 32a. A signal 204 above baseline occurs in the location of one of the silica beads, and is readily identified in the electrical signal despite the abutment of neighboring beads.

The above-baseline signal 204 that is generated by the silica beads has also been observed using acrylic beads. Without wishing to be bound by theory, it is presently believed that the silica and acrylic beads, which are at least partially transparent, act as lenses to further focus the incident laser light during reading. Another possible cause for an increase in the signal is reflection of laser light from the top portion of the proximal surface of the bead. Acrylate beads, which are commercially available with more uniform size distribution than silica beads, present certain advantages on that basis.

The trace chart of FIG. 32b demonstrates that structurally dissimilar nonoperational structures may be discriminated and classified according to differing patterns that they create in the digital data. Accordingly, the trace chart demonstrates that nonoperational structures may be chosen and/or designed for their ability to generate data features that may be readily discriminated using the methods and apparatus of the present invention.

Figure 33:
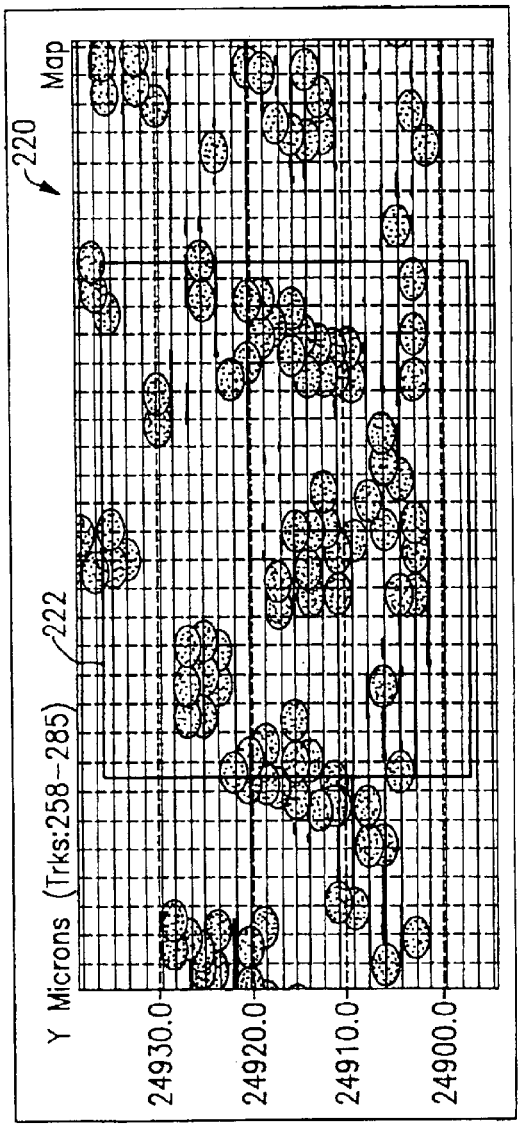
FIG. 33 shows an illustrative embodiment of another map chart displayed according to this invention.
Figure 34:
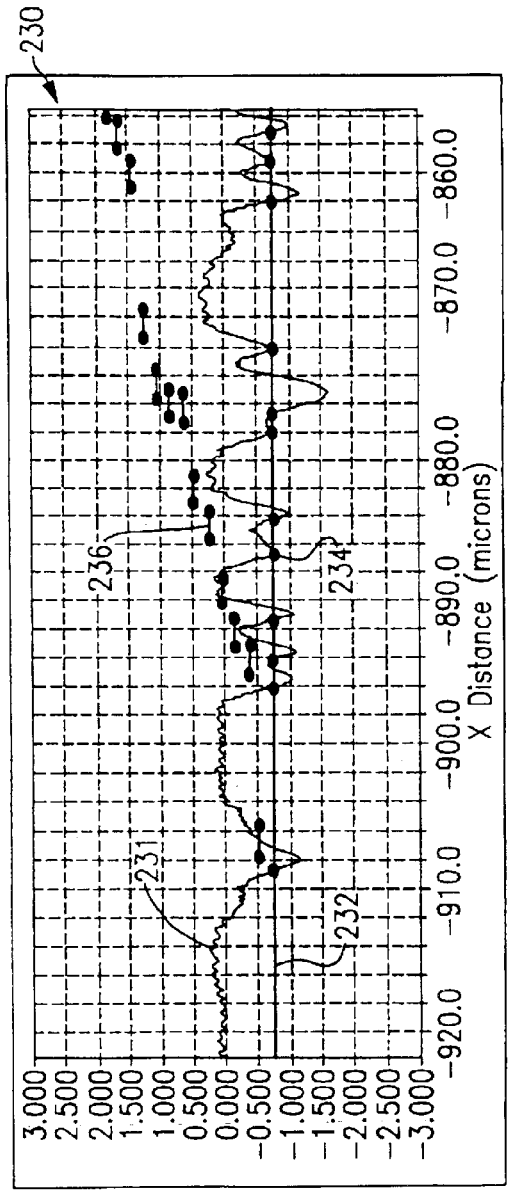
FIG. 34 shows a trace chart displaying a single electrical response reported in the buffered HF signal during reading along a single one of the wobble tracks that passes through the area of the disc shown in FIG. 33, according to this invention.

FIG. 33 shows an illustrative embodiment of another map chart displayed according to this invention. FIG. 34 shows trace chart 220 displaying a single electrical response 231 reported in the buffered HF signal during reading along a single one of the wobble tracks that passes through the area of the disc shown in FIG. 33. Also shown on FIG. 34 is threshold 232, which was used in accordance with the decoding algorithms previously described. Each time signal 230 crosses threshold 232 in a downward direction (signal 230 has a negative slope), a circular marker is placed at the crossing (e.g., marker 234). Above each marker, there a horizontal segment (e.g., segment 236) is added that can reflect the measured width of data feature that follows the crossing. As seen in FIG. 34, because of the large number of crossings, each horizontal segment is horizontally and vertically offset from the original crossing.

Finally, FIG. 35 shows image chart 240 (i.e., a bit map image) that roughly corresponds to the wobble tracks that pass through boxed area 222 of an optical disc schematic shown in FIG. 33. The black and white bit map image shown in FIG. 35 was created by assigning an intensity value to each bit of the image proportional to the amplitude of the signal response (i.e., data) at that point. Thus, rather than mapping viewable objects (e.g., classes and markers) onto an optical disc schematic, the magnitude of the signal can be represented directly by a displaying an assigned intensity.

All patents, patent publications, and other published references mentioned herein are hereby incorporated by reference in their entireties as if each had been individually and specifically incorporated by reference herein. While preferred illustrative embodiments of the present invention are described, it will be apparent to one skilled in the art that various changes and modifications may be made therein without departing from the invention, and it is intended in the appended claims to cover all such changes and modifications that fall within the true spirit and scope of the invention.

What is claimed is:

1. A method of analyzing data acquired by reading an optical disc having at least one readable analyte-specific signal element, said method comprising:

identifying a pattern in said data that indicates a structural dimension of said at least one readable analyte-specific signal element measured in a substantially tangential direction and extending across at least two adjacent tracks on the disc, and analyzing said pattern using the structural dimension of said at least one readable analyte-specific signal element.

2. The method of claim 1 wherein said data includes a digitized sample of at least one analog signal.

3. The method of claim 2 wherein said at least one analog signal is derived from at least one signal selected from a group including a high frequency signal, a tracking error signal, and a focus error signal.

4. The method of claim 3 wherein said at least one analog signal comprises at least two signals selected from a group including a high frequency signal, a tracking error signal, and a focus error signal to thereby form a combined analog signal.

5. The method of claim 3 wherein said at least one analog signal is derived from said high frequency signal and said tracking error signal.

6. The method of claim 3 wherein said at least one analog signal is derived from said high frequency signal and said focus error signal.

7. The method of claim 3 wherein said at least one analog signal is derived from said tracking error signal and said focus error signal.

8. The method of claim 3 wherein said at least one analog signal is derived from said high frequency signal, tracking error signal, and said focus error signal.

9. The method of claim 4 further including the step of quantizing said combined analog signal to form said data.

10. The method of claim 9 wherein said combined analog signal is formed by combining said at least two signals in a synchronized manner.

11. The method of claim 10 further comprising the steps of:

quantizing each of said at least two analog signals to form individual digitized data sets; and combining said individual digitized data sets to form said data.

12. The method of claim 11 wherein said combining of said data sets comprises combining in a synchronized manner.

13. The method of claim 2 wherein said digital sample is acquired in a substantially continuous manner.

14. The method of claim 2 wherein said digital sample is acquired in a substantially non-continuous manner.

15. The method of claim 2 wherein said pattern is substantially continuous within said digitized sample.

16. The method of claim 15 wherein said substantially continuous pattern corresponds to a length along a track in a radial direction.

17. The method of claim 2 wherein said pattern is substantially discontinuous within said digitized sample.

18. The method of claim 17 wherein said discontinuous pattern corresponds to at least one cluster of data features.

19. The method of claim 18 including at least two of said cluster data features, each one thereof corresponding to different analyte-specific signal elements positioned along different turns of said disc.

20. The method of claim 18 wherein said identifying step includes associating result objects that correspond to said data features.

21. The method of claim 14 wherein said reported physical property is a property disposed tangentially on said disc.

22. The method of claim 17 wherein said discontinuous pattern includes multiple data features that correspond to said at least one readable analyte-specific signal element.

23. The method of claim 17 wherein said discontinuous pattern includes at least one discontinuity between two continuous regions, and said discontinuity itself reports a physical property of said at least one readable analyte-specific signal element.

24. The method of claim 23 wherein said discontinuity indicates that said continuous regions correspond to structures on the same turn of a track.

25. The method of claim 23 wherein said discontinuity indicates that said continuous regions correspond to structures on different turns of said disc.

26. The method of claim 1 wherein said identifying step includes identifying a plurality of readable analyte-specific signal elements.

27. The method of claim 26 including the further step of counting said plurality of readable analyte-specific signal elements.

28. The method of claim 1 wherein said structural dimension depends at least in part upon disposition of said at least one readable analyte-specific signal element on said disc.

29. The method of claim 28 wherein said reported structural dimension is independent of an absolute position of said pattern in said data.

30. The method of claim 28 wherein said reported structural dimension is dependent on a position of said pattern in said data.

31. The method of claim 1 wherein said data include a digitized sample of at least two analog signals.

32. A method of analyzing data acquired by reading an optical disc having at least one readable analyte-specific signal element, said method comprising:
identifying a pattern in said data that reports a physical property of said at least one readable analyte-specific signal element, said reported physical property being a structural size measured in a substantially tangential direction extending across at least two adjacent tracks on the disc, and wherein said reported physical property inheres in said at least one readable analyte-specific signal element, and wherein said reported property depends upon a position of said pattern in said data.

33. The method of claim 32 wherein said at least one readable analyte-specific signal element produces a respective analog signal that has a substantial magnitude in at least two different turns of a disc.

34. The method of claim 33 wherein said identifying step includes using the relative position of the pattern on the disc.

35. The method of claim 33 wherein said identifying step includes reporting the size of a bead that crosses at least two different turns.

36. A method of analyzing data generated by reading a trackable optical disc having a plurality of physically non-identical concurrently readable analyte-specific signal elements, said method comprising identifying patterns in said data that distinguish among said physically non-identical concurrently readable analyte-specific signal elements, wherein said identifying is performed in a manner that is dependent on absolute position of said pattern in said data, and wherein said the act of identifying is performed using a structural dimension of said physically non-identical concurrently readable analyte-specific signal elements measured in a substantially tangential direction extending across at least two adjacent tracks on the disc.

37. The method of claim 36 wherein said data are a digitized sample of at least one analog signal.

38. The method of claim 37 wherein said at least one analog signal is derived from a signal selected from a group including a high frequency signals tracking error signal, and a focus error signal.

39. The method of claim 38 wherein said at least one analog signal comprises at least two signals selected from a group including a high frequency signal, a tracking error signal, and a focus error signal to thereby form a combined analog signal.

40. The method of claim 39 further including the step of quantizing said combined analog signal to form said data.

41. The method of claim 40 wherein said combined analog signal is formed by combining said at least two signals in a synchronized manner.

42. The method of claim 39 further comprising the steps of:
quantizing each of said at least two signals to form individual data sets; and
combining said individual data sets to form said data.

43. The method of claim 42 wherein said combining said data sets comprises combining said data sets in a synchronized manner.

44. The method of claim 37 wherein said digital sample is acquired in a substantially continuous manner.

45. The method of claim 37 wherein said digital sample is acquired in a substantially non-continuous manner.

46. The method of claim 37 wherein at least one of said patterns is continuous within said digitized sample.

47. The method of claim 46 wherein said continuous pattern corresponds to a length along a track in a radial direction.

48. The method of claim 37 wherein at least one of said patterns is discontinuous within said digitized sample.

49. The method of claim 48 wherein said discontinuous pattern corresponds to at least one cluster of data features.

50. The method of claim 49 including at least two of said cluster data features, each one thereof corresponding to analyte-specific signal elements positioned along different turns of said disc.

51. The method of claim 48 wherein said discontinuous pattern includes multiple data features that correspond to at least one of said analyte-specific signal elements.

52. The method of claim 51 wherein at least one of said analyte-specific signal elements produces a discernable and substantial analog signal from only one turn of a track.

53. The method of claim 51 wherein the plurality of analyte-specific signal elements comprises at least two classes of elements, said method further comprising counting the number of at least one class of said elements.

54. The method of claim 53 wherein said at least one class of analyte-specific signal elements produces an analog signal that has a substantial magnitude in two or more different turns of a track.

55. The method of claim 51 wherein said identifying comprises using relative positions of the patterns on the disc.

56. The method of claim 36 wherein at least one of said patterns depends at least in part upon disposition of said analyte-specific signal elements on said disc.

57. The method of claim 56 wherein said pattern depends on an optical interaction between a laser beam, at least one of said analyte-specific signal elements, and the disc.

58. The method of claim 57 wherein said at least one analyte-specific signal element is a translucent bead and said optical interaction is a lensing effect of said bead.

59. The method of claim 36 further comprising the step of counting at least one of said patterns in said data.

60. The method of claim 36 further comprising the step of outputting a report that includes results of said identifying.

61. The method of claim 60 wherein said outputting includes displaying said report visually.

62. The method of claim 61 wherein said displaying is on an electronic display.

63. The method of claim 60 wherein said outputting includes printing said report on a tangible medium.

64. The method of claim 60 wherein said outputting includes transmitting said report by sound.

65. The method of claim 60 wherein said outputting includes transmitting said report remotely.

66. The method of claim 60 wherein said outputting includes storing said report in a manner selected from a group including transient storing and permanent storing.

67. The method of claim 36 wherein said trackable optical disc includes at least one spiral track.

* * * * *

UNITED STATES PATENT AND TRADEMARK OFFICE
CERTIFICATE OF CORRECTION

PATENT NO. : 6,888,951 B1
DATED : May 3, 2005
INVENTOR(S) : Worthington et al.

It is certified that error appears in the above-identified patent and that said Letters Patent is hereby corrected as shown below:

Title page,
Item [54], Title, delete "DISC" and insert -- DISCS --, therefor.
*Primary Examiner*, delete "Sahir" and insert -- Samir --, therefor.

Column 28,
Line 55, delete "claim 14" and insert -- claim 18 --, therefor.

Column 29,
Line 56, after "frequency" delete "signals" and insert -- signal, a --, therefor.

Signed and Sealed this

Eighth Day of November, 2005

JON W. DUDAS
*Director of the United States Patent and Trademark Office*